United States Patent
Choi et al.

(10) Patent No.: US 12,405,824 B2
(45) Date of Patent: Sep. 2, 2025

(54) SYSTEM ARCHITECTURE PROVIDING END-TO-END PERFORMANCE ISOLATION FOR MULTI-TENANT SYSTEMS

(71) Applicant: Samsung Electronics Co., Ltd., Suwon-si (KR)

(72) Inventors: Changho Choi, San Jose, CA (US); Rajinikanth Pandurangan, Fremont, CA (US); Ramzi Ammari, Santa Clara, CA (US); Zongwang Li, Dublin, CA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 382 days.

(21) Appl. No.: 17/189,245

(22) Filed: Mar. 1, 2021

(65) Prior Publication Data
US 2022/0147392 A1 May 12, 2022

Related U.S. Application Data

(60) Provisional application No. 63/112,146, filed on Nov. 10, 2020, provisional application No. 63/112,150, filed on Nov. 10, 2020.

(51) Int. Cl.
*G06F 9/50* (2006.01)
*G06F 9/455* (2018.01)

(52) U.S. Cl.
CPC ........ *G06F 9/5016* (2013.01); *G06F 9/45558* (2013.01); *G06F 2009/45579* (2013.01); *G06F 2009/45583* (2013.01)

(58) Field of Classification Search
CPC .............. G06F 9/5016; G06F 9/45558; G06F 2009/45579; G06F 2009/45583
See application file for complete search history.

(56) References Cited

U.S. PATENT DOCUMENTS

| 9,542,119 B2 | 1/2017 | Klein |
| 9,880,773 B2 | 1/2018 | Rajani et al. |
| (Continued) | | |

FOREIGN PATENT DOCUMENTS

| CN | 107346265 A | 11/2017 |
| CN | 110088723 A | 8/2019 |
| (Continued) | | |

OTHER PUBLICATIONS

Notice of Allowance for U.S. Appl. No. 17/189,255, mailed Apr. 5, 2022.
(Continued)

*Primary Examiner* — Bing Zhao
*Assistant Examiner* — Willy W Huaracha
(74) *Attorney, Agent, or Firm* — Renaissance IP Law Group LLP

(57) ABSTRACT

A system is disclosed. The system may include a processor. The system may also include a first submission queue (SQ) and a second SQ. The first SQ may be associated with a first Quality of Service (QoS) level and the second SQ may be associated with a second QoS level, the first QoS level being different from the second QoS level. An application may be running on the processor and using a first namespace (NS). The processor may be configured to receive a first Non-Volatile Memory (NVM) Set create command to establish a first NVM Set associated with the first SQ. The processor may be further configured to receive a second NVM Set create command to establish a second NVM Set associated with the second SQ. The processor may be further configured to receive a first NS create command to establish a first NS associated with the first NVM Set. The processor may be further configured to receive a second NS create command to establish a second NS associated with the second NVM Set. The processor may be further configured to place an
(Continued)

input/output (I/O) request sent from the application to at least one storage device in the first SQ based at least in part on the I/O request being associated with the first NS, the first NS being associated with the first NVM Set, and the first NVM Set being associated with the first SQ.

22 Claims, 25 Drawing Sheets

(56) References Cited

U.S. PATENT DOCUMENTS

| | | |
|---|---|---|
| 10,198,192 B2 | 2/2019 | Wakhare et al. |
| 10,235,198 B2 | 3/2019 | Qiu et al. |
| 10,387,081 B2 | 8/2019 | Benisty |
| 10,466,904 B2 | 11/2019 | Benisty |
| 10,467,037 B2 | 11/2019 | Choi et al. |
| 10,635,355 B1 | 4/2020 | Helmick et al. |
| 10,732,897 B2* | 8/2020 | Benisty ............... G06F 3/0659 |
| 10,817,218 B2* | 10/2020 | Jo ............... G06F 3/0656 |
| 11,036,659 B2 | 6/2021 | Chin |
| 11,074,013 B2 | 7/2021 | Suri et al. |
| 2017/0220287 A1 | 8/2017 | Wei |
| 2018/0024778 A1 | 1/2018 | Singh et al. |
| 2018/0088978 A1 | 3/2018 | Li et al. |
| 2018/0188975 A1 | 7/2018 | Benisty |
| 2018/0217951 A1 | 8/2018 | Benisty et al. |
| 2018/0247947 A1* | 8/2018 | Kanno ............... G06F 3/0608 |
| 2018/0285294 A1 | 10/2018 | Chagam Reddy |
| 2019/0042413 A1* | 2/2019 | Wysocki ............... G06F 11/108 |
| 2019/0163636 A1 | 5/2019 | Yang et al. |
| 2019/0278523 A1 | 9/2019 | Benisty |
| 2019/0303309 A1 | 10/2019 | Sahoo et al. |
| 2020/0004441 A1* | 1/2020 | Hahn ............... G06F 3/0622 |
| 2020/0050403 A1* | 2/2020 | Suri ............... G06F 3/0665 |
| 2020/0089537 A1 | 3/2020 | Bahirat et al. |
| 2020/0104056 A1 | 4/2020 | Benisty et al. |
| 2020/0142621 A1* | 5/2020 | Bae ............... G06F 12/0246 |
| 2020/0218649 A1* | 7/2020 | Dinges ............... G06F 12/0897 |
| 2020/0241750 A1 | 7/2020 | Kanno |
| 2021/0072927 A1* | 3/2021 | Yang ............... G06F 9/5077 |
| 2021/0218750 A1* | 7/2021 | Wells ............... G06F 9/541 |

FOREIGN PATENT DOCUMENTS

| | | |
|---|---|---|
| CN | 110088725 A | 8/2019 |
| CN | 110275774 A | 9/2019 |
| KR | 20160096279 A | 8/2016 |
| KR | 20200016810 A | 2/2020 |
| TW | 201730771 A | 9/2017 |
| TW | 202036296 A | 10/2020 |
| WO | 2018113030 A1 | 6/2018 |
| WO | 2019061072 A1 | 4/2019 |

OTHER PUBLICATIONS

Office Action for U.S. Appl. No. 17/189,255, mailed Feb. 3, 2022.

* cited by examiner

SYSTEM ARCHITECTURE PROVIDING END-TO-END PERFORMANCE ISOLATION FOR MULTI-TENANT SYSTEMS

RELATED APPLICATION DATA

This application claims the benefit of U.S. Provisional Patent Application Ser. No. 63/112,146, filed Nov. 10, 2020, and of U.S. Provisional Patent Application Ser. No. 63/112,150, filed Nov. 10, 2020, both of which are incorporated by reference herein for all purposes.

This application is related to U.S. patent application Ser. No. 17/189,255, filed Mar. 1, 2021, now U.S. Pat. No. 11,409,439, issued Aug. 9, 2022, which is incorporated by reference herein for all purposes.

FIELD

The disclosure relate generally to systems including storage devices, and more particularly to an architecture to provide isolation in multi-tenant systems.

BACKGROUND

Businesses that offer storage to tenants, such as hyperscalers and enterprise solutions, wanted to achieve performance isolation among tenants in their multi-tenancy systems. That is, these businesses want to offer Quality of Service (QoS)/Service Level Agreement (SLA) guarantees. Various solutions have been explored to achieve such isolation. But the large number of tenants (which can number in the thousands or more) limit the applicability of tested solutions to truly offer performance isolation.

A need remains to provide performance isolation for systems involving large numbers of tenants.

DETAILED DESCRIPTION

Figure 1:
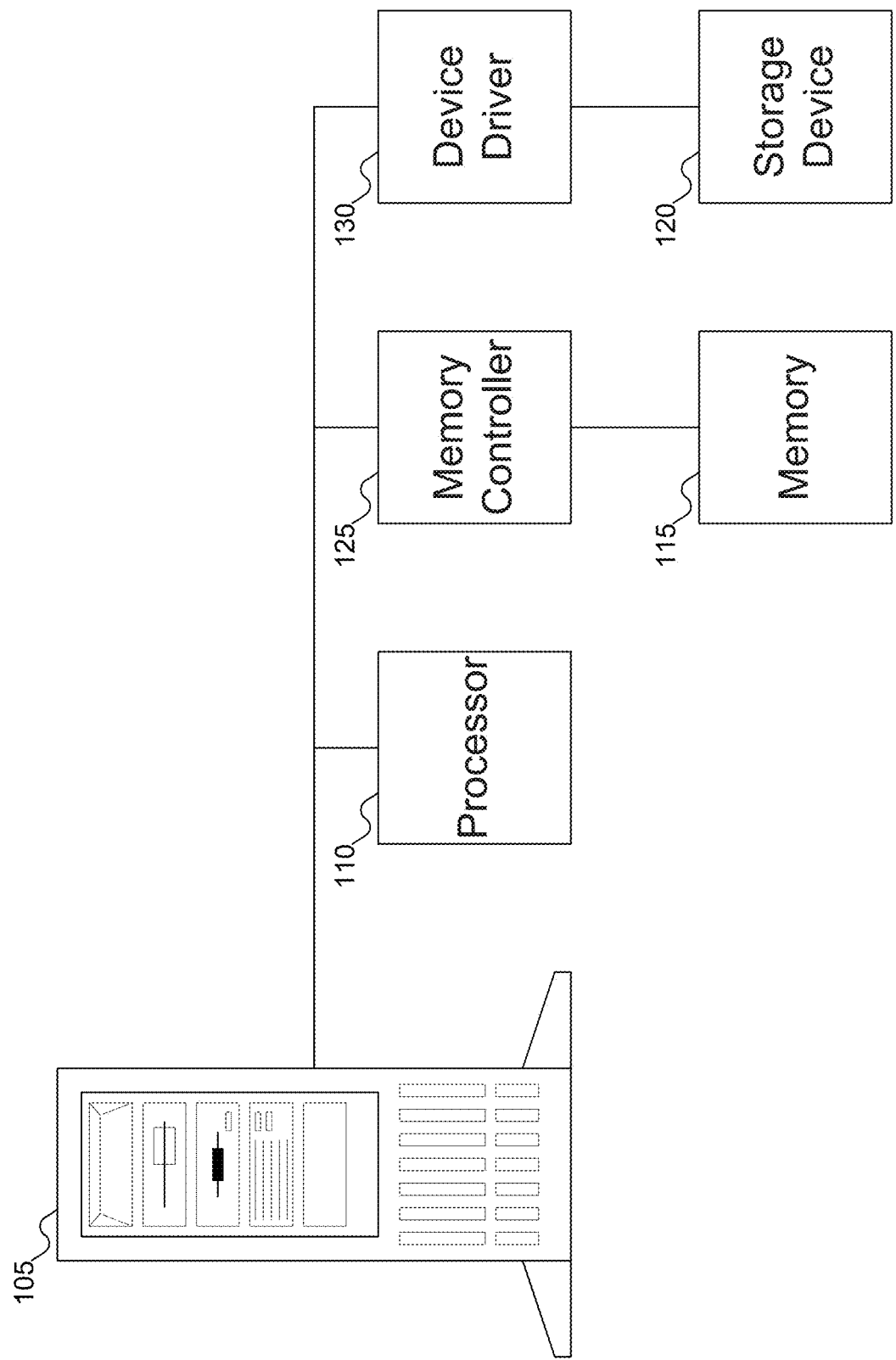
FIG. 1 shows a system including a storage device that may offer end-to-end tenant isolation.

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Multi-tenant support in storage devices has become important as the device capacity and performance increase. Embodiments of the disclosure introduce a new architecture for systems including storage devices, such as Solid State Drives (SSDs), for multi-tenant support in terms of Quality of Service (QoS) and space. Such an architecture may offer performance isolation and integrate space isolation, performance isolation, and a host interface set to realize the multi-tenant concept. Embodiments of the disclosure may include a full system architecture that provides end-to-end performance isolation among tenants (e.g., applications or Virtual Machines (VMs) or containers), from application to Not-AND (NAND) modules, and QoS Service Level Agreements (SLAs) for each tenant in multi-tenant systems.

Using host and SSD internal architecture designs, embodiments of the disclosure may support performance isolation between tenants, without using techniques such as streaming, Single Root Input/Output (I/O) Virtualization (SR-IOV), or multi-function network devices. By leveraging Non-Volatile Memory Express (NVMe) standard techniques, almost no host side software overhead may be needed.

A host may implement a namespace (NS) and Non-Volatile Memory (NVM) Set-based performance isolation scheme. (An NVM Set may also be referred to as a Set.) Storage for an application in the storage device may be assigned by the NS. An NS may be associated with an NVM Set. An NVM Set may be associated with a submission queue (SQ) with a QoS level. The SQs may provide QoS level-based performance isolation and control.

An NVM Set may be understood to be a collection of NVM that includes a group of NSs that are logically and potentially physically separated from other NVMs. A set may be created by an administrator using a private interface or a published interface by making a set create command a logical but "vendor specific" extension to NVMe.

Each NVM Set may have, among others, the following attributes: an identifier associated with the NVM Set (which may be, for example, a 16-bit value); the optimal size for writes to the NVM Set; the total capacity of the NVM Set; and the unallocated capacity for the NVM Set. The NVM Set may also include an attribute for the QoS level/type for the set.

An administrator may create a number of NVM Sets, one (or more) for each QoS level. Any number (one or more) of QoS levels, and therefore any number of NVM Sets, may be used. For example, if a core includes four I/O operations per second (IOPS) QoS levels labeled Urgent (U), High (H), Medium (M), and Low (L), the administrator may create four NVM Sets. Each NVM Set may be initialized with an NVM Set attribute indicating the corresponding QoS level.

A processor may include one or more cores. For each core in the processor of the machine, the administrator may create one or more SQs. Each SQ may be assigned a priority that corresponds with one of the QoS levels used by the NVM Sets. There may be one or more SQs per QoS level in each core. In some embodiments of the disclosure, if one (or more) QoS level is to be defined but not used, the administrator might not assign any SQs to that/those QoS level(s). The administrator may assign a priority for each SQ to correspond with one of the QoS levels for the NVM Sets. The administrator may also associate the SQ with an NVM Set.

A command submitted to an I/O SQ may include various fields. One of these fields, such as command double word (CDW) 11 (bits 02:01) may indicate the SQ priority for a Weighted Round Robin (WRR) scheduling algorithm. Another of these fields, such as CDW 12 (bits 15:00), may be used to identify the NVM Set that is bound to the SQ. When creating an SQ, the administrator may tie that specific SQ to an NVM Set using "CDW 12 bits 15:00".

There may be a 1:1 correspondence between QoS levels and NVM Sets, and between NVM Sets and SQs. Thus, there may be a 1:1 correspondence between QoS levels and SQs. In some embodiments, there may be a many-to-one relationship between some (or all) SQs and NVM Sets. There may also be more than one NVM Set associated with an individual QoS level.

The host may also include a controller management section for each core in the processor of the machine, which may include admin submission and completion queues. The host may also include an I/O completion queue to receive data from the storage device.

Embodiments of the disclosure may include a mechanism to bind an application to an NS, which in turn may be bound to an NVM Set, which in turn may be bound to an SQ. A performance SLA may then assigned to commands from the application and passed to a storage device based on the QoS level assigned to the SQ. By restricting the I/O path for applications to specific SQs, the I/O path may go from the application to the NS to the NVM Set to the SQ, and an associated QoS property may be passed to the storage device. By restricting the I/O path from applications to SQs, priority scheduling for I/O commands may also be achieved. An application may get any SQ priority level for their I/O commands by running on any core without the need to run on specific core. The same NVM Set may be bound to one (or more) SQs in each core in the processor. By using more than one NS, each of which may be associated with different NVM Sets, a single application may have multiple QoS and priority levels, depending on the NSs used. Embodiments of the disclosure may also support different QoS options (e.g., IOPS, latency, bandwidth, throughput, etc.) by having more NVM Sets.

When an application needs access to a storage device, the application may create an NS and tag it with an NVM Set ID, which may occur as part of an NS create command, which may be an NVMe command (for example, a "vendor specific" extension). By binding the NS to an NVM Set, the NS may inherit the associated QoS level of the NVM Set. This binding may also create a path from the application to the SQ associated with the QoS level. Thus, I/O commands from the application may be sent to the SQ associated with the NVM Set. An application may create more than one NS, and associate each NS with a different NVM Set (and therefore a different QoS level). Additional NSs may be given different identifiers to support uniquely identifying an NS.

When an application creates an NS using the NS create command, the application may choose what NVM Set the NS is associated with (which may use, for example, bits 101:100 of the NS create command as the NVM Set Identifier). The NS that is created may inherit attributes from the NVM Set, such as the QoS level.

Based on the priority for the SQ, different I/O commands may have different weights, which may lead to priority scheduling based on, for example, a WRR scheduling algorithm.

One application may be dedicated to only one NS and QoS level. The application may run in any core and keep the QoS and priority levels. Each core may have its own SQs and completion queue. Thus, commands sent by an application may be mapped to an NVM Set, which may in turn be mapped to an appropriate SQ within the core.

An application may run in any core (e.g., a multi-thread application) using one NS and keep its QoS and priority level. For example, application App1 may create an NS identified as "NS 10" and associate it with NVM Set L. Because the administrator may have created an SQ in core 0 with a low priority level and associated it with NVM Set L and an SQ in core 1 with a low priority level and associated it with NVM Set L, application App1 may run on Core 0, Core 1, or both and the I/O commands from App1 will still have a restricted path to an SQ with low priority and an SQ associated with an NVM Set of low QoS level. Thus, application App1 may keep the QoS level and priority level while running on any core or on multiple cores. Requests sent by the application running on Core 0 may be sent to the appropriate SQ associated with Core 0; requests sent by the application running on Core 1 may be sent to the appropriate SQ associated with Core 1.

An application may also have multiple QoS and priority levels running in one or more cores. For example, an application may create multiple NSs, associate those NSs with different NVM Sets, and thereby have access to multiple QoS and priority levels. Requests associated with the NS associated with NVM Set M may be sent to the medium SQ, and requests associated with the NS associated with NVM Set U may be sent to the urgent SQ.

Different QoS options may be supported by having more NVM Sets (e.g., IOPS, latency, bandwidth, throughput, etc.). For example, one pair of cores may use NVM Sets with IOPS-based priority, whereas another pair of cores may use NVM Sets with latency-based priority. Embodiments of the disclosure may be extended to any number of cores using any number of priority levels. In some embodiments of the disclosure, a core may support NVM Sets with different QoS options and different QoS levels for each QoS option.

Embodiments of the disclosure enable restricted paths for I/O commands, enable QoS support for I/O commands, and enable one application to have multiple QoS levels. Applications are not restricted to running on specific cores to take advantage of priority scheduling in SQs.

The host interface layer (HIL) in the storage device may perform NS capacity-based QoS control. The higher the capacity, the higher the QoS level may be used.

As discussed above, the host may map an application to an NS using an NVM Set, which in turn may be mapped to an SQ associated with the NVM Set (one QoS level may be assigned to each SQ). Because each SQ has its own QoS level, the NVM Set(s) associated with each SQ may have the QoS level associated with the SQ. Similarly, because each NVM Set may have a QoS level, the NS(s) associated with each NVM Set may have the QoS level associated with the NVM Set. Finally, because each NS may have a QoS level, the application(s) associated with each NS may have the QoS level associated with the NS.

Each of the NVM Sets may map to an SQ within each core; each core may also include a completion queue to receive information back from the storage device.

An NS QoS table may map an NS to a QoS level within the HIL. A QoS weight table may map QoS levels to weights, which may be used in scheduling commands from the HIL to the FTL.

At the HIL, an I/O command may include an NS ID. The HIL may implement NS capacity-based QoS control and NS-based key management. A WRR scheduling algorithm may be used to schedule I/O commands based on weights derived from the NS capacity.

The HIL may include an arbitrator, a command fetcher, a command parser, a QoS award scheduler, a host completion queue (HCQ), and a write buffer. The arbitrator may include the above-mentioned WRR scheduling algorithm. The arbitrator may set up weights for each SQ according to the SQ QoS priority level. The command fetcher may retrieve and process commands from each SQ according to the weights assigned by the arbitrator to each SQ. The command parser may parse a command and check its NS QoS level from an NS QoS table. The command parser may also insert the command into the related command queue according to the priority level: there may be one or more command queues for each QoS level. The QoS award scheduler may schedule commands from the command queues according to the QoS weight table and then send those commands to an identified FTL core. The HCQ may send I/O completion messages back to host from the storage device. The write buffer may be used to buffer write data traffic.

Embodiments of the disclosure may include a system and method to create multiple QoS levels, with corresponding dynamic weights based on total storage capacity assigned for each level. By assigning priority for each range of capacity, increased QoS levels may be introduced. Embodiments of the disclosure may provide balanced weights based on total storage capacity of each QoS level.

By adjusting the weights based on the total storage capacity of QoS levels, better QoS balancing among all tenants may be offered. Since hyperscalers may use storage QoS models, adjusting weights based on total storage capacity of QoS levels may offer improved command balancing. In addition, embodiments of the disclosure may provide different QoS level/weights for tenants with similar capacity but different priority.

In some embodiments of the disclosure, the range of capacity (bucket) and corresponding QoS levels are predefined. For example, Range-1 may be assigned QoS-1, Range-2 may be assigned QoS-2, etc. Whenever an NS is created, the QoS level for that NS may be assigned based on its storage capacity. So, for example, if the new NS falls into Range-2, then its QoS level is QoS-2.

The weight for each QoS level may be adjusted based on total storage capacity (storage capacity of all NSs) of each level. For example, if the total storage capacity for the QoS level may move from Range-i to Range-n (which may occur if a new NS is created or an existing NS is deleted), the weight for that QoS level may be updated automatically to the QoS level of Range-n.

For example, consider the following approach. The total storage capacity of the SSD may be labeled 'Tc'. The supported QoS levels may be labeled QoS-1 through QoS-n. The capacity of a particular NS (with i ranging from 1 to the maximum supported NS) may be labeled C-i. The capacity-based bucket per QoS level may be labeled CB-i (with i ranging from 1 to n). CB-i may be defined manually or using a predefined formula.

There may be a 1:1 correspondence between the buckets and the QoS levels. Bucket-1 may range from 0 bytes (or some minimum supported NSsize) up to CB-1. Bucket-2 may range from CB-1 up to CB-2, and so on up to Bucket-n, which may range from CB-n−1 to Tc.

The weights assigned to each QoS level may be labeled W-i. Although there may be a 1:1 correspondence between the weights and the QoS level, it is possible for any QoS level to have the same or different weight based on total storage capacity assigned to each QoS level. The total storage capacity of each QoS level may be labeled TC QoS-i. TC QoS-i may be calculated based on the number of NSs in the corresponding buckets/QoS levels. For example, if there are 10 NSs with capacities less than CB-1, then TC QoS-1 may be calculated as the sum of the capacities of these 10 NSs.

Three tables may be maintained. One table may match the capacity per bucket with the total storage capacity of the bucket. Another table may match an NS with its corresponding QoS level. A third table may match a QoS level with its weight.

In other embodiments of the disclosure, QoS priority may also be a factor. For example, consider a situation where four NSs (NS-1, NS-2, NS-3, and NS-4) might each have the same capacity, but two NSs (NS-1 and NS-2) might have one priority and the other two NSs (NS-3 and NS-4) might have another priority. By factoring in priority, NS-1 and NS-2 may be assigned to one QoS level and NS-3 and NS-4 may be assigned to another QoS level, even though all four NSs have the same capacity. Therefore, the weights assigned to NS-1 and NS-2 might be W-i, whereas the weights assigned to NS-3 and NS-4 might be W-i+1.

Now consider the situation where a fifth NS with the same capacity and same priority as NS-3 and NS-4 were created. If the total storage capacity of the QoS level remains in the same range, then the weights would not change again. But if the total storage capacity of the QoS level changes, then the weights for the QoS level may change based on its total storage capacity.

By including host priorities, NSs with the same capacity may still be assigned different QoS levels.

Relative to the earlier discussion, host priorities P-i may be introduced. The total storage capacity for a QoS level may now be the sum of the capacities of each NS at that QoS level for a specific priority level. (Thus, there may be more than one total storage capacity for a particular QoS level, if there are NSs with different priorities assigned to that QoS level.) The table matching the capacity per bucket with the total storage capacity of the bucket may also include the priority level, to differentiate among QoS levels that include NSs with different priorities.

QoS levels and corresponding weights based on total storage capacity may be stored as a table and be used by the SSD internal IO scheduler.

Embodiments of the disclosure may include a system that (dynamically) assigns the weights of each QoS level based on total storage capacity assigned at each level. Weights may be adjusted in real time whenever there is a change (added/removed) in total storage capacity at any QoS level, and may be based on a combination of priority and capacity.

Various applications may use various NSs associated with different NVM Sets. These different NVM Sets may then map to different I/O SQ(s) and I/O completion queue(s).

An NS QoS table may map NSs (or NS identifiers) to QoS levels within the HIL. Similarly, a QoS weight table may map QoS levels to weights, which may be used in scheduling commands from the HIL to the FTL.

The flash translation layer (FTL) in the SSD may perform superblock level storage space isolation based on SSD internal QoS levels associated with an NS. By combining the application (or NS) QoS with SSD internal priority, priority based scheduling may be implemented. The FTL may implement QoS level-based I/O completion management: the higher the QoS level in the dies, the faster the command completion may be processed.

The SSD may also perform NAND management. Using a QoS-based partition management, the NAND may be partitioned into superblocks. Each partition may be assigned a QoS level. Unused superblocks may be allocated as needed to the partitions.

Within each FTL, for each die there may be a die queue manager (DQM), which may place commands in one of a number of queues to submit requests to the storage device. For example, there may be one queue within each die corresponding to each QoS level. The die may also include a die completion queue, which may store data received from the die at the FTL.

At the FTL, storage space isolation based on a QoS level may be implemented. The FTL may combine application (or NS) QoS with the SSD internal priority to implement priority-based scheduling. The FTL may also implement QoS level-based I/O completion management. The FTL may be QoS aware: I/O commands from the same QoS weight level may be sent to the same partition that is maintained by a QoS-aware superblock manager, which may handle superblock allocation based on the QoS level of the partition.

The FTL may include a completion manager and a DQM. The completion manager may perform QoS-level based completion message scheduling among dies. The completion manager may deliver completion messages from the FTL to the HCQ in the HIL. The higher the priority of the I/O completion messages, the faster the message may be scheduled for delivery. The DQM may allocate NAND storage in the partitions according to the QoS-aware superblock management. Each die may have multiple priority queues. The DQM may relay NAND commands to a related queue based on the command QoS level.

The NAND interface layer (NIL) may communicate with various channels in the dies. Each channel may have associated blocks storing data accessible across that channel.

The NIL may perform scheduling of commands to be sent to the physical NAND chips. The NIL may include a NAND command scheduler, which may schedule NAND commands based on channel/die busy/idle status and/or die queue priority. The NAND command scheduler may deliver a command completion status to the die completion queue in the FTL.

Finally, the partitions may include blocks to store new data coming into the partition. Garbage collection may also result in data being written (programmed) to blocks in the partition.

NAND management may establish partitions in the NAND chips based on QoS level. Each partition may include superblocks that have the same allocation method but that is different from other partitions (e.g., 4-channel one-way superblock, 4-channel two-way superblock, etc.).

NAND management may establish partitions aligned to the QoS levels. There may be a partition for each QoS level, and write I/O commands at the same QoS level may be stored in the same partition. Each partition may include superblocks, which may be allocated to partitions (e.g., 4-channel one-way superblocks, 4-channel two-way superblocks, etc.). Garbage collection (GC) may occur within a partition: valid data in a block/superblock being erased because of garbage collection may be copied to another block/superblock in the same partition. A free block pool may be shared among partitions.

As GC may be performed for a partition, garbage collection may involve adding a superblock to the list of superblocks assigned to the partition. Newly added superblocks (either for data or GC) may be used (open blocks) for write I/O commands at that QoS level. Valid pages may be moved from a superblock targeted for garbage collection to a superblock newly added to the superblock list for the partition.

Similar sets of superblocks (a set of NAND blocks) may be grouped to form a partition. Variant groups of superblocks may be used to form differ partitions for each QoS level. The number of superblocks per partition does not need to be fixed, but may grow as needed. Each partition may apply a different RAID level based on the QoS level for the partition. For example, some partitions may support RAID, other partitions might not. Among the partitions that support RAID, each partition might have a different RAID level. Each partition may also be allocated a portion of the overprovisioning space.

The SSD may be designed with one or more NAND block allocation schemes to partition varieties of superblocks. By partitioning superblocks, the SSD may provide isolation among tenants and offer different performance options.

For example, there may be a single superblock allocation scheme, used for all superblocks, which may have similar NAND type. Or, there may be a superblock allocation scheme with different parallelism: different numbers (one or more) of superblocks may be allocated to a partition from different numbers (one or more) of channels. Or, there may be a superblock allocation scheme based on the NAND type of the blocks: for example, some superblocks may include single level cell (SLC) NAND, and other superblocks may include multi-level cell (MLC) NAND.

Different partition may be built to offer variations in performances and features for each QoS level. Different partitions may thus offer different levels of performance and isolation among tenants, which may align with the QoS SLA of an NS. GC and WL in each partitions may be performed independently. Each partition may have a different RAID level and a different superblock allocation scheme. A single SSD may thus include different types of superblocks and use them based on different QoS levels.

Upon erasure of a superblock, the NAND blocks of the superblock may be released into the free block pool and the erased superblock may be removed from the list of superblocks assigned to the partition.

Embodiments of the disclosure may include an SSD internal design that may include QoS-based partitions including groups of blocks or superblocks. The SSD may include QoS-based feature sets (GC/wear leveling (WL)/redundant array of independent disks (RAID)) for different partitions. Thus, GC and WL may be performed independently in each partition. Each partition may also have different RAID levels and a different superblock allocation scheme. This approach has the benefit that GC and WL performed at one partition does not affect or interfere with operations in other partitions.

QoS levels and corresponding weights based on total storage capacity and host priority may be stored as a table and be used by the SSD internal IO scheduler. In addition, each core may have its own set of I/O SQs and I/O completion queue; the I/O SQs in each core may represent different host priorities and mapped to by the various NVM Sets.

FIG. 1 shows a system including a storage device that may offer end-to-end tenant isolation (also termed performance isolation). In FIG. 1, machine 105 may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. Storage device 120 may be accessed using device driver 130. While FIG. 1 uses the generic term "storage device", embodiments of the disclosure may include any storage device formats that may benefit from an architecture offering performance isolation, examples of which may include hard disk drives and Solid State Drives (SSDs). Any reference to "SSD" below should be understood to include such other embodiments of the disclosure.

Figure 2:
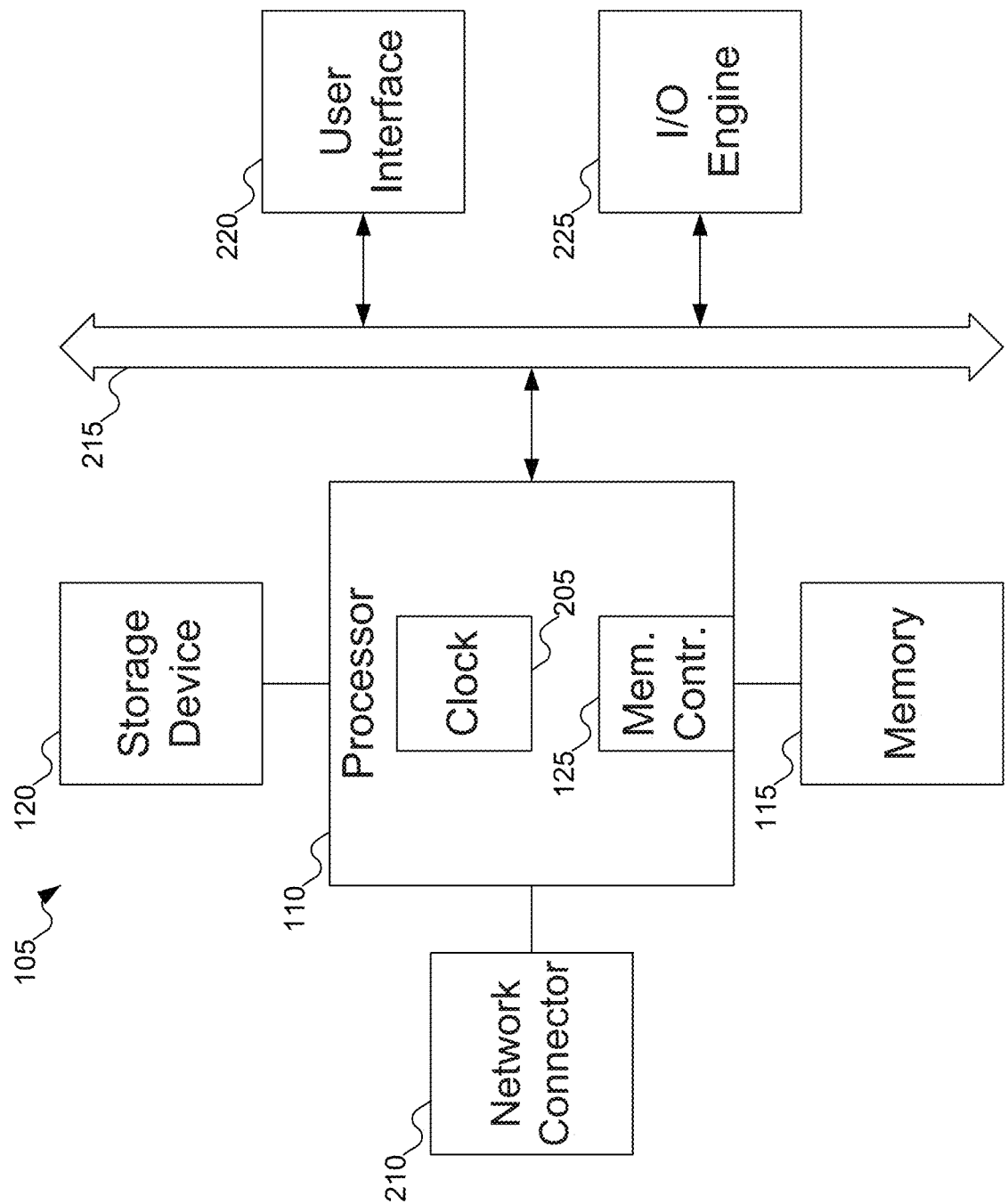
FIG. 2 shows details of the machine of FIG. 1.

FIG. 2 shows details of machine 105 of FIG. 1. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
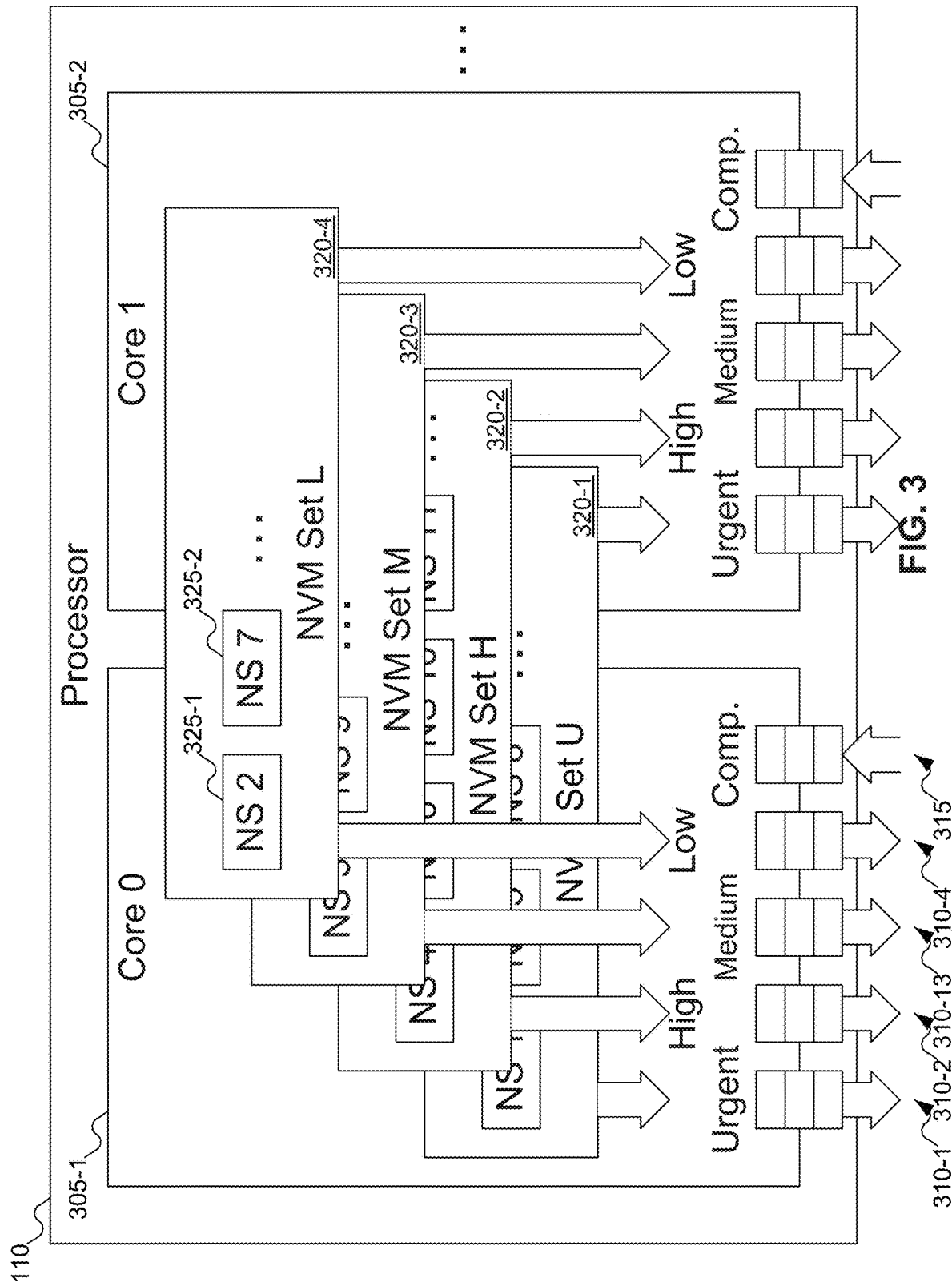
FIG. 3 shows the processor of FIG. 1 with multiple cores, multiple submission queues (SQs), and multiple Non-Volatile Memory (NVM) Sets.

FIG. 3 shows processor 110 of FIG. 1 with multiple cores, multiple submission queues (SQs), and multiple Non-Volatile Memory (NVM) Sets disclosure. In FIG. 3, processor 110 is shown having two cores 305-1 and 305-2, but embodiments of the disclosure may include any number of cores in processor 110, from one to as many as desired (without bound).

Within each core, an administrator may create any number of submission queues (SQs) (using, for example, one or more NVMe SQ create commands). FIG. 3 shows four SQs 310-1, 310-2, 310-3, and 310-4, labeled Urgent (U), High (H), Medium (M), and Low (L), respectively (which may represent different Quality of Service (QoS) levels including different Service Level Agreements (SLAs) with different levels of performance offered to tenants). While FIG. 3 shows four SQs in each core and suggests four QoS levels, embodiments of the disclosure may include any number of SQs per core and any number of QoS levels, from one to as many as desired (without bound). SQs 310-1 through 310-4 may be used to send requests, such as a write request or a read request of an application, to storage device 120 of FIG. 1. In various embodiments of the disclosure, each SQ 310-1 through 310-4 may be associated with a different QoS level, two (or more) SQs may be associated with the same QoS level, or a mix of these possibilities may be used (with some SQs associated with unique QoS levels and other SQs associated with the same QoS level). SQs 310-1 through 310-4 may be implemented in any desired manner: for example, using a first-in, first out (FIFO) queue, a circular queue, and other techniques.

In the command to create an SQ, various bits, such as bits 02:01 in command double word (CDW) 11 in the NVMe SQ create command, may be used to specify a QoS level associated with a particular SQ. While using only two bits to specify a QoS level for an SQ suggests that the number of QoS levels (and therefore the number of SQs) may be capped at four, embodiments of the disclosure may use more bits, potentially located elsewhere within the command to create the SQ to use more than four QoS levels: for example, bits 15:03 in CDW 11 are reserved, and may be used to define more than four QoS levels.

In addition to SQs 310-1 through 310-4, the administrator may also create completion queue 315. Completion queue 315 may be created using an NVMe completion queue create command, similar to how the administrator may create an SQ using an NVMe SQ create command. Completion queue 315 may be used to receive information from storage device 120 of FIG. 1. While FIG. 3 shows one completion queue 315, embodiments of the disclosure may include multiple completion queues 315.

While FIG. 3 shows SQs 310-1 through 310-4 and completion queue 315 as being part of core 305-1 in processor 110, from a more technical point of view core 305-1 may be said to "own" SQs 310-1 through 310-4 and completion queue 315, and SQs 310-1 through 310-4 and completion queue 315 may actually reside within memory 115 of FIG. 1. That is, core 305-1 may write information into SQs 310-1 through 310-4 in locations within memory 115 of FIG. 1, and storage device 120 of FIG. 1 may read data from SQs 310-1 through 310-4 by reading from the appropriate locations within memory 115 of FIG. 1. Similarly, storage device 120 of FIG. 1 may write data to completion queue 315 by writing to the appropriate location within memory 115 of FIG. 1, and core 305-1 may read information from completion queue 315 within memory 115 of FIG. 1.

The administrator may also define one or more NVM Sets. FIG. 3 shows four NVM Sets 320-1, 320-2, 320-3, and 320-4, but embodiments of the disclosure may include any number of NVM Sets, from one to as many as desired (without bound). NVM Sets 320-1 through 320-4 may each be associated with a QoS level: for example, NVM Sets 320-1 through 320-4 may be associated with the U, H, M, and L QoS levels. NVM Sets 320-1 through 320-4 may be associated with SQs 310-1 through 310-4, thereby associating NVM Sets 320-1 through 320-4 with the QoS level associated with SQs 310-1 through 310-4, respectively. This association may be established in the command to create SQs 310-1 through 310-4: for example, bits 15:00 in CDW 12 may include an identifier (ID) of the NVM Set to associate with the SQ. By associating an NVM Set with an SQ, the NVM Set may inherit attributes, such as the QoS level, of the SQ.

NVM Sets 320-1 through 320-4 may be created using a variety of commands. For example, a private interface, specific to an individual customer, may be established to permit creation of an NVM Set. Or, a published interface, which may be implemented as a vendor-specific extension to the Non-Volatile Memory Express (NVMe) protocol, may be used. Upon creation, each NVM Set may have an ID (which may be unique to the NVM Set and may be, for example, 16 bits in length), an optimal write size associated with the NVM Set, a total storage capacity and an unallocated capacity for the NVM Set (which may prevent too many tenants using the QoS level associated with the NVM Set, potentially causing the SLA to be violated), and a QoS level (which may be inherited from an SQ, as discussed below). Each NVM Set may also indicate a QoS type: for example, that the QoS levels reflect priority based on different numbers of I/O operations per second (IOPS), different latencies, different bandwidths, different throughputs, etc.

Note that a single NVM Set may be associated with multiple SQs. For example, in FIG. 3, NVM Set 320-1 is associated with the urgent SQ in both of cores 305-1 and 305-2. As discussed below with reference to FIGS. 4A-4C, by associating a single NVM Set with multiple SQs (and particularly with SQs in different cores in processor 110), a write request or a read request sent by an application running in a particular core may be routed to an SQ in that core, permitting an application to potentially run in any core and still achieve the target QoS level. In addition, a single NVM Set may be associated with multiple SQs in a single core in processor 110. If an NVM Set is associated with multiple SQs, all the SQs associated with the NVM Set should have the same QoS level: this choice avoids confusion about which SQ into which a particular write request or read request should be placed. But embodiments of the disclosure may associate a single NVM Set with SQs associated with two (or more, without bound) QoS levels. (In such embodiments of the disclosure, the host may determine the appropriate priority for a given command using other information, such as data provided as part of an application write or read command. Once the appropriate priority has been determined, the host may place the command in the associated SQ with the appropriate priority. One SQ may also be identified as the default SQ to use in situations where the appropriate priority may not be determined; alternatively, the host may select any associated SQ at random.) The NVM Set may inherit the QoS level associated with the associated SQs: whatever QoS level is associated with the SQs, the NVM Set associated with those SQs may be associated with that QoS level as well.

Each application may create one or more namespaces (NSs): applications may also share NSs. These NSs, such as NSs 325-1 and 325-2, may be associated with one of NVM Sets 320-1 through 320-4. Unlike the relationship between NVM Sets 320-1 through 320-4 and SQs 310-1 through 310-4, a single NS should be associated with a single NVM Set: as discussed below with reference to FIGS. 4A-4C, this choice avoids confusion about which SQ into which a particular write request or read request should be placed. Note that the reverse is not true: a single NVM Set may be associated with more than one NS. For example, FIG. 3 shows that NVM Set 320-4 is associated with NSs 325-1 and 325-2 (and potentially others). In addition, embodiments of the disclosure may associate a single NS with two (or more, without bound) NVM Sets.

An NS may be associated with an NVM Set as part of the creation of the NS. For example, using the NVMe create NS command, bytes 101:100 may be used to identify an NVM Set associated with the NS by including the ID associated with that NVM Set. By associating an NS with an NVM Set, the NS may inherit attributes, such as the QoS level, of the NVM Set. In general, each QoS level may offer different capacities to NSs, with higher QoS levels offering greater capacity to the NSs associated with that QoS level. Each NS may also have its own ID, which may be unique among the NSs in the system.

Different NVM Sets may be used to manage QoS levels according to different criteria. For example, in some cores, QoS levels may be established to guarantee some minimum number of IOPS. An application may receive more IOPS than are guaranteed, but should not receive fewer IOPS than are guaranteed, regardless of any other applications and their associated QoS levels. For example, NVM Set 320-4 might guarantee 100 IOPS for requests to NSs associated with that QoS level, whereas NVM Set 320-1 might guarantee 100,000 IOPS for requests to NSs associated with that QoS level.

In other cores, QoS levels may be established to guarantee a maximum latency for requests sent to storage device 120 of FIG. 1. Again, an application's commands might be processed faster than guaranteed, but should not take longer than guaranteed, regardless of any other applications and their associated QoS levels. For example, NVM Set 320-4 might guarantee a latency of no more than 10,000 microseconds (µs) for requests sent to storage device 120 of FIG. 1, whereas NVM Set 320-1 might guarantee 10 µs for requests sent to storage device 120 of FIG. 1. Other criteria that may be used to manage QoS levels may be guaranteed bandwidth and throughput; embodiments of the disclosure may also extend to other criteria.

The guaranteed performance for a particular QoS level represents the minimum level of service an application might receive for its requests. Thus, for example, if a particular QoS level guarantees an application 100 IOPS, then the application may expect that 100 requests may be processed if sent during a one second interval. Similarly, if a particular QoS level guarantees a 10 µs latency, then any request sent at that QoS level should receive a response within 10 µs. By using, for example, a Weighted Round Robin technique (discussed below with reference to FIGS. 7A-7B), storage device 120 of FIG. 1 may provide the promised level of service: a Weighted Round Robin technique may process more requests from a QoS level with a larger number of requests than from a QoS level with a smaller number of requests, even though the second QoS level might have a higher overall priority.

Note that priority, in this context, does not mean that all requests with a higher priority are processed before any requests with a lower priority are processed: higher priority requests merely receive a higher importance, since the QoS guarantee is likely more tightly constrained. Similarly, note that requests may be processed more rapidly than guaranteed. That is, the system may exceed the performance promised for the QoS level: the only expectation is that the minimum performance is provided. For example, when using latency as a QoS option, if there are no requests pending in any SQ, then a request placed even in the lowest priority SQ may be processed as rapidly as a request placed in the highest priority SQ. Or, when using IOPS as a QoS option, if there are no requests pending in any SQ, an application may have 100,000 IOPS processed even though only 100 IOPS might be promised for the QoS level. But embodiments of the disclosure may also include upper bounds on performance at QoS levels (for example, a maximum number of IOPS processed in a one second interval, or a minimum latency to process a request).

Figure 4A:
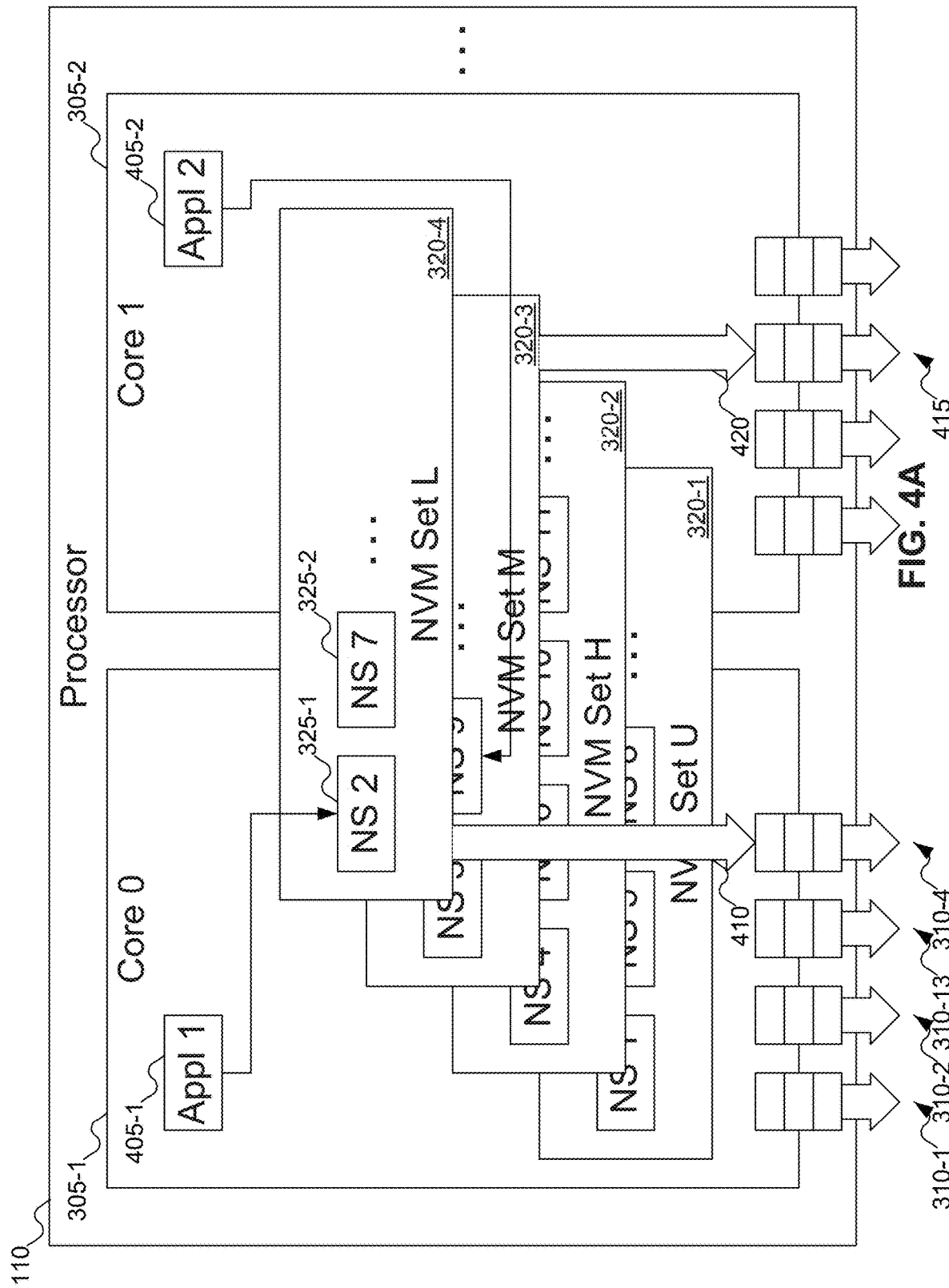
FIGS. 4A-4C show various applications using the namespaces (NSs) of FIG. 3 associated with the NVM Sets of FIG. 3 running on the processor of FIG. 1.
Figure 4B:
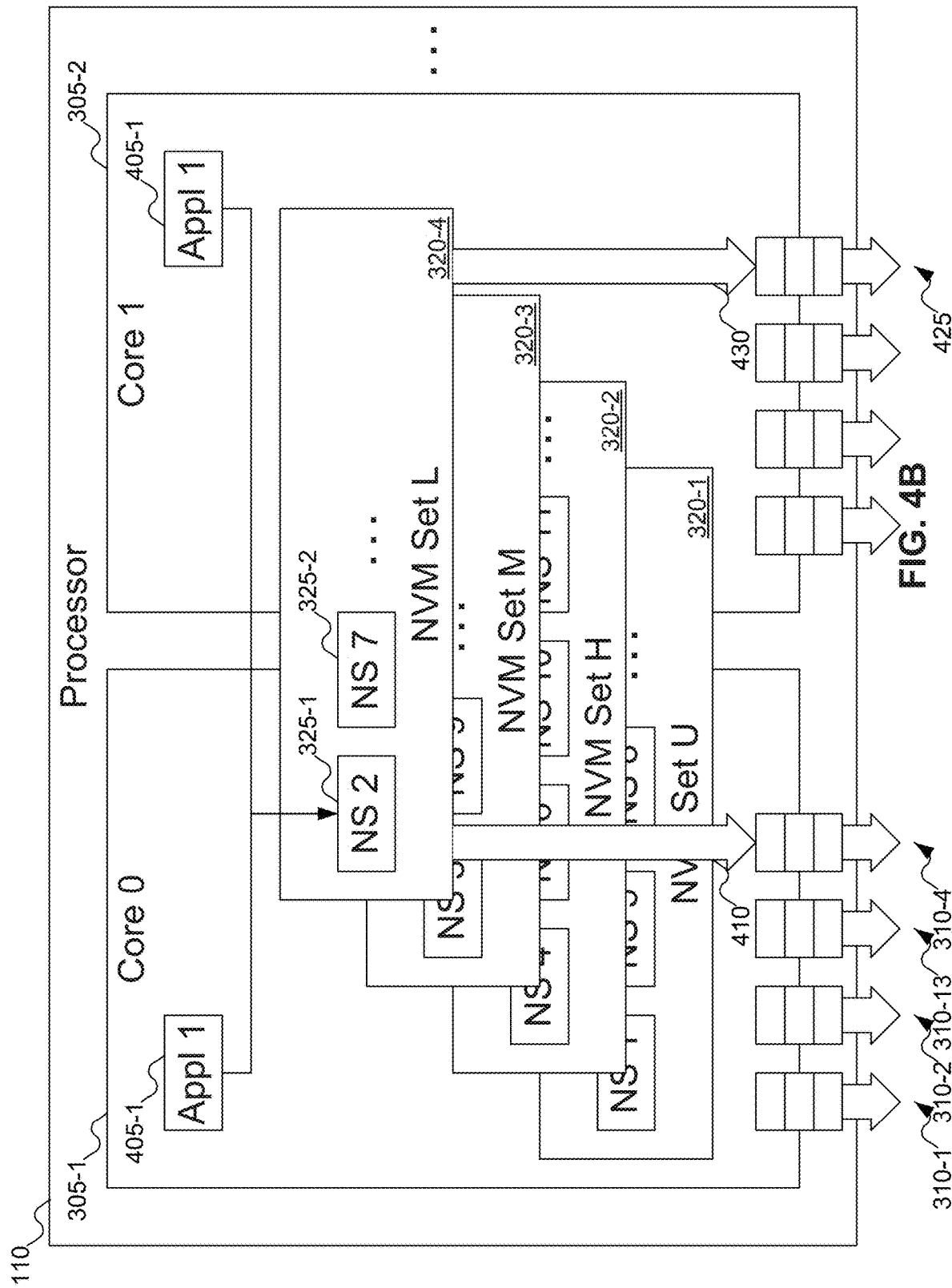
Figure 4C:
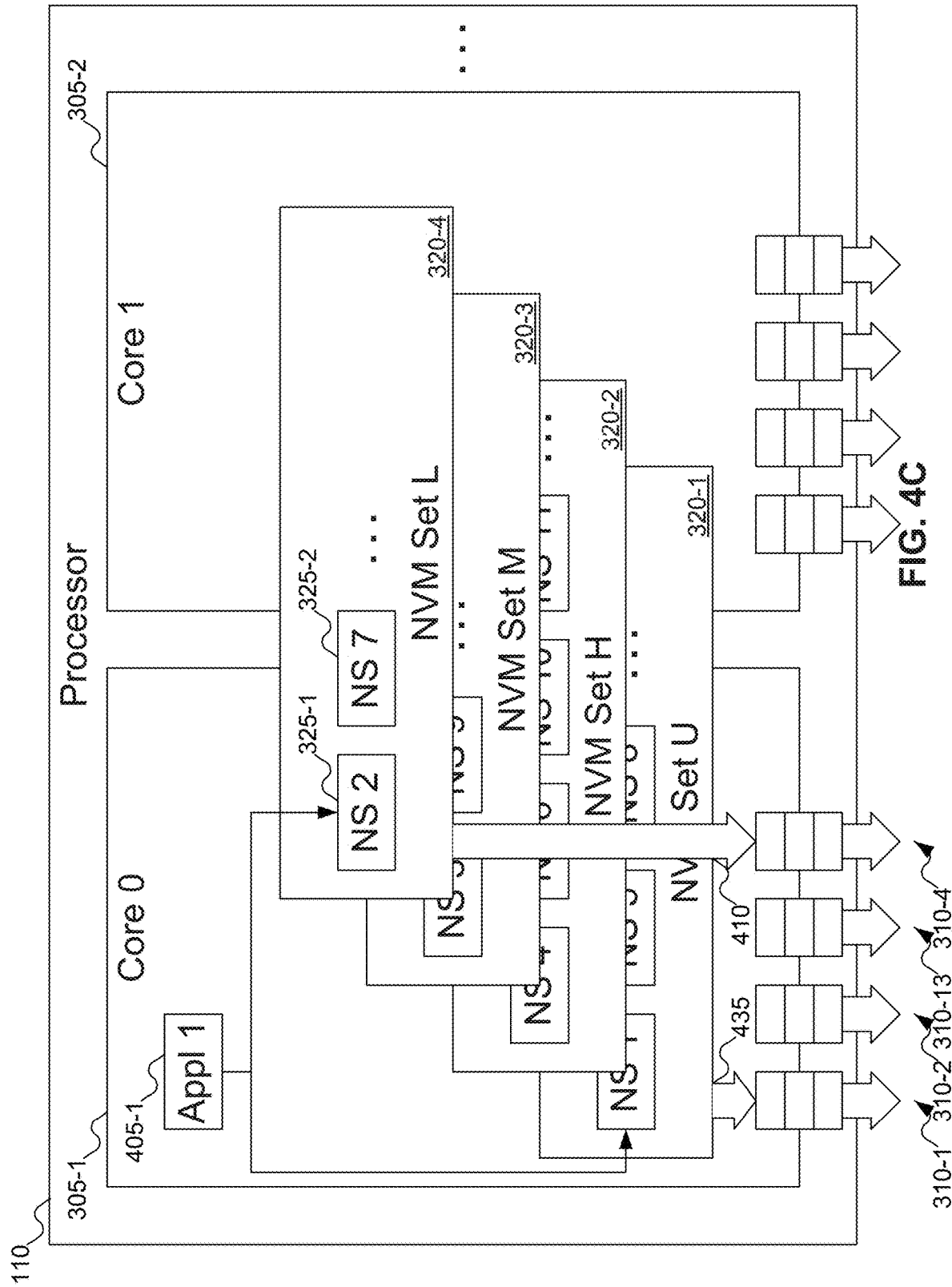

FIGS. 4A-4C show various applications using NSs 325-1 and 325-2 of FIG. 3 associated with the NVM Sets of FIG. 3 running on processor 110 of FIG. 1. In FIG. 4A, applications 405-1 and 405-2 are shown: application 405-1 is shown running on core 305-1 of processor 110, and application 405-2 is shown running on core 305-2 of processor 110. Applications 405-1 and 405-2 are shown using one NS apiece: application 405-1 is shown using NS 325-1 associated with NVM Set 320-4, whereas application 405-2 is shown using a NS associated with NVM Set 320-3.

When application 405-1 issues a request to be sent to storage device 120 of FIG. 1, the request, based on the Logical Block Address (LBA) included in the request, processor 110 (more particularly, core 305-1) may determine that the LBA in the request is part of NS 325-1. By using the association between NS 325-1 and NVM Set 320-4, and the association between SQ 310-4, processor 110 (more particularly, core 305-1) may determine that the request should be placed in SQ 310-4, as shown by arrow 410. Similarly, processor 110 (more particularly, core 305-2) may use the association between the NS and NVM Set 320-3, and the association between NVM Set 320-3 and SQ 415, to place a request from application 405-2 into SQ 415, as shown by arrow 420.

Because an NVM Set may be associated with SQs in different cores in processor 110, an application may run in any core in processor 110 and still be ensured that the established QoS is satisfied. For example, in FIG. 4B, application 405-1 may run in either core 305-1 or 305-2 and still receive the promised QoS level. Based on the LBA in a request, NS 325-1 may be identified, which in turn may be associated with NVM Set 320-4, which in turn may be associated with SQ 310-4 (in core 305-1) and SQ 425 (in core 305-2). Thus, when application 405-1 is running in core 305-1, requests may be routed to SQ 310-4, as shown by arrow 410; when application 405-1 is running in core 305-2, requests may be routed to SQ 425, as shown by arrow 430. In a similar vein, if application 405-2 of FIG. 4A running in core 305-2 (as shown in FIG. 4A) and was sharing NS 325-1 with application 405-1, the requests from application 405-2 of FIG. 4A could be routed to SQ 425 as shown by arrow 430.

Finally, in FIG. 4C, application 405-1 is shown running in core 305-1, but is shown accessing NS 325-1 associated with NVM Set 320-4 and an NS associated with NVM Set 320-1. Again, using the LBA of a request, the implicated NS may be identified; the associated NVM Set may then be identified, and the request routed to associated SQ 310-4, as shown by arrow 410, or SQ 310-1, as shown by arrow 435. Thus, a single application may use multiple NSs with different QoS levels and achieve different levels of performance as specified by the QoS level.

While the above discussion uses the LBA included in the request from the application to identify the NS, embodiments of the disclosure may use IDs other than the LBA to determine the NS of a particular request. For example, if storage device 120 of FIG. 1 is a key-value storage device, then the request from the application may include a key, rather than an LBA. The request itself may also specify the NS using its ID, rather than leaving it to storage device 120 of FIG. 1 to determine the NS using the LBA. Embodiments of the disclosure are intended to include all IDs that might be used by applications, such as applications 405-1 and 405-2, to determine the NS associated implicated by a particular request from the application.

Figure 5:
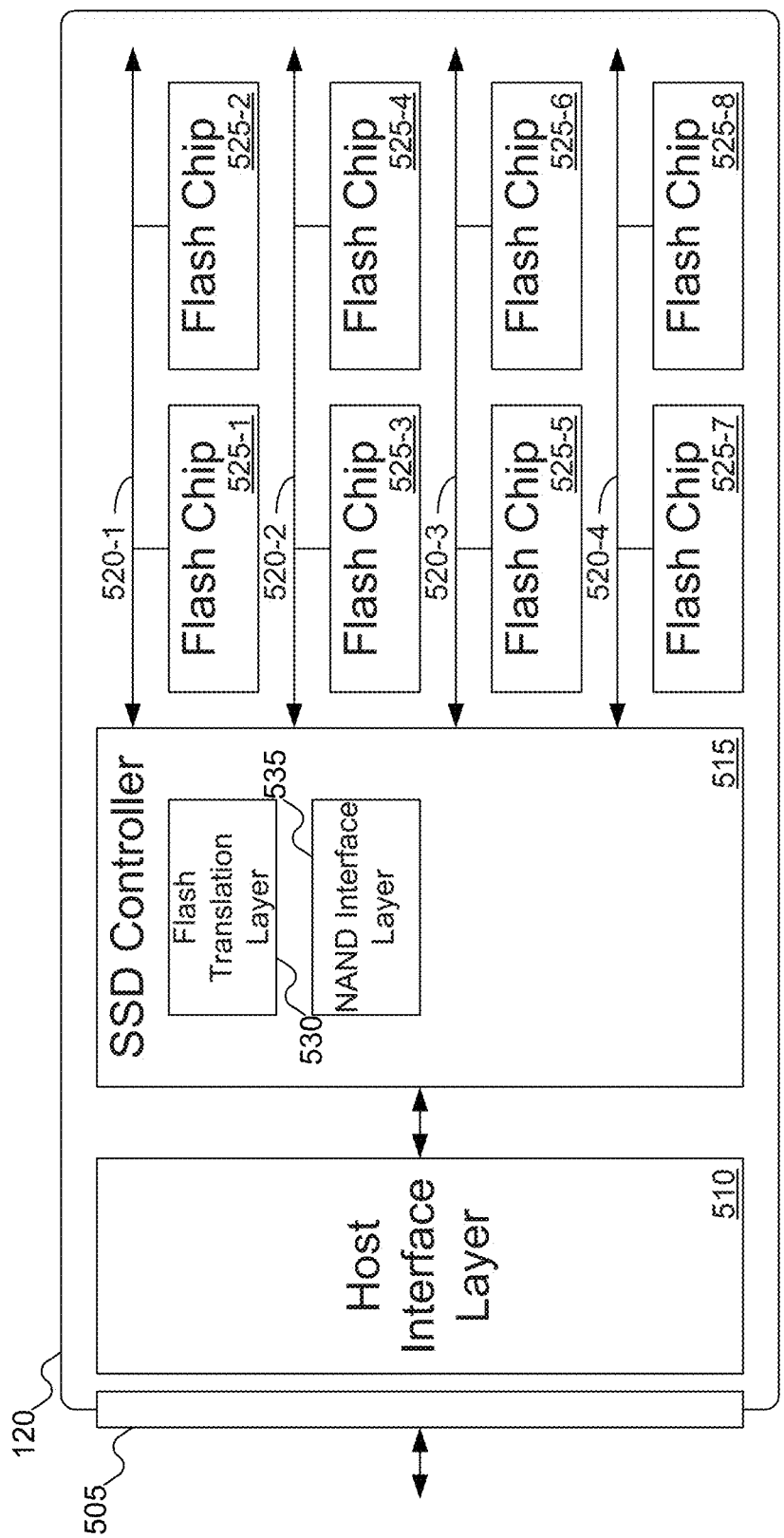
FIG. 5 shows details of the SSD of FIG. 1.

FIG. 5 shows details of SSD 120 of FIG. 1. In FIG. 5, SSD 120 may include interface 505. Interface 505 may be an interface used to connect SSD 120 to machine 105 of FIG. 1. SSD 120 may include more than one interface 505: for example, one interface might be used for block-based read and write requests, and another interface might be used for key-value read and write requests. While FIG. 5 suggests that interface 505 is a physical connection between SSD 120 and machine 105 of FIG. 1, interface 505 may also represent protocol differences that may be used across a common physical interface. For example, SSD 120 might be connected to machine 105 using a U.2 or an M.2 connector, but may support block-based requests and key-value requests: handling the different types of requests may be performed by a different interface 505.

SSD 120 may also include host interface layer 510, which may manage interface 505. If SSD 120 includes more than one interface 505, a single host interface layer 510 may manage all interfaces, SSD 120 may include a host interface layer for each interface, or some combination thereof may be used. Host interface layer 510 is discussed further with reference to FIGS. 6-7B below.

SSD 120 may also include SSD controller 515, various channels 520-1, 520-2, 520-3, and 520-4, along which various flash memory chips 525-1, 525-2, 525-3, 525-4, 525-3, 525-6, 525-7, and 525-8 may be arrayed. SSD controller 515 may manage sending read requests and write requests to flash memory chips 525-1 through 525-8 along channels 520-1 through 520-4. Although FIG. 5 shows four channels and eight flash memory chips, embodiments of the disclosure may include any number (one or more, without bound) of channels including any number (one or more, without bound) of flash memory chips.

Within each flash memory chip, the space may be organized into blocks, which may be further subdivided into pages, and which may be grouped into superblocks. The page is typically the smallest unit of data that may be read or written on an SSD. Page sizes may vary as desired: for example, a page may be 4 KB of data. If less than a full page is to be written, the excess space is "unused".

While pages may be written and read, SSDs typically do not permit data to be overwritten: that is, existing data may be not be replaced "in place" with new data. Instead, when data is to be updated, the new data is written to a new page on the SSD, and the original page is invalidated (marked ready for erasure). Thus, SSD pages typically have one of three states: free (ready to be written), valid (containing valid data), and invalid (no longer containing valid data, but not usable until erased) (the exact names for these states may vary).

But while pages may be written and read individually, the block is the basic unit of data that may be erased. That is, pages are not erased individually: all the pages in a block are typically erased at the same time. For example, if a block contains 256 pages, then all 256 pages in a block are erased at the same time. This arrangement may lead to some management issues for the SSD: if a block is selected for erasure that still contains some valid data, that valid data may need to be copied to a free page elsewhere on the SSD before the block may be erased. (In some embodiments of the disclosure, the unit of erasure may differ from the block: for example, it may be a superblock, which may be a set of multiple blocks.)

SSD controller 515 may include flash translation layer 530 (which may be termed more generally a logical-to-physical translation layer, for storage devices that do not use flash storage), and Not-AND (NAND) interface layer 535. Flash translation layer 530 may handle translation of LBAs or other logical IDs (as used by processor 110 of FIG. 1) and physical block addresses (PBAs) or other physical addresses where data is stored in flash chips 525-1 through 525-8. NAND interface layer 535 may handle sending requests to read and/or write data from flash chips 525-1 through 525-8 along channels 520-1 through 520-4. While FIG. 5 shows one flash translation layer 530, embodiments of the disclosure may include any number (one or more, without bound) of flash translation layers 530. While FIG. 5 shows one NAND interface layer 535, embodiments of the disclosure may include any number (one or more, without bound) of NAND interface layers 535. Flash translation layer 530 is discussed further with reference to FIGS. 8-11 below; NAND interface layer 535 is discussed further with reference to FIG. 12 below.

Figure 6:
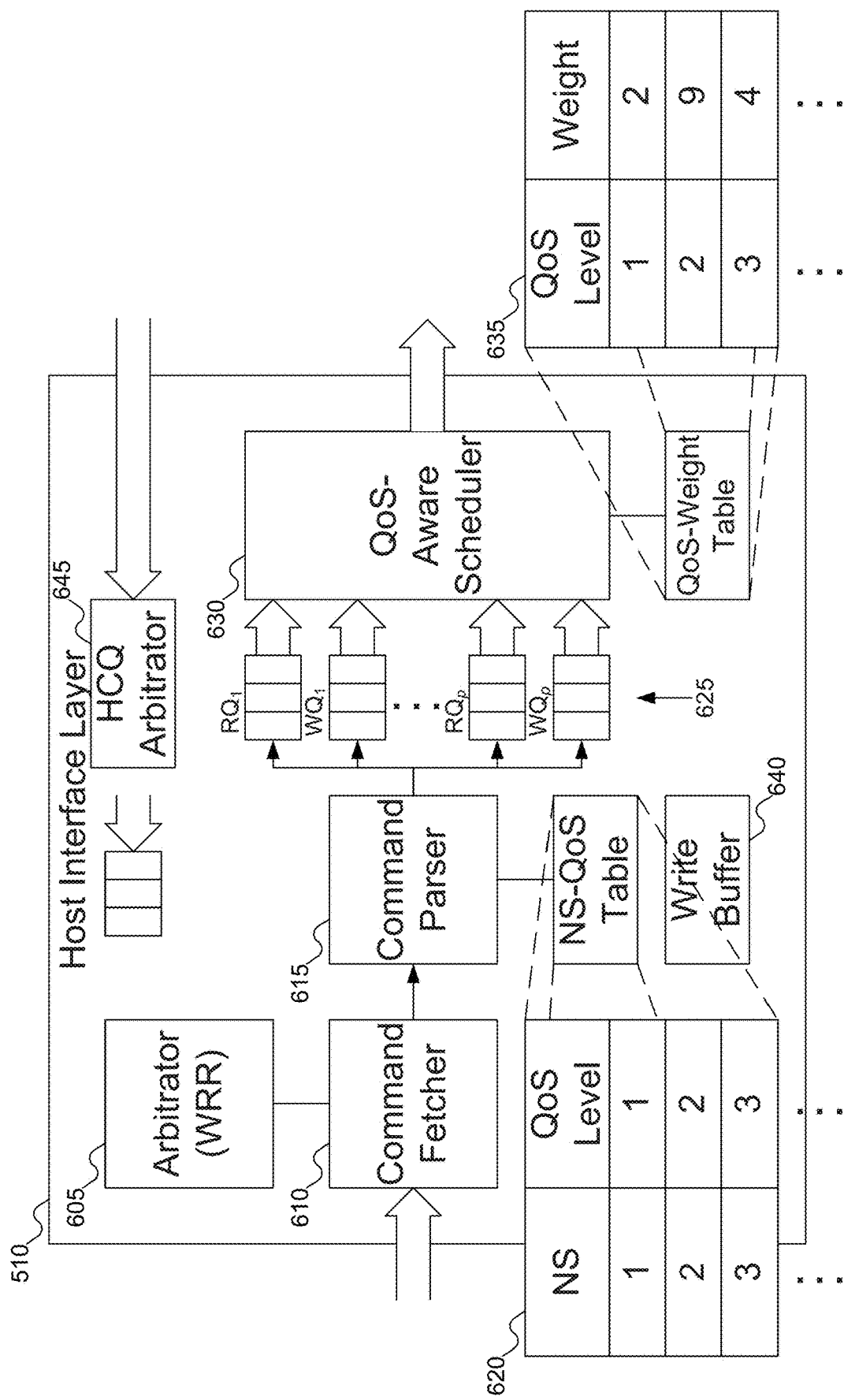
FIG. 6 shows details of the host interface layer of FIG. 5.

FIG. 6 shows details of host interface layer 510 of FIG. 5. In FIG. 6, host interface layer 510 may include arbitrator 605, command fetcher 610, command parser 615, NS-QoS table 620, command queues 625, QoS-aware scheduler 630, and QoS-weight table 635.

Arbitrator 605 may arbitrate among SQs 310-1 through 310-4 of FIG. 3, to select the next SQ from which a request should be processed. (While this discussion addresses the SQs of core 305-1 of FIG. 3, where processor 110 of FIG. 1 includes more than one core, arbitrator 605 may arbitrate among all the SQs of all the cores.) Arbitrator 605 may use any desired arbitration algorithm to select the next queue from which to process a request. One example arbitration algorithm that may be used in Weighted Round Robin (WRR). In some embodiments of the disclosure, a version of WRR using dynamic weights may be used, as discussed further below and with reference to FIGS. 7A-7B.

Once an SQ has been selected, a request may be accessed from the SQ and processed. Command fetcher 610 may select a request in the selected SQ for processing. In some embodiments of the disclosure, all requests in an individual SQ have an equal priority: assuming the requests are organized in order of submission, then command fetcher 610 may select the request at the head of the SQ to be processed next. In other embodiments of the disclosure, requests in an individual SQ may have differing priority, in which case command fetcher 610 may select requests in an order that differs from the order in which the requests were submitted. In such embodiments of the disclosure, command fetcher 610 may keep track of how long each request has been pending in an individual SQ: for example, by comparing the current time (which may be measured as a number of cycles since some fixed time, such as when the system was last booted) with the time when each request was placed in the SQ. If higher priority requests were always taken before lower priority requests, it could happen that lower priority requests do not end up being processed in time to satisfy the promised QoS: command fetcher 610 may then weigh the priority of individual requests against how long those requests have been pending in the SQ.

Command parser 615 may then parse the request selected by command fetcher 610. By parsing the command, command parser 615 may then determine an appropriate command queue into which the request should be placed. For example, command queues 625 may include a read queue and a write queue for some number of priority levels (which may be the same or different from the number of QoS levels). By parsing the request, command parser 615 may determine whether the command is a read request or a write request, and may place the request in the appropriate command queue 625. There may be any number (one or more, without bound) of command queues 625.

QoS-aware scheduler 630 may then take requests from command queues 625 and send those commands to die queues in flash translation layer 530 of FIG. 5. Which die queue may receive a particular command may depend on the LBA ranges allocated for channels 520-1 through 520-4 of FIG. 5 to flash chips 525-1 through 525-8 of FIG. 5. QoS-aware scheduler 630 may schedule commands to be sent to the die queues in flash translation layer 530 of FIG. 5 (and thence to flash chips 525-1 through 525-8 of FIG. 5) using any desired scheduling algorithm. Since the time required to process a read request may differ from the time required to process a write request, QoS-aware scheduler 630 may take requests from command queues 625 in an order that is different from the order in which those commands were placed in command queues 625. Flash translation layer 530 (and the die queues) are discussed further with reference to FIG. 8 below.

Host interface layer 510 may be aware of the capacity allocated to each NS. If an NS attempts to write data that would cause the NS to exceed its capacity, host interface layer 510 may return an error message to host 105 of FIG. 1 as a result.

In addition to these components, host interface layer 510 may include write buffer 640 and host completion queue arbitrator 645. Write buffer 640 may be used to buffer data sent from machine 105 of FIG. 1 (more specifically, applications 405-1 and 405-2 of FIGS. 4A-4C) but not yet written to pages/blocks/superblocks in flash chips 525-1 through 525-8 of FIG. 10. While FIG. 6 shows one write buffer 640, embodiments of the disclosure may include any number (one or more, without bound) of write buffers.

Figure 10:
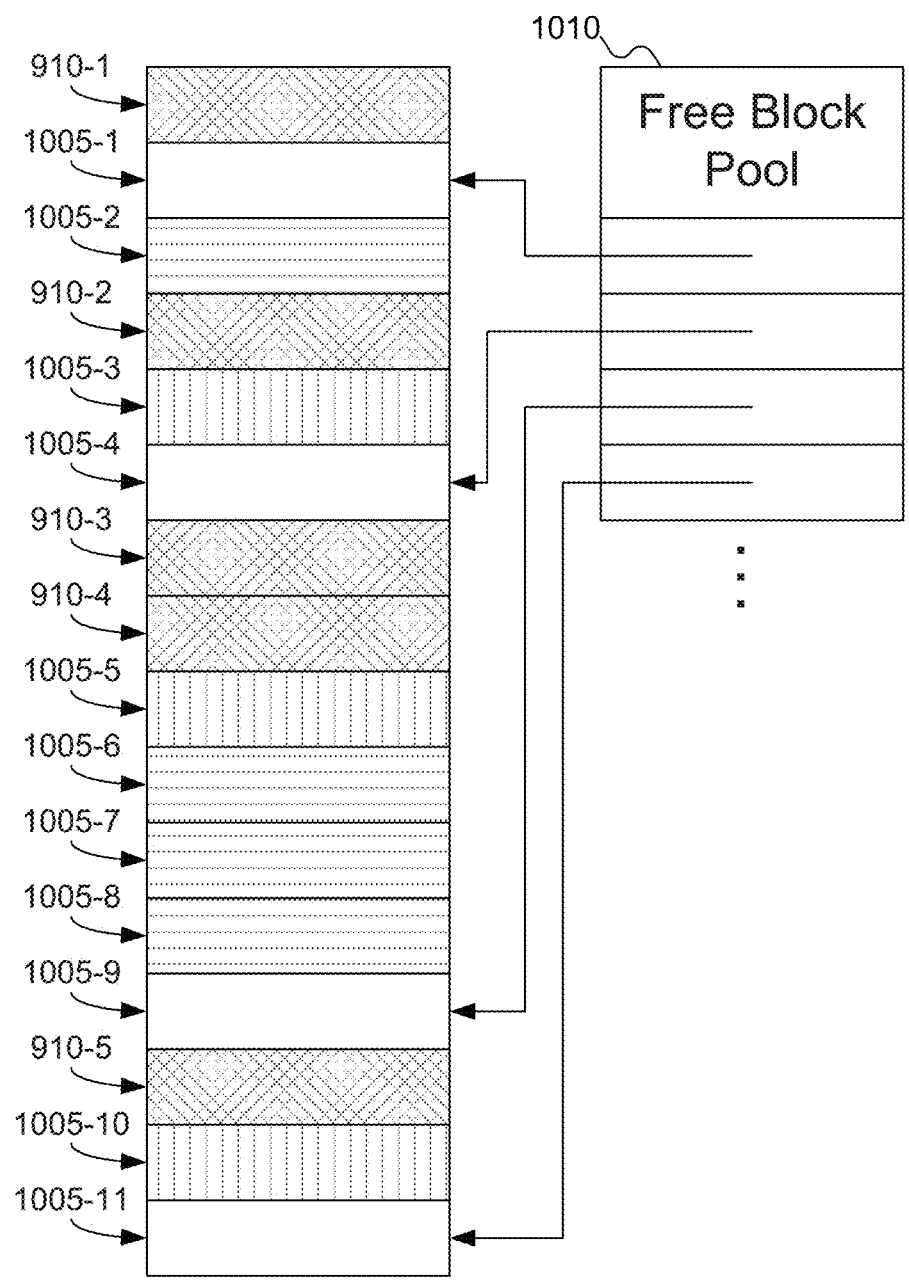
FIG. 10 shows an alternative view of the partitions of superblocks in the SSD of FIG. 1.

Host completion queue arbitrator 645 may schedule the placement of results returned from flash chips 525-1 through 525-8 of FIG. 10 back to completion queue 315 of FIG. 3 appropriate to the core with the SQ where the request was originally placed. While host completion queue arbitrator 645 may return results in the order received from flash chips 525-1 through 525-8 of FIG. 10, host completion queue arbitrator 645 may also return results in a different order than received from flash chips 525-1 through 525-8 of FIG. 5. For example, host completion queue arbitrator 645 might receive a read result, followed by a write result. But if the read result was associated with an NS that was assigned a low QoS level (for example, an NS associated with NVM Set 320-4 of FIG. 3) and the write result was associated with an NS that was assigned an urgent QoS level (for example, an NS associated with NVM Set 320-1 of FIG. 3), the read result might be delayed to prioritize returning the write result. Thus, host completion queue arbitrator 645 may schedule the return of results to requests associated with higher QoS levels more quickly than results to requests associated with lower QoS levels. As with arbitrator 605 and QoS-aware scheduler 630, host completion queue arbitrator 645 may use any desired scheduling algorithm to schedule the return of results back to the appropriate completion queues.

Components, such as arbitrator 605, command fetcher 610, command parser 615, QoS-aware scheduler 630, and host completion queue arbitrator 645 may be implemented in any desired manner. Among other possibilities, these components may be implemented using a field programmable gate array (FPGA), an application-specific integrated circuit (ASIC), a central processing unit (CPU), a graphics processing unit (GPU), or a general purpose GPU (GPGPU), among other possibilities. In some implementations, the various components may also include code to be executed by the underlying circuit implementation: this code may be stored in general storage (for example, may be stored in flash chips 525-1 through 525-8 of FIG. 5 with host data), stored in dedicated storage (which may be volatile or non-volatile storage, or may be stored in some form of Read Only Memory (ROM), such as Programmable ROM (PROM), Erasable PROM (EPROM), Electrically Erasable PROM (EEPROM), and so on. In addition, different components may be implemented using different techniques: for example, one component may be implemented using an FPGA, another may be implemented using a CPU, and so on. Further, multiple components may be implemented using the same technique, and may be combined into a single implementation: for example, arbitrator 605, command fetcher 610, and command parser 615 may be implemented using a single FPGA.

Finally, host interface layer 510 may include storage for tables, such as NS-QoS table 620 and QoS-weight table 635. NS-QoS table 620 may map individual NSs to their associated QoS levels (as discussed above with reference to FIG. 3, an individual NS may be associated with an individual NVM Set, which in turn may be associated with an SQ in the core in which the application is running: the QoS level that is associated with the core may then be associated with the NVM Set, and in turn to the NS). While NS-QoS table 620 shows the same values for each NS and QoS level, this is arbitrary: the QoS level for a given NS may differ from the ID assigned to the NS. Further, while NS IDs should be unique within machine 105 of FIG. 1 and storage device 120 of FIG. 1, multiple NSs may have the same associated QoS level. QoS-weight table 635 may map QoS levels to the weights to be used by arbitrator 605 and/or QoS-aware scheduler 630 in selecting an SQ/command queue from which to process a request. QoS-weight table 635 is discussed further with reference to FIGS. 7A-7B below.

As mentioned above, arbitrator 605 may use a WRR algorithm to select the next SQ from which to process a request. The weights are assigned to each SQ (more accurately, to each QoS level, which is associated with an SQ). In general, requests from each SQ are processed in proportion to the weight assigned to that SQ relative to the total of the weights. Mathematically, if the weight assigned to SQ k is $w_k$ and there are a total of n SQs, then requests from SQ k are processed $$\frac{w_k}{\sum_{i=1}^{n} w_i}\%$$

or the time. Put another way, out of every $\sum_{i=1}^{n} w_i$ requests, $w_k$ of those requests are taken from SQ k.

In some embodiments of the disclosure, the weights may be determined in advance. But such an approach has the potential to favor requests associated with a high QoS level (for example, requests associated with NVM Set 320-1 of FIG. 3) to the point that requests associated with a low QoS level (for example, requests associated with NVM Set 320-4 of FIG. 3) might end up not being serviced in time to satisfy the QoS level. For example, consider the situation where 1000 requests associated with a low QoS level are pending in SQ 310-4 of FIG. 3, and requests associated with a high QoS level are issued at a sufficient rate that there is always at least one such request pending in SQ 310-1 of FIG. 3. The weights pre-assigned to the QoS levels could result in the last of the 1000 requests associated with the low QoS level to take so long to be satisfied that the QoS guarantee is not met.

By dynamically adjusting the weights, it may be possible to avoid this consequence. The weights may be dynamically adjusted to reflect the number of NSs at each QoS level, so that as the number of NSs at each QoS level change, the weights may be updated to reflect that fact. Thus, in the above example, SQ 330-4 of FIG. 3 may be assigned a weight that increases as the number of NSs increase, thereby ensuring that more requests are processed from SQ 330-4 of FIG. 3 and hopefully avoiding any requests not be serviced in time to meet the guarantee represented by the QoS level.

Note that while the example above, and the discussion below, focus on the number of NSs assigned to each QoS level, embodiments of the disclosure may use other criteria as well. Thus, weights may be dynamically adjusted for each QoS level based on other criteria: for example, the number of pending requests in the SQ.

Figure 7A:
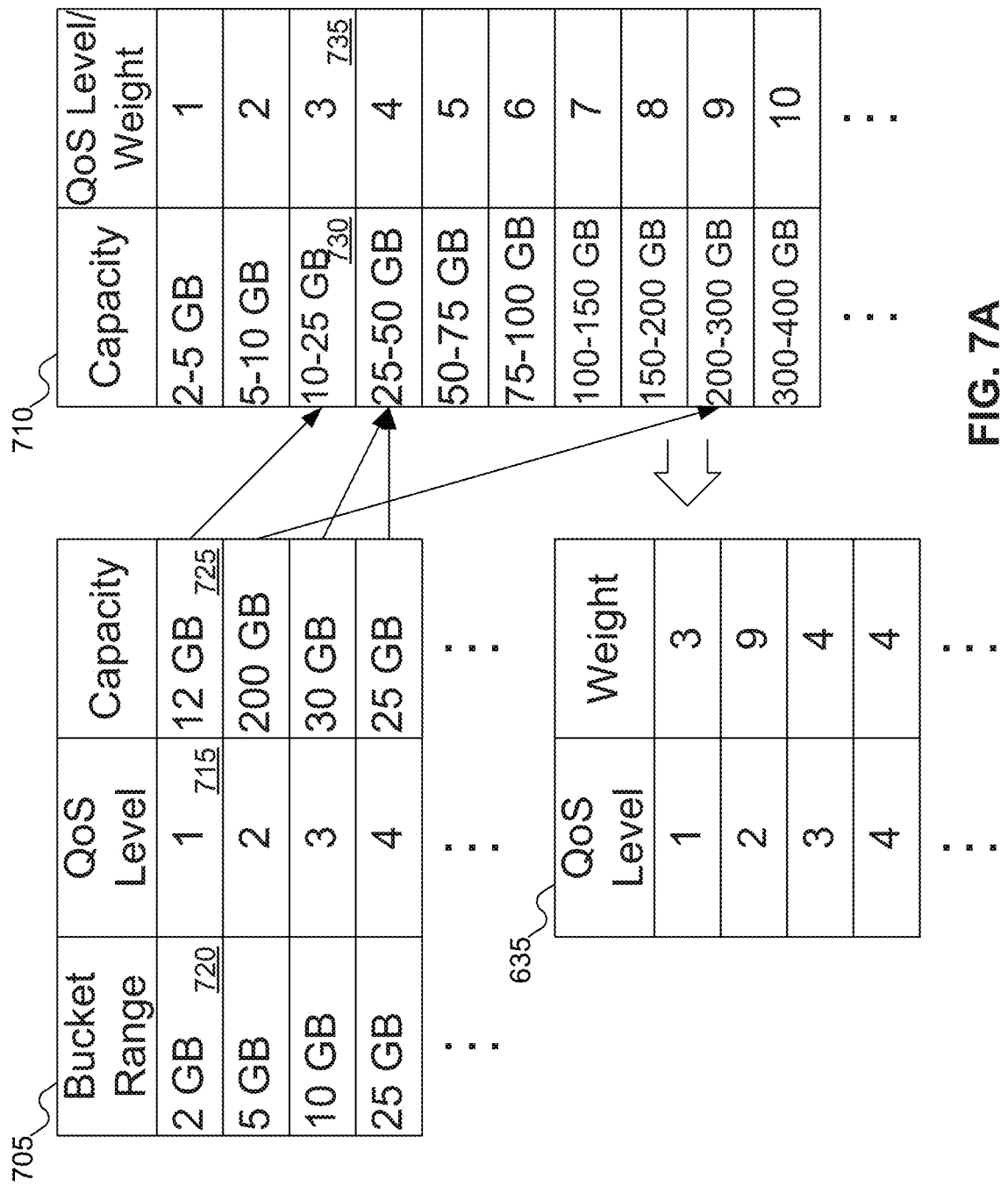
FIG. 7A shows managing weights for a scheduling algorithm implemented by the arbitrator of FIG. 6.

FIG. 7A shows managing weights for a scheduling algorithm implemented by arbitrator 605 of FIG. 6. In FIG. 7, three tables are shown: table 705, mapping QoS levels to sizes of NSs and showing the total storage capacity of all NSs at that QoS level, table 710, mapping different total capacities to weights, and finally QoS-weight table 635.

In table 705, each QoS level is associated with a particular bucket size. That is, for a given QoS level, all NSs associated with that level may store up to a certain amount of data (or may be allocated a fixed amount of data). Thus, for example, looking at QoS level 715 (QoS level 1), NSs associated with QoS level 715 are assigned to bucket 720 and may store up to 2 GB of data (or alternatively, may allocated 2 GB of storage on SSD 120 of FIG. 1). In the snapshot example shown in FIG. 7A, there may be six NSs associated with QoS level 715, for total storage capacity 725 of 12 GB for QoS level 715. Similarly, there may be 40 NSs associated with QoS level 2 (since there is a total storage capacity of 200 GB and each NS may be allocated 5 GB), three NSs associated with QoS level 3 (since there is a total storage capacity of 30 GB and each NS may be allocated 10 GB), and one NS associated with QoS level 4.

While the above discussion suggests that each QoS level has a fixed size for any NS allocated at that QoS level, embodiments of the disclosure may have NS capacities that may vary. For example, in some embodiments of the disclosure, the capacity allocated to an NS may be specified by the application when the NS is created, but the capacity should be within the range assigned to that QoS level. Thus, NSs assigned to QoS level 715 may request capacities from 0 GB to 2 GB, NSs assigned to QoS level 2 may request capacities from 2 GB to 5 GB, NSs assigned to QoS level 3 may request capacities between 5 GB and 10 GB, NSs assigned to QoS level 4 may request capacities between 10 GB and 25 GB, and so on (with the highest QoS level potentially permitting capacities in excess of the bucket range). In such embodiments of the disclosure, the largest permitted capacity for the bucket may be used in calculating the total capacity allocated to the QoS level, as that value represents an upper bound on the capacity allocated to that QoS level, or the actual capacity allocate to each NS may be determined and used in calculating the capacity allocated to that QoS level. Note that in such embodiments of the disclosure, host 105 of FIG. 1 may specify the QoS level for the NS as part of the NS create command.

In other embodiments of the disclosure, the size requested for the NS may dictate the QoS level to which the NS is assigned. That is, rather than the QoS level dictating the range of capacities permitted to an NS, the requested capacity of the NS may be used to determine the appropriate QoS level for that NS. In such embodiments of the disclosure, table 710 may be used to determine the QoS level to be assigned to the NS based on the allocated capacity for the NS. Note that in such embodiments of the disclosure, the host may not specify the QoS level for the NS, since the QoS level may be determined based on the capacity to be allocated for the NS.

For example, consider an NS for which the allocated capacity is specified to be 20 GB. As can be seen in table 710, entry 730 includes ranges between 10 and 25 GB into which 20 GB would fall. Thus, by requesting a capacity of 20 GB, this NS may be assigned to QoS level 735. (Note that table 705 may be used for this same purpose, as it maps bucket sizes to QoS levels in a similar manner.) NSs requesting larger allocated capacities may be assigned higher QoS levels; NSs requesting smaller allocated capacities may be assigned lower QoS levels. Note that table 710 thus serves two purposes: table 710 may be used to determine the QoS for an NS based on its allocated capacity, as well as the weight to be assigned to a particular QoS level based on the overall capacity allocated for that QoS level.

In yet other embodiments of the disclosure, there may be no limit on the capacity allocated to each NS. Thus, for example, an NS that may be mapped to QoS level 715 might have an allocated capacity of 100 GB. In such embodiments of the disclosure, as there may be no value that may be used to approximate the actual capacity of each NS, host interface layer 510 of FIG. 5 may track the allocated capacity for each NS, and may use this information in determining the allocated capacity for each QoS level.

Rather than having weights assigned based on the QoS level, the weights may be assigned based on the total storage capacity of the namespaces at the QoS level. Thus, table 710 may map from various total capacities to weights. For example, since QoS level 715 has total storage capacity 725 of 12 GB, and 12 GB is in range 730 of table 710, QoS level 715 may be assigned weight 735, with a value of 3. For similar reasons, QoS level 2 may be assigned a weight of 9, and QoS levels 3 and 4 may each be assigned a weight of 4, producing the values shown in QoS-weight table 635.

Since the weights associated with each QoS level in QoS-weight table 635 depend on the total storage capacity of the NSs at that QoS level, the weights may be adjusted dynamically as appropriate. But the weights do not need to be recomputed every time arbitrator 605 of FIG. 6 may select an SQ to process a request. Since total storage capacity 725 may depend on the number of NSs associated with a particular QoS level, the weights may be changed only when total storage capacity 725 changes, which in turn only changes when the number of NSs assigned to the QoS level changes. Thus, the weights may be adjusted when a NS is created or deleted; otherwise, the weights may remain unchanged.

As may be seen, since the weights may depend on the total storage capacity at a given QoS level, the more NSs assigned to an individual QoS level, the higher the weight for that QoS level is likely to be. Since it may be expected that more requests are generated at a given QoS level when there are more NSs at that QoS level, by determining the weights based on total storage capacity 725 of QoS level 715, more requests may be processed from SQs into which more NS requests are processed.

Figure 7B:
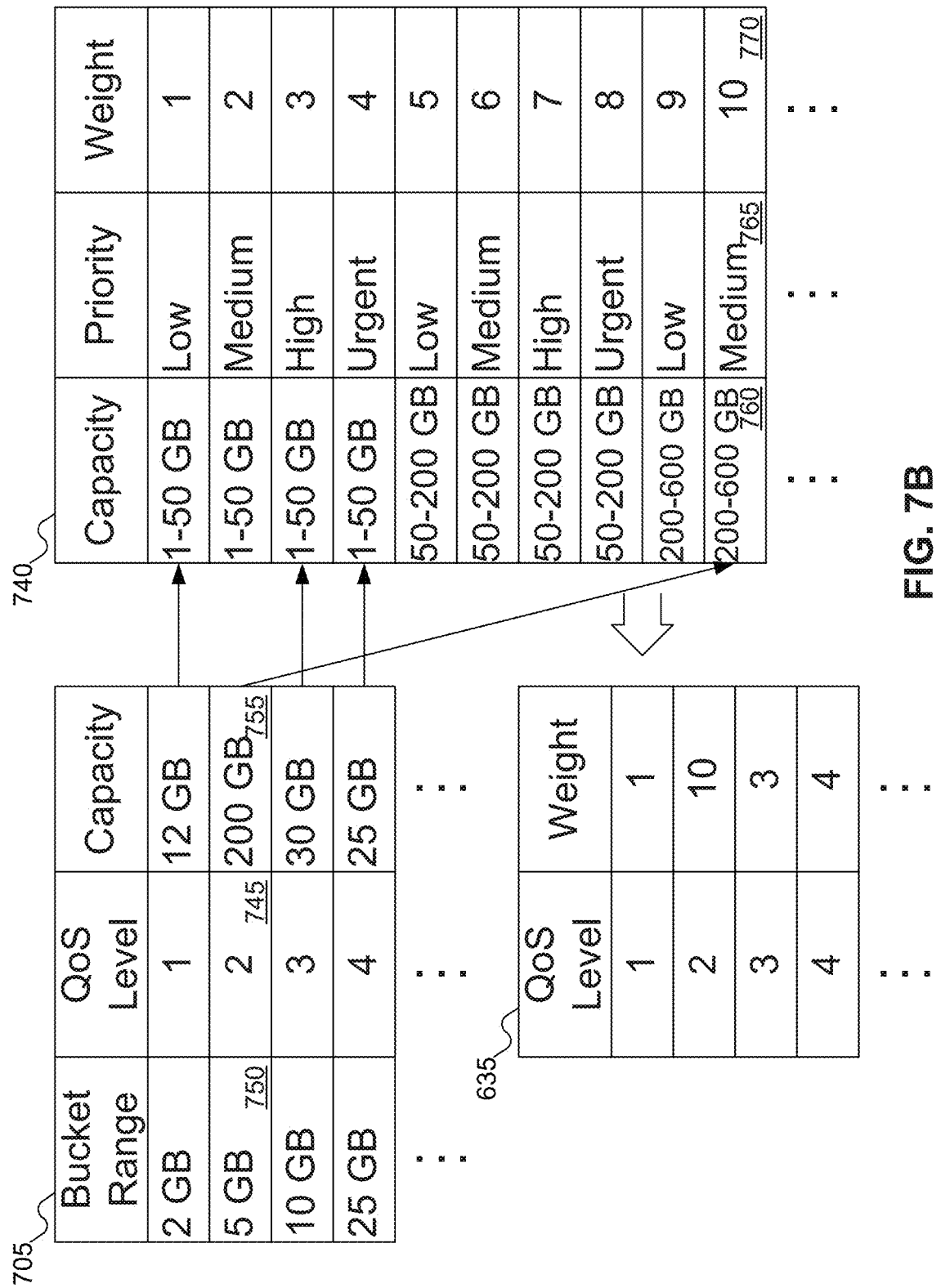
FIG. 7B shows managing weights for a scheduling algorithm implemented by the arbitrator of FIG. 6.

But removed from FIG. 7A is any reference to the QoS level itself, or more particularly, the guarantee promised for that QoS level. Note, for example, that QoS levels 3 and 4 have the same weight, meaning that requests from at these two QoS levels could be treated equally. This result may be contrary to the expectation that requests at QoS level 4 should take some priority over requests at QoS level 3. So while adjusting weights as described may help prevent requests at QoS level 2 from not being satisfied in time, the priority associated with each QoS level may be lost. FIG. 7B illustrates how to factor in priority as well.

FIG. 7B shows managing weights for a scheduling algorithm implemented by arbitrator 605 of FIG. 6. In FIG. 7, table 705 may be the same as in FIG. 7A. But table 740 may replace table 710. In table 740, the priority may be added as a column: thus, table 740 may map from the combination of a capacity range and a priority to a weight.

For example, in table 705, QoS level 745 (QoS level 2) may include bucket 750 of 5 GB in size, and total storage capacity 755 may be 200 GB (implying 40 NSs at QoS level 745). In table 740, there may be multiple entries for range 200-600 GB, but only the combination of range 760 and priority 765 fits for total storage capacity 755 and QoS level 745. Thus, for QoS level 745, weight 770 may be used: as shown in table 635, the weight for QoS level 2 is 10. But QoS levels 1, 3, and 4, all of which fall into the same capacity range in table 740, have different weights, reflecting the different priorities associated with those QoS levels.

Figure 8:
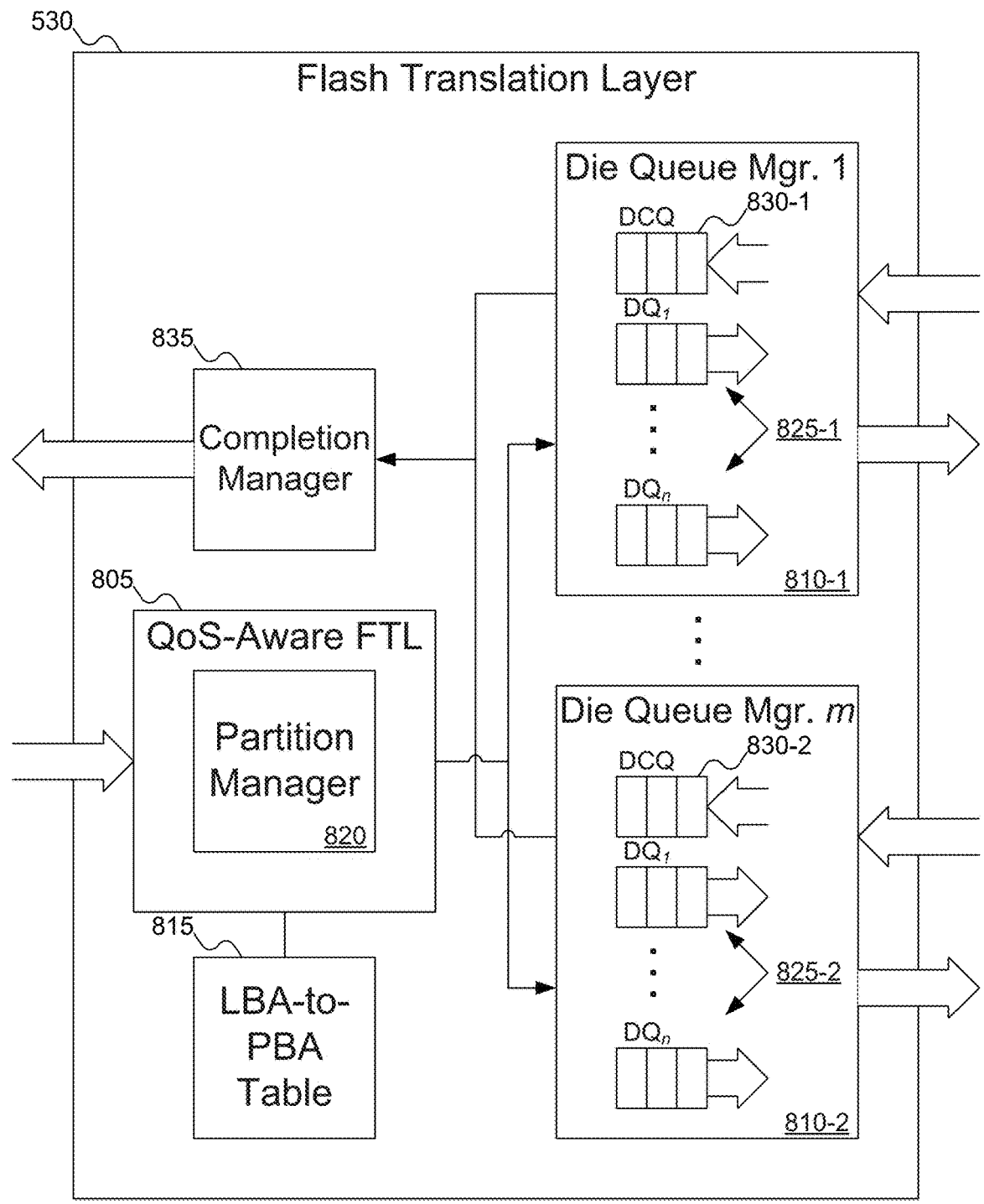
FIG. 8 shows details of the flash translation layer of FIG. 5.

FIG. 8 shows details of flash translation layer 530 of FIG. 5. In FIG. 8, flash translation layer 530 may include QoS-aware flash translation layer 805 and die queue managers 810-1 and 810-2. QoS-aware flash translation layer 805 may operate similar to a flash translation layer without QoS awareness (in that QoS-aware flash translation layer 805 may map LBAs to PBAs, as may be stored in LBA-to-PBA table 815, with commands routed appropriately based on the physical location where the data is to be written or read. But QoS-aware flash translation layer 805 may also help ensure tenant isolation. To that end, QoS-aware flash translation layer 805 may include partition manager 820, which may partition pages/blocks/superblocks in flash chips 525-1 through 525-8 of FIG. 5, with different partitions being used to store data associated with different QoS levels. Partitioning of pages/blocks/superblocks is discussed further with reference to FIGS. 9-11.

Die queue managers 810-1 and 810-2 may manage sending commands to flash chips 525-1 through 1905-8 of FIG. 5. Die queue managers 810-1 and 810-2 may each include various die queues 825-1 and 825-2, respectively, which may be used to queue commands to be sent to flash memory chips 525-1 through 525-8 of FIG. 5.

Between QoS-aware flash translation layer 805 and die queue managers 810-1 and 810-2, flash translation layer 530 may combine the QoS level associated with each NS with internal priorities that may be established by storage device 120 of FIG. 1. In combination, storage device 120 of FIG. 1 may offer priority based scheduling.

While FIG. 8 shows two die queue managers 810-1 and 810-2, embodiments of the disclosure may include any number (one or more, without bound) of die queue managers, although the number of die queue managers may correspond to the number of dies used to store data in flash chips 525-1 through 525-8 of FIG. 5. Similarly, die queue managers 810-1 and 810-2 may include any number (one or more, without bound) of die queues 825-1 and 825-2. For example, there may be one die queue 825-1 and 825-2 for each QoS level offered by the system, or there may be one die queue 825-1 and 825-2 for each priority level internal to storage device 120 of FIG. 1. In general, the higher the priority level assigned internally to an individual request by storage device 120 of FIG. 1, the faster the request may be completed.

Die queue managers 810-1 and 810-2 may also include die completion queues 830-1 and 830-2. Die completion queues 830-1 and 830-2 may receive results of commands issued to flash chips 525-1 through 525-8 of FIG. 5. For example, die completion queues 830-1 and 830-2 may receive data read from flash chips 525-1 through 525-8 of FIG. 5, or may receive the results of attempts to write data to flash chips 525-1 through 525-8 of FIG. 5. Completion manager 835 may access results from die completion queues 830-1 and 830-2 and deliver those results back to host completion queue arbitrator 645 of FIG. 6, for delivery back to the applications that originated the requests.

In some embodiments of the disclosure, flash translation layer 530 may include a garbage collection logic and/or a wear leveling logic (not shown in FIG. 8). Because garbage collection and/or wear leveling may involve changing the physical address where data is stored, having garbage collection logic and/or wear leveling logic as part of flash translation layer 530 simplifies the process of updating where data is stored in flash translation layer 530. But embodiments of the disclosure may place a garbage collection logic and/or a wear leveling logic in other locations within storage device 120 of FIG. 1 as well. Further, there may be more than one garbage collection logic and/or wear leveling logic (which may also be combined into a single logic). For example, if storage device 120 of FIG. 1 includes multiple flash translation layers 530, each flash translation layer 530 may have its own garbage collection logic and/or wear leveling logic. As discussed below with reference to FIG. 9, the garbage collection logic and/or wear leveling logic may operate within a single partition at a time, ensuring that any data moved from one block to another may remain within the partition in which the data was originally written.

Figure 9:
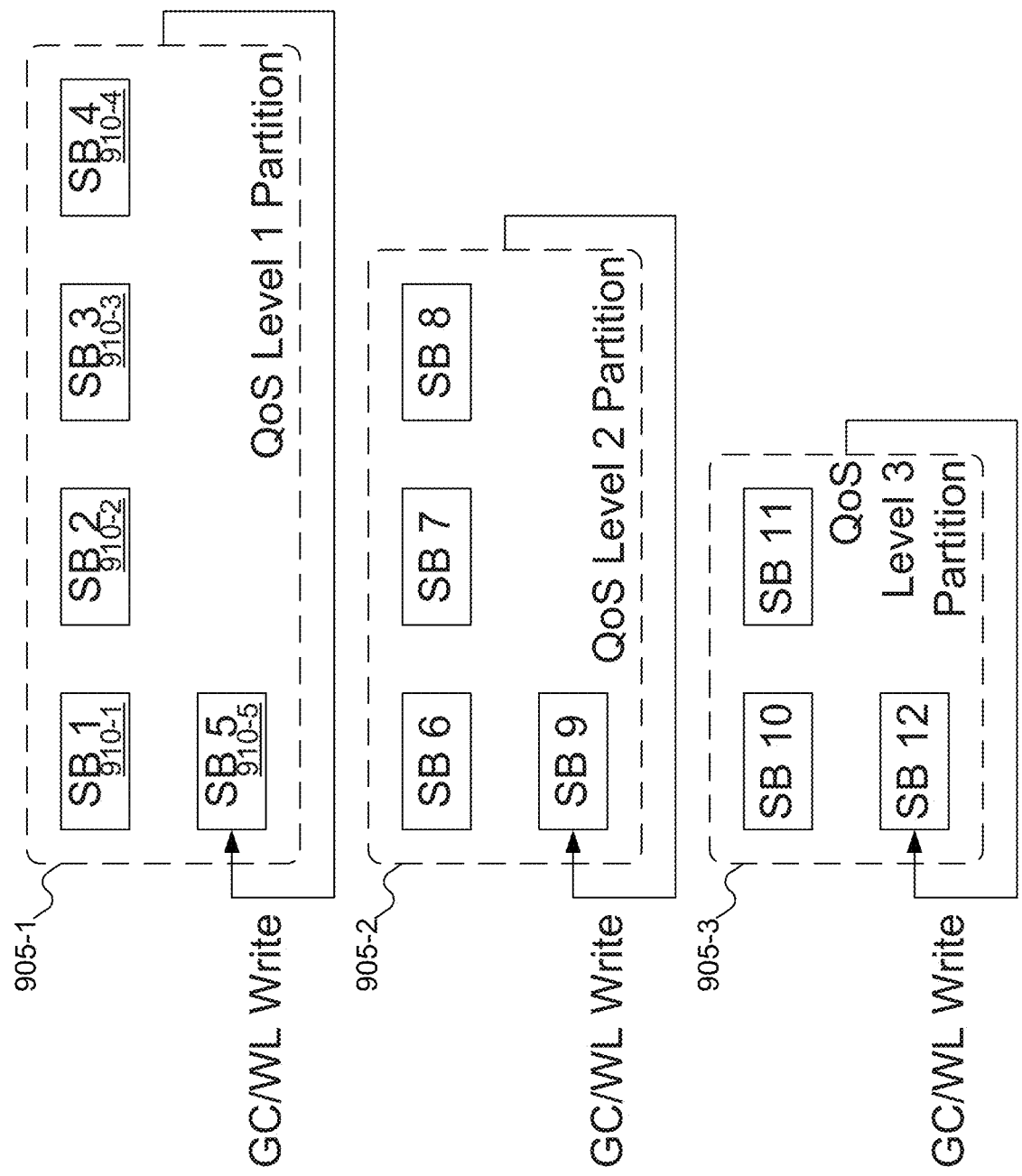
FIG. 9 shows partitions of superblocks in the SSD of FIG. 1.

As discussed above, storage within flash chips 525-1 through 525-8 of FIG. 5 may be organized into partitions, with partition manager 820 managing what storage is assigned to each partition. FIG. 9 shows partitions of superblocks in SSD 120 of FIG. 1. As shown in FIG. 9, the term partition is intended to refer to a set of blocks (or superblocks) allocated to a particular QoS level: the term partition should not be interpreted to mean a pre-determined portion of storage with a fixed size (as in, for example, partitioning a hard disk into one or more volumes before formatting those volumes). It is also worth noting that from the perspective of host 105 of FIG. 1, any partitions in storage device 120 of FIG. 1 are not visible. Embodiments of the disclosure may include both host 105 of FIG. 1 and storage device 120 of FIG. 1, but host 105 of FIG. 1 may not be aware of how storage device 120 of FIG. 1 stores data.

In FIG. 9, partitions 905-1, 905-2, and 905-3 are shown. Each partition may include a number of superblocks: for example, partition 905-1 is shown as including superblocks 910-1, 910-2, 910-3, 910-4, and 910-5. Note that different partitions may include different numbers of superblocks: partition 905-2 is shown as including four superblocks, and partition 905-3 is shown as including three superblocks. A partition may include any number (zero or more, without bound) of superblocks (although if a partition stores any data, there would be at least one superblock in the partition).

The use of partitions provides a mechanism by which tenants may be logically isolated from each other: or at least, tenants using different QoS levels may be logically isolated from each other. For example, partition 905-1 might be a partition storing data from NSs associated with NVM Set 320-4 of FIG. 3, partition 905-2 might be a partition storing data from NSs associated with NVM Set 320-3 of FIG. 3, and partition 905-3 might be a partition storing data from NSs associated with NVM Set 320-2 of FIG. 3 (with another partition, not shown in FIG. 9, storing data associated with NSs associated with NVM Set 320-1 of FIG. 3). There may be any number (zero or more, without bound) of partitions: in some embodiments of the disclosure, the number of partitions may correlate with the number of QoS levels or NVM Sets.

When data is to be written to storage device 120 of FIG. 1, QoS-aware flash translation layer 805 of FIG. 8 may use information about which QoS level the data is associated with (which may be determined, for example, using NS-QoS table 620 of FIG. 6) to identify the partition into which the data should be written. QoS-aware flash translation layer 805 of FIG. 8 may then select a superblock in the identified partition to store the data, and may update LBA-to-PBA table 815 of FIG. 8 to reflect the PBA where the data is ultimately stored. To that end, partition manager 820 of FIG. 8 may keep a list (which, in some embodiments of the disclosure, may be a sorted list) of which blocks and/or superblocks are allocated to each partition 905-1 through 905-3. Since partitions may grow and/or shrink over time based on as data is written to and invalidated from storage device 120 of FIG. 1, the number of superblocks in any partition is not fixed. Partition manager 820 of FIG. 8 may also keep a list (which, in some embodiments of the disclosure, may be a sorted list) of all free blocks and/or superblocks (that is, blocks not allocated to any partition, and which therefore may not be storing any data).

Each partition 905-1 through 905-3 may offer different levels of performance to the tenant storing data in partitions 905-1 through 905-3. Therefore, partition manager 820 of FIG. 8 may use different superblock allocation schemes for different partitions. For example, partitions 905-1 through 905-3 might be allocated superblocks that offer different parallelism, such as all NAND blocks being from a single channel, two NAND blocks each from two channels, or (more generally) i NAND blocks from j different channels (i and j may the same or different in value, and may each be some power of two or other values). Different superblocks may support different forms of traffic: for example, some superblocks may support one-way traffic across the channel(s), while other superblocks may support two-way traffic across the channel(s). Different superblocks may also include different numbers of NAND blocks: for example, superblocks allocated to partition 905-2 may each include two NAND blocks, whereas superblocks allocated to partition 905-3 may each include four NAND blocks. The superblock allocation scheme for an individual partition may be used whenever a new superblock is to be allocated to the partition: for example, when an application is writing data that does not fit in the available space in the partition, or when performing garbage collection, or when performing wear leveling.

Alternatively, superblocks may be allocated based on different NAND types. For example, partition 905-1 might be allocated superblocks that include Tri-Level Cells (TLCs), partition 905-2 might be allocated superblocks that include Multi-Level Cells (MLCs), and partition 905-3 might be allocated superblocks that include Single Level Cells (SLCs). Since TLC and MLC flash chips may store more data than SLC flash chips (but with slower performance), partitions 905-1 might include fewer superblocks than partition 905-2, which in turn might include fewer superblocks than partition 905-3 (which shows that superblock allocations schemes may combine both NAND type and parallelism approaches).

Of course, partition manager 820 of FIG. 8 could also use the same superblock allocation for two or more (up to all) of partitions 905-1 through 905-3.

In addition, different partitions may offer different services. For example, different partitions may offer different levels of Redundant Array of Independent Disks (RAID) support. One or more partitions might offer no RAID support, whereas other partitions might offer various levels of RAID. Thus, RAID levels within a partition may be used to support the promised QoS level. In addition, overprovisioning of storage device 120 of FIG. 1 may be allocated among different partitions, again based on QoS levels.

It may happen that there is insufficient storage in any individual superblock in the partition: that is, there may not be enough pages/blocks/superblocks that are in a free state to store the data. For example, if partition 905-1 is selected to handle a write request but superblocks 910-1 through 910-5 do not have enough free pages to store the data, then a new superblock may need to be allocated to partition 905-1. This situation also arises the first time any data is written to a partition: since the partition may not contain data before that first write, there may be no superblocks allocated to the partition. Partition manager 820 of FIG. 8 may then allocate a new superblock to partition 905-1 (so that the new data may be written), add the newly allocated superblock to the list of superblocks in partition 905-1, then write the data to a PBA in the newly allocated superblock.

As discussed above, storage in an SSD may be in one of three states: free (nothing written to the storage), valid (data is written to the storage), or invalid (valid data was written to the storage but has since been invalidated). Further, storage is typically erased in larger units than data is written: for example, data may be written one page at a time, but erased one block at a time. As a result, storage in an SSD may become a fragmentary map of valid and invalid data in blocks. If the SSD were to wait until all data was invalidated in a block before erasing that block, the SSD could enter a state where there is no room to write new data, even though only a portion of the SSD stores valid data. To resolve this problem, SSDs may use garbage collection logic.

Garbage collection logic, which may be implemented using an FPGA, an ASIC, or code running on a CPU, GPU, or GPGPU, and may be part of SSD controller 515 of FIG. 5, flash translation layer 530 of FIG. 5, or included elsewhere within SSD 120 of FIG. 1, checks the amount of free storage on the SSD. If the amount of free storage drops below a threshold (or some other trigger condition is met), garbage collection logic may identify a block that contains invalid data (and ideally, contains as much invalid data as possible). Garbage collection logic may then read any valid data out of the selected block and write that data to another block with free storage on the SSD (called programming) and update flash translation layer 530 of FIG. 5 to reflect the new location where the valid data is stored. Once all the valid data has been copied out of the selected block, the block may be erased, permitting new data to be written to the block. With tenant isolation by QoS levels, however, this process is changed slightly. Instead of programming valid data arbitrarily, garbage collection logic may program data into a superblock that is in the same partition. That is, garbage collection logic may operate within a partition, rather than across the SSD as a whole. This change explains why FIG. 9 shows garbage collection logic writes going into a superblock in the same partition. (Once the superblock is erased by the garbage collection logic, the superblock may be deallocated from the partition and the blocks in the superblock returned to the free block pool, or the superblock may be left allocated to the partition for future data writes.)

In some embodiments of the disclosure, partition manager 820 of FIG. 8 may allocate a new superblock to a partition to be used when garbage collection is performed. That is, when garbage collection is performed, a new superblock may be added to the partition, and all valid data in a superblock to be erased by the garbage collection logic may be programmed into this new superblock. Then, once garbage collection is complete, that newly added superblock may be used to write other data received from applications 405-1 and 405-2 of FIGS. 4A-4C. In other embodiments of the disclosure, the garbage collection logic may program valid data from a superblock to be erased into any available free space in existing superblocks in the partition, and a new superblock may be allocated to the partition only if there is insufficient free space in the partition for all valid data to be programmed by the garbage collection logic. Wear leveling may use similar approaches to garbage collection regarding allocating new superblocks to the partition, as needed.

Another aspect of SSDs is that flash chips 525-1 through 525-8 of FIG. 5 do not have an indefinite lifespan. Instead, each cell in flash chips 525-1 through 525-8 of FIG. 5 may have a finite number of write/erase cycles, after which the cell may not be guaranteed to correctly store written data. This number of write/erase cycles may depend on numerous factors, including, for example, the type of NAND used in flash chips 525-1 through 525-8 of FIG. 5. For example, SLC cells may be expected to undergo 100,000 write/erase cycles before the data might be stored incorrectly, whereas MLC might have an upper bound of 10,000 write/erase cycles, TLC might have an upper bound of 1000 write/erase cycles, and Quad Level Cells (QLCs) might have an upper bound of only 100 write/erase cycles.

Because the number of write/erase cycles that a cell may experience before errors may occur is finite, SSDs attempt to keep the number of write/erase cycles even across all cells, as much as is possible. So if one block has experienced several write/erase cycles while another block has experienced only a few write/erase cycles, flash translation layer 530 of FIG. 5 might favor the latter block to write newly received data. This process is called wear leveling. But again, since tenant isolation by QoS levels is desired, wear leveling logic should direct data to be written into a superblock in the appropriate partition. Thus, even though a superblock in the partition may have room for the data, a new superblock, with fewer write/erase cycles, might be allocated to the partition and the data might be written to that superblock instead.

In addition to each partition potentially having its own RAID level, each partition may have its own rules regarding when and how to run garbage collection and/or wear leveling. That is, one partition might indicate that garbage collection should be performed when the number of free blocks is at 40% of the total possible free blocks for that partition, whereas another partition might indicate that garbage collection should be performed when the number of free blocks is at 20% of the total possible free blocks for that partition. Wear leveling may similarly be applied different in different partitions. In addition, because garbage collection and wear leveling may be performed within a single partition, garbage collection and wear leveling operations in one partition should not affect or interfere with operations in another partition.

To support garbage collection and wear leveling as described, storage device 120 of FIG. 1 may include one or more garbage collection logics and/or wear leveling logics (not shown in the drawings). If storage device 120 of FIG. 1 includes enough garbage collection logics and/or wear leveling logics so that each partition 905-1 through 905-3 may have its own garbage collection logic and/or wear leveling logic, then each garbage collection logic and/or wear leveling logic may be dedicated to an individual partition. Alternatively, if there are fewer garbage collection logics and/or wear leveling logics than there are partitions (and even if there are enough garbage collection logics and/or wear leveling logics so that each partition may have its own garbage collection logic and/or wear leveling logic), the garbage collection logic(s) and/or wear leveling logic(s) may operate within one partition at a time. But in either case, the garbage collection logic(s) and/or wear leveling logics may be aware of the existence of partitions, and may ensure that any data programmed as a result of garbage collection and/or wear leveling are written to another superblock in that partition, so that data may be isolated from tenants in other partitions (and therefore tenants using other QoS levels).

The above discussion focuses on logical isolation among partitions 905-1 through 905-3. It may also be possible for partitions 905-1 through 905-3 to be physically isolated from each other. For example, referring back to FIG. 5, eight flash chips 525-1 through 525-2 are shown. If each flash chip 525-1 through 525-8 stores data associated with only one QoS level, then the fact that data for different QoS levels are stored on different flash chips may provide physical isolation as well as logical isolation. Thus, the superblock allocation scheme used by partition manager 820 of FIG. 8 may attempt to isolate superblocks as well physically as well as logically.

Returning to FIG. 9, while the above discussion focuses on partitions 905-1 through 905-3 being used to logically isolate data for different QoS levels, partitions 905-1 through 905-3 may also be assigned to individual tenants. That is, partition 905-1 may be used to store data for tenant 1, partition 905-2 may be used to store data for tenant 2, and so on. In this manner, partitions 905-1 through 905-3 may be used to logically isolate individual tenants as well as data for different QoS levels. In such embodiments of the disclosure, there may end up being multiple partitions that are associated with the same QoS level (for example, if two tenants are both using NSs at QoS level 1 and partitions are assigned to individual tenants, then there would be two partitions associated with QoS level 1).

While the discussion above focuses on the management of partitions using superblocks, embodiments of the disclosure may use other units of storage to organize partitions. For example, partitions may be organized using pages or blocks. Any reference to superblocks above should be understood as also applying to blocks and/or pages.

FIG. 10 shows an alternative view of partitions 905-1 through 905-3 of FIG. 9 of superblocks 910-1 through 910-5 of FIG. 9 in SSD 120 of FIG. 1. In FIG. 10, blocks 910-1 through 910-5, along with blocks 1005-1 through 1005-11, are shown. Different crosshatching may indicate to which partition a superblock is allocated. Thus, for example, superblocks 910-1 through 910-5 may be allocated to partition 905-1 of FIG. 9, superblocks 1005-2, 1005-6, 1005-7, and 1005-8 may be allocated to partition 905-2 of FIG. 9, and superblocks 1005-3, 1005-5, and 1005-10 may be allocated to partition 905-3 of FIG. 9. Free block pool 1010 may identify that superblocks 1005-1, 1005-4, 1005-9, and 1005-11 are currently free and available to be allocated to any partition as needed (according to the appropriate superblock allocation schemes for the QoS levels). The organization shown in FIG. 10 may depict an example of superblock allocation where any superblock may be allocated to any partition.

Figure 11:
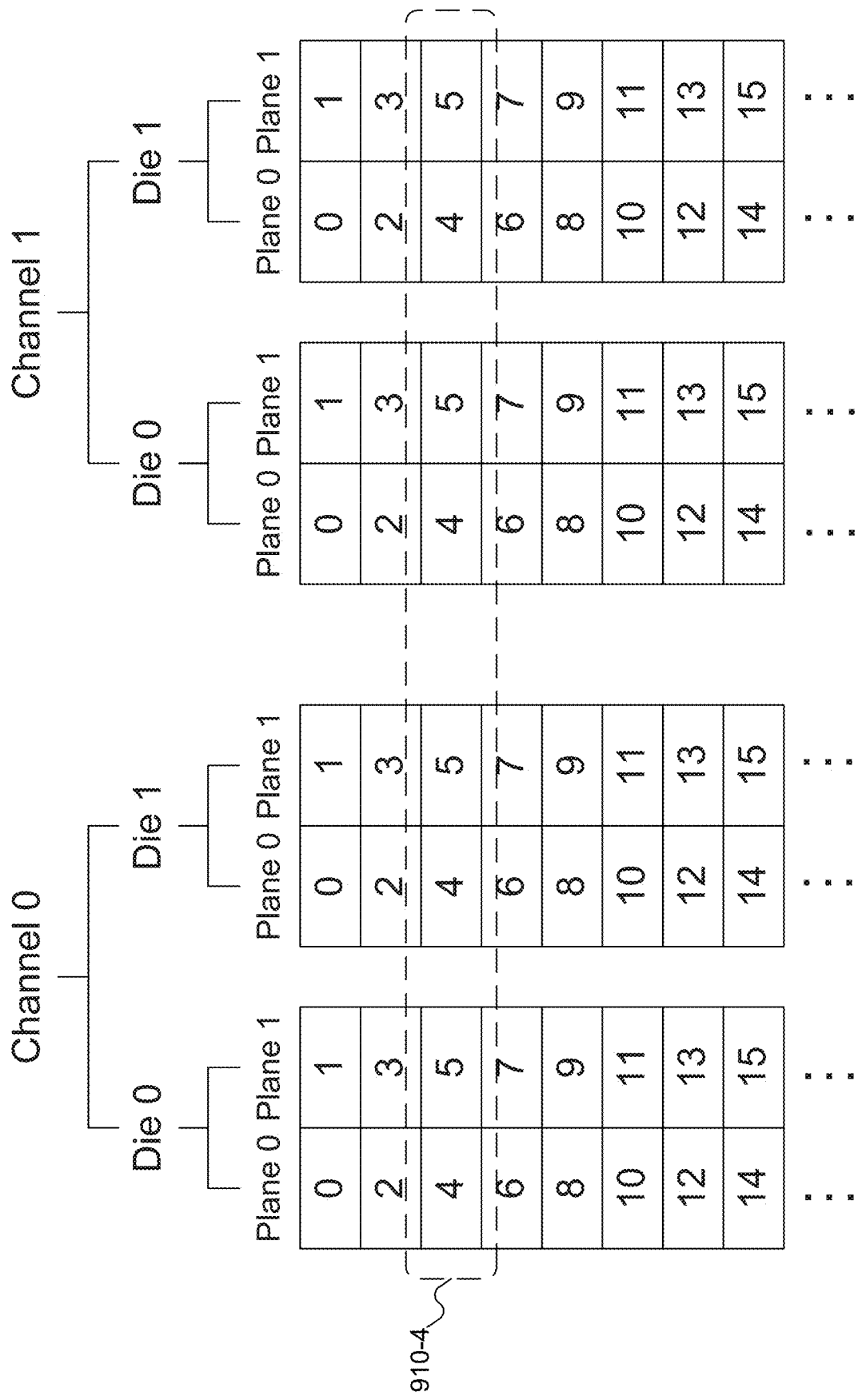
FIG. 11 shows a superblock in the flash chips of FIG. 5 in the SSD of FIG. 1.

FIG. 11 shows a superblock in flash chips 525-1 through 525-8 of FIG. 5 in SSD 120 of FIG. 1. In an SSD, blocks may be organized into planes, planes may be organized into dies, and dies may be organized into channels. Thus, FIG. 11 may effectively depict two example flash chips (one accessed via channel 0 and the other accessed via channel 1). Alternatively, if a single flash chip may support two channels, FIG. 11 may effectively depict a single flash chip that may be accessed across two channels.

Across these various channels, dies, and planes, superblock 910-4 is shown. Essentially, superblock 910-4 is a set of blocks that all have the same location within the plane, but differ from each other by at least one of the channel, die, or plane. This arrangement permits some parallelism to be introduced, which may expedite data reading and writing from the superblock.

Figure 12:
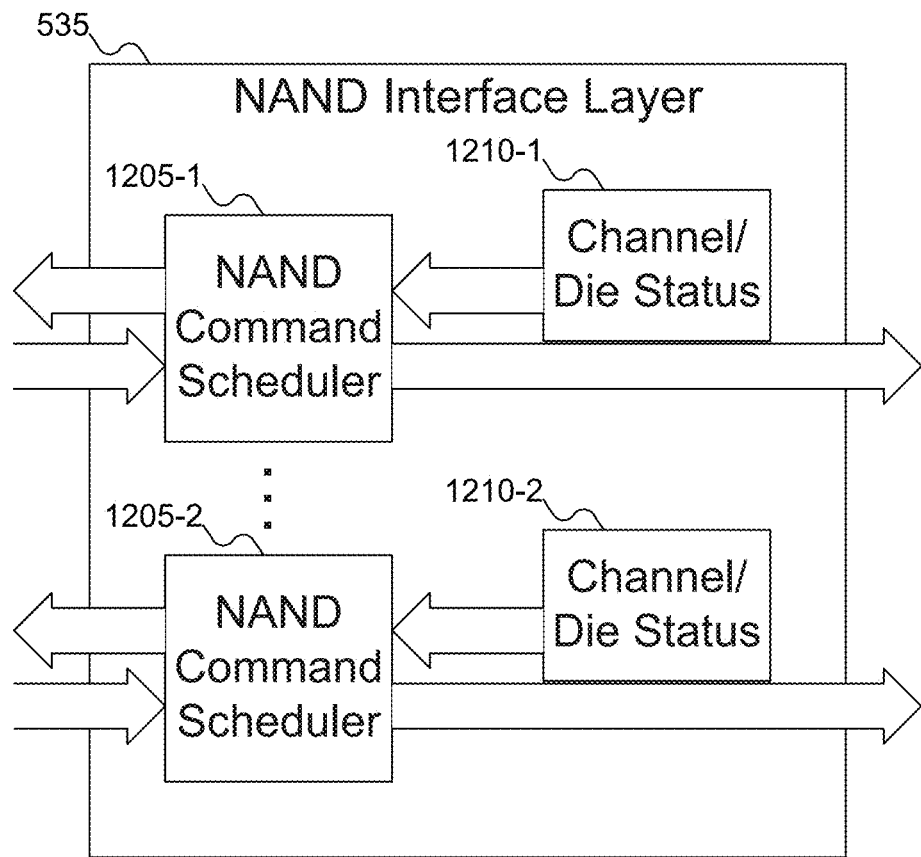
FIG. 12 shows details of the Not-And (NAND) interface layer of FIG. 5.

FIG. 12 shows details of NAND interface layer 535 of FIG. 5. In FIG. 12, NAND interface layer 535 is shown as including NAND command schedulers 1205-1 and 1410-2. NAND command schedulers 1205-1 and 1205-2 may receive commands from die queues 825-1 and 825-2 of FIG. 8. NAND command schedulers 1205-1 and 1205-2 may use any desired arbitration algorithm to select which die queue 825-1 and/or 1325-2 of FIG. 8 to access, and then to select an individual command from that die queue 825-1 and/or 1325-2 of FIG. 8. For example, NAND command schedulers 1205-1 and 1205-2 may use a WRR scheduling algorithm (but perhaps with pre-determined, fixed weights assigned to individual die queues 825-1 and/or 825-2 of FIG. 8, rather than the dynamic weights discussed above), and may use a FIFO selection algorithm to select the next command from die queues 825-1 and/or 825-2 of FIG. 8 to process. Thus, NAND command schedulers 1205-1 and 1205-2 may implement priority scheduling based on die queue priority levels (which may correspond to the QoS levels). Once command have been selected, NAND command schedulers 1205-1 and 1205-2 may send those commands to flash chips 525-1 through 525-8 of FIG. 5 across channels 520-1 through 520-4 of FIG. 5.

In addition, NAND interface layer 535 may include channel/die status units 1210-1 and 1210-2. Channel/die status units 1210-1 and 1210-2 may receive information from the channel/die with which the corresponding NAND command scheduler communicates. This information may include, for example, data read from flash chips 525-1 through 525-8 of FIG. 5, results of write commands, and other information about the status of flash chips 525-1 through 525-8 of FIG. 5. NAND command schedulers 1205-1 and 1205-2 may use this information to schedule commands to flash chips 525-1 through 525-8 of FIG. 5 (for example, if channel/die status units 1210-1 and/or 1210-2 indicates that the channel/die is busy, NAND command schedulers 1205-1 and 1205-2 may wait to schedule the next command until channel/die status units 1210-1 and/or 1210-2 indicate that the channel/die is idle). NAND command schedulers 1205-1 and 1205-2 may then return this information back to die completion queues 830-1 and 830-2 of FIG. 8.

While FIG. 12 shows two NAND command schedulers 1205-1 and 1205-2 and two channel/die status units 1210-1 and 1210-2, embodiments of the disclosure may include any number (one or more, without bound) of NAND command schedulers and channel/die status units. In some embodiments of the disclosure, there may be one NAND command scheduler and one channel/die status unit for each of channels 520-1 through 520-4 of FIG. 5. In addition, the number of NAND command schedulers and channel/die status units may differ: for example, one NAND command scheduler might send commands to flash chips along multiple channels, but each channel might have a dedicated channel/die status unit.

Figure 13:
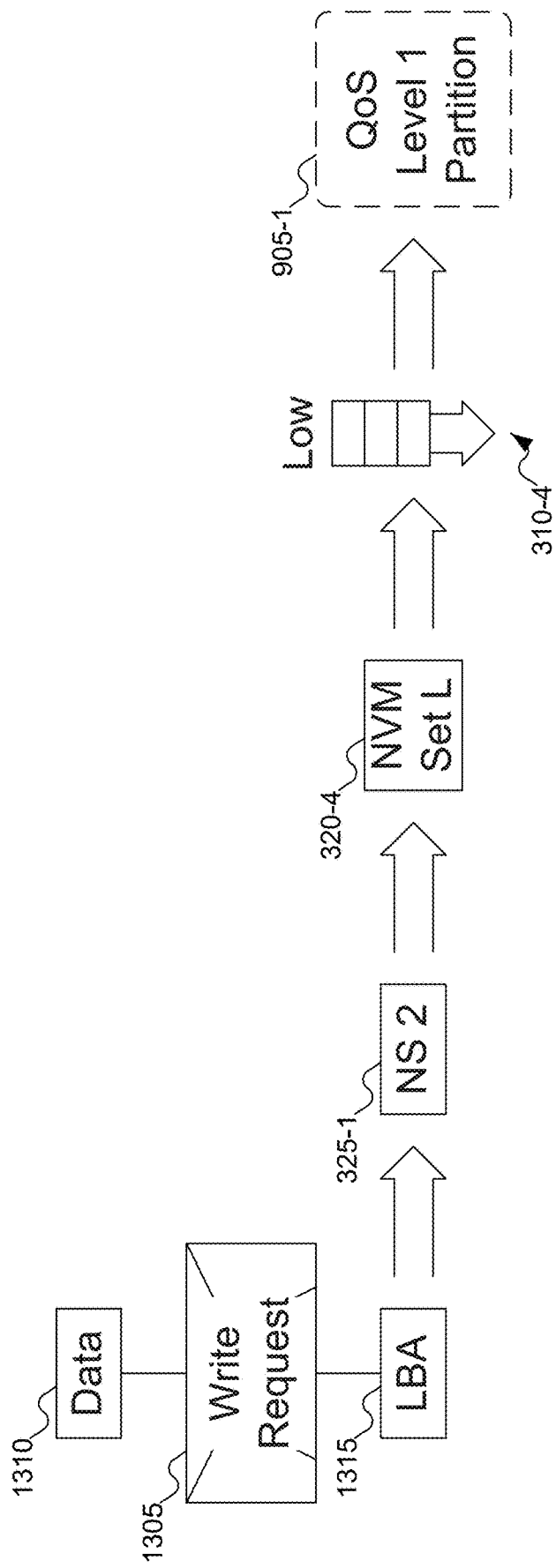
FIG. 13 shows a write request being associated with a Quality of Service (QoS) level.

FIG. 13 shows a write request being associated with a Quality of Service (QoS) level. In FIG. 13, write request 1305 is shown. Write request 1305 may include data 1310, which may have associated LBA 1315. LBA 1315 may be mapped to NS 325-1, since each NS (or at least, each NS associated with an individual application) may have a unique LBA range. (Alternatively, NS 325-1 may be included with write request 1305, in which case mapping LBA 1315 to NS 325-1 may be unnecessary.) NS 325-1 may be mapped to NVM Set 320-4, since each NS may be associated with a single NVM Set. NVM Set 320-4 may be mapped to SQ 310-4, since each NS may be associated with a single SQ (at least, within the core in which the application is running). Finally, SQ 310-4 may be mapped to a QoS level, which in turn may be mapped to partition 905-1. Thus, there may be a chain of associations that relates a particular write request down to the partition in storage device 120 of FIG. 1 where data 1310 may be stored.

While FIG. 13 focuses on write request 1305, embodiments of the disclosure may map a similar chain of associations for other I/O commands, such as a read command.

In the above discussion, the focus is on a single storage device, with its own controller. But a controller, such as SSD controller 515 of FIG. 5, may manage information stored in multiple SSDs. To support SSD controller 515 of FIG. 5 managing multiple storage devices, LBA-to-PBA table 815 of FIG. 8 may be augmented to include a column that identifies the storage device which stores data 1310 of FIG. 13 at the specified PBA, and by adding additional circuitry connecting flash translation layer 530 of FIG. 5 to additional storage devices. In such embodiments of the disclosure, the system of FIG. 1 may provide tenant isolation with tenants stored across multiple storage devices. In addition, by supporting storage on multiple storage devices, partition manager 820 of FIG. 8 may select superblocks across the multiple storage devices rather than just within a single storage device. Aside from partitions potentially spanning multiple storage devices, each storage device may be assigned to store data associated with only a single QoS level, thereby providing an additional approach to offer physical separation between tenants in different QoS levels.

Figure 14A:
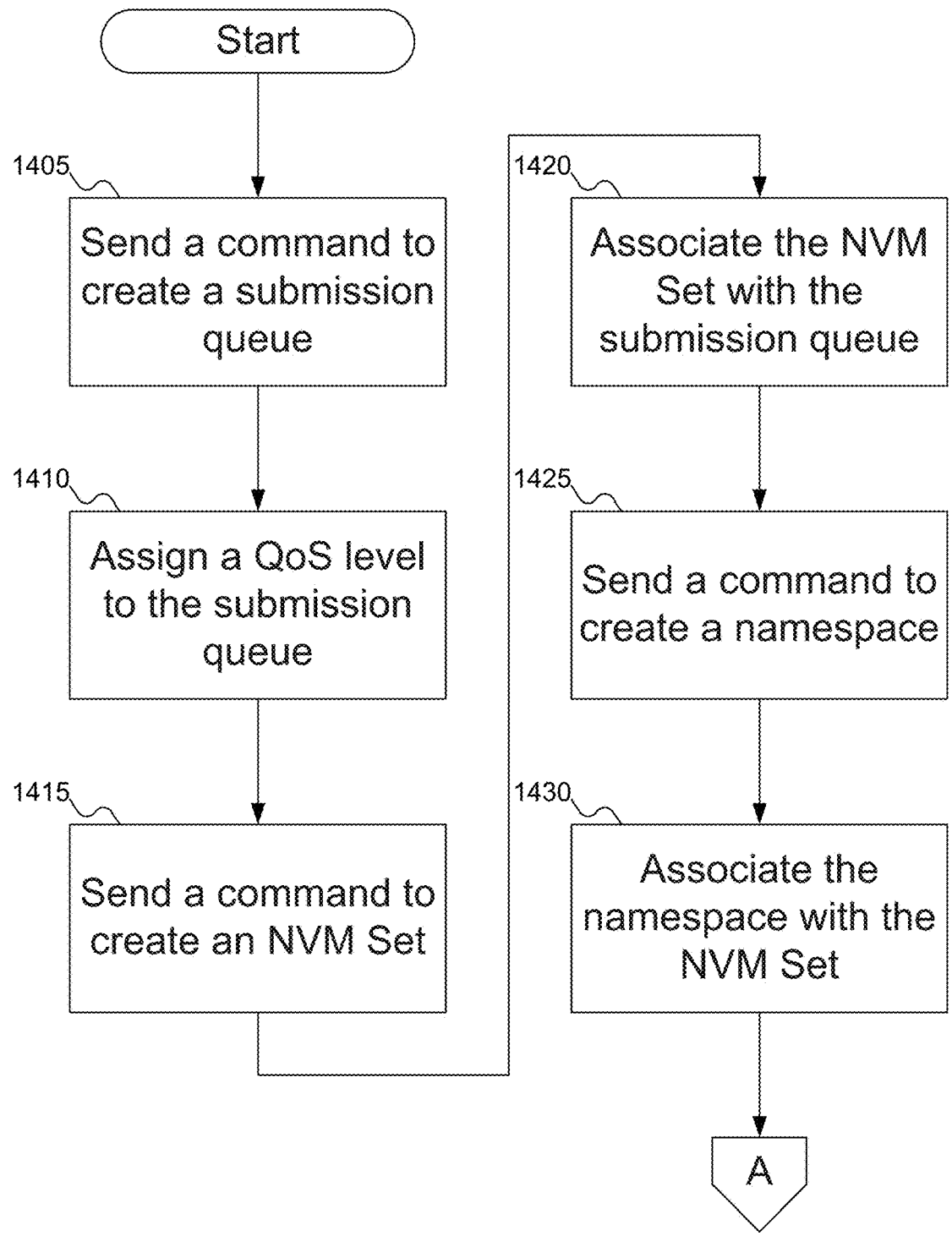
FIGS. 14A-14B show a flowchart of an example procedure for mapping the write request of FIG. 13 to an SQ of FIG. 3.
Figure 14B:
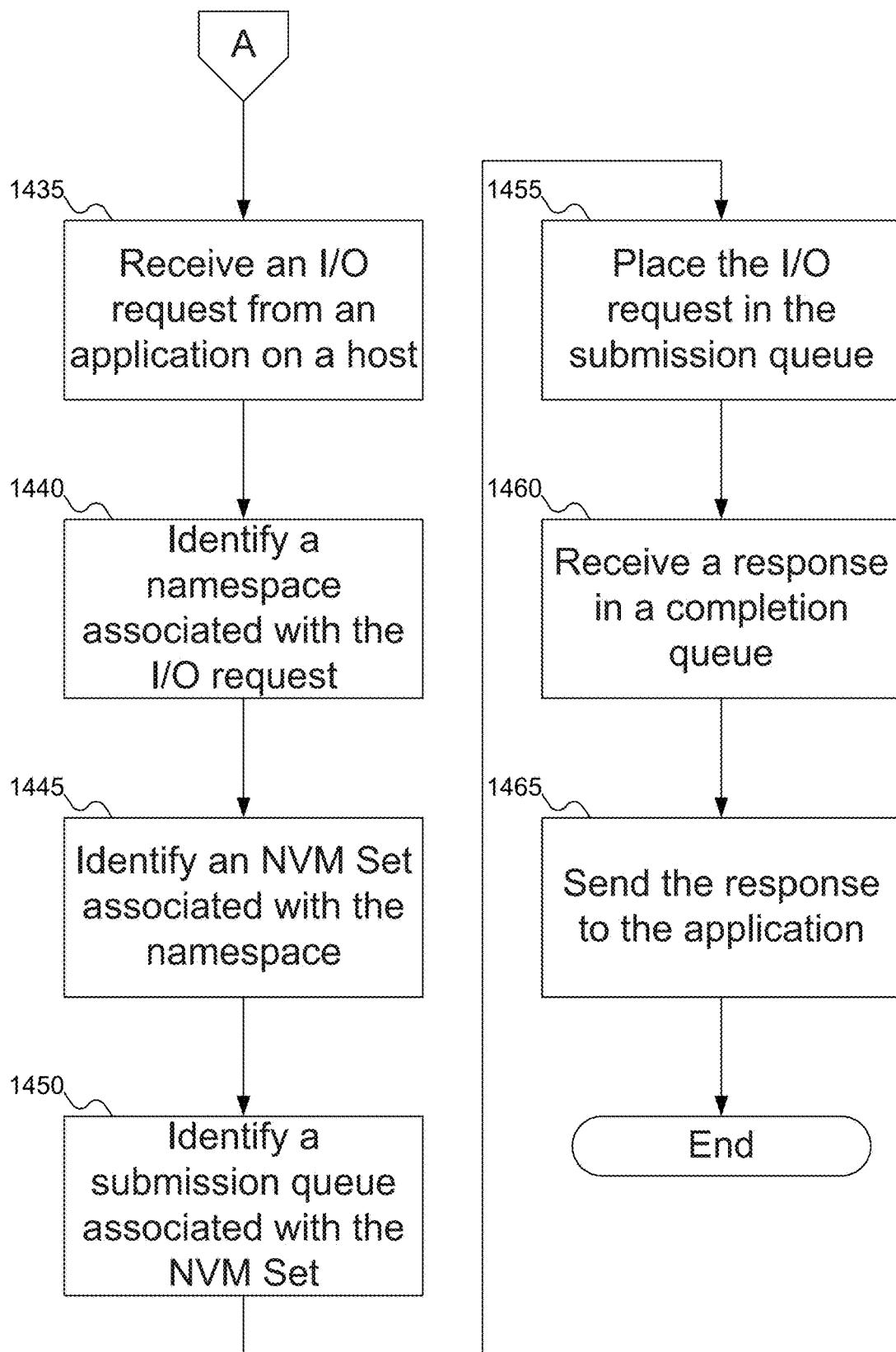

FIGS. 14A-14B show a flowchart of an example procedure for mapping write request 1305 of FIG. 13 to SQs 310-1 through 310-4 of FIG. 3. In FIG. 14A, at block 1405, host 105 of FIG. 1 may issue a command to create SQs 310-1 through 310-4 of FIG. 3. The command to create SQs 310-1 through 310-4 of FIG. 3 may be issued based on an instruction from an administrator. At block 1410, host 105 of FIG. 1 may assign QoS levels to SQs 310-1 through 310-4 of FIG. 3. The QoS levels may be assigned to SQs 310-1 through 310-4 of FIG. 3 based on an instruction from an administrator. As discussed above, this assignment may be part of the SQ create command, rather than a separate process. At block 1415, host 105 of FIG. 1 may issue a command to create NVM Sets 320-1 through 320-4 of FIG. 3. The command to create NVM Sets 320-1 through 320-4 of FIG. 3 may be issued based on an instruction from an administrator. At block 1420, host 105 of FIG. 1 may associate NVM Sets 320-1 through 320-4 of FIG. 3 with SQs 310-1 through 310-4 of FIG. 3. The QoS levels may be associated with NVM Sets 320-1 through 320-4 of FIG. 3 based on an instruction from an administrator. As discussed above, this association may be part of the SQ create command, rather than a separate process. Note that since the association between SQs 310-1 through 310-4 of FIG. 3 to NVM Sets 320-1 through 320-4 of FIG. 3 may be done through the command to create the SQ including an ID of the associated NVM Set, the order of these blocks may be adjusted to create NVM Sets 320-1 through 320-4 of FIG. 4 first.

At block 1425, an application may issue a command to create NSs 325-1 and 325-2 of FIG. 3. At block 1430, the application may associate NSs 325-1 and 325-2 of FIG. 3 with NVM Set 320-4 of FIG. 3. As discussed above, this association may be part of the NS create command, rather than a separate process.

At block 1435 (FIG. 14B), processor 110 of FIG. 1 may receive I/O request 1305 of FIG. 13 from application 405-1 or 405-2 of FIGS. 4A-4C. At block 1440, using LBA 1315 of FIG. 13 of I/O request 1305 of FIG. 13, processor 110 of FIG. 1 may identify NS 325-1 of FIG. 3 as associated with I/O request 1305 of FIG. 13. At block 1445, processor 110 of FIG. 1 may then identify NVM Set 320-4 of FIG. 3 based on an association between NS 325-1 of FIG. 3 and NVM Set 320-4 of FIG. 3. At block 1450, processor 110 of FIG. 1 may then identify SQ 310-4 of FIG. 3 based on an association between NVM Set 320-4 of FIG. 3 and SQ 310-4 of FIG. 3. Then, at block 1455, processor 110 of FIG. 1 may place I/O request 1305 of FIG. 13 in SQ 310-4 of FIG. 3.

Eventually, at block 1460, processor 110 of FIG. 1 may receive a response to I/O request 1305 of FIG. 1 in completion queue 315. At block 1465, processor 110 of FIG. 1 may then deliver the response to application 405-1 or 405-2 of FIGS. 4A-4C.

Figure 15A:
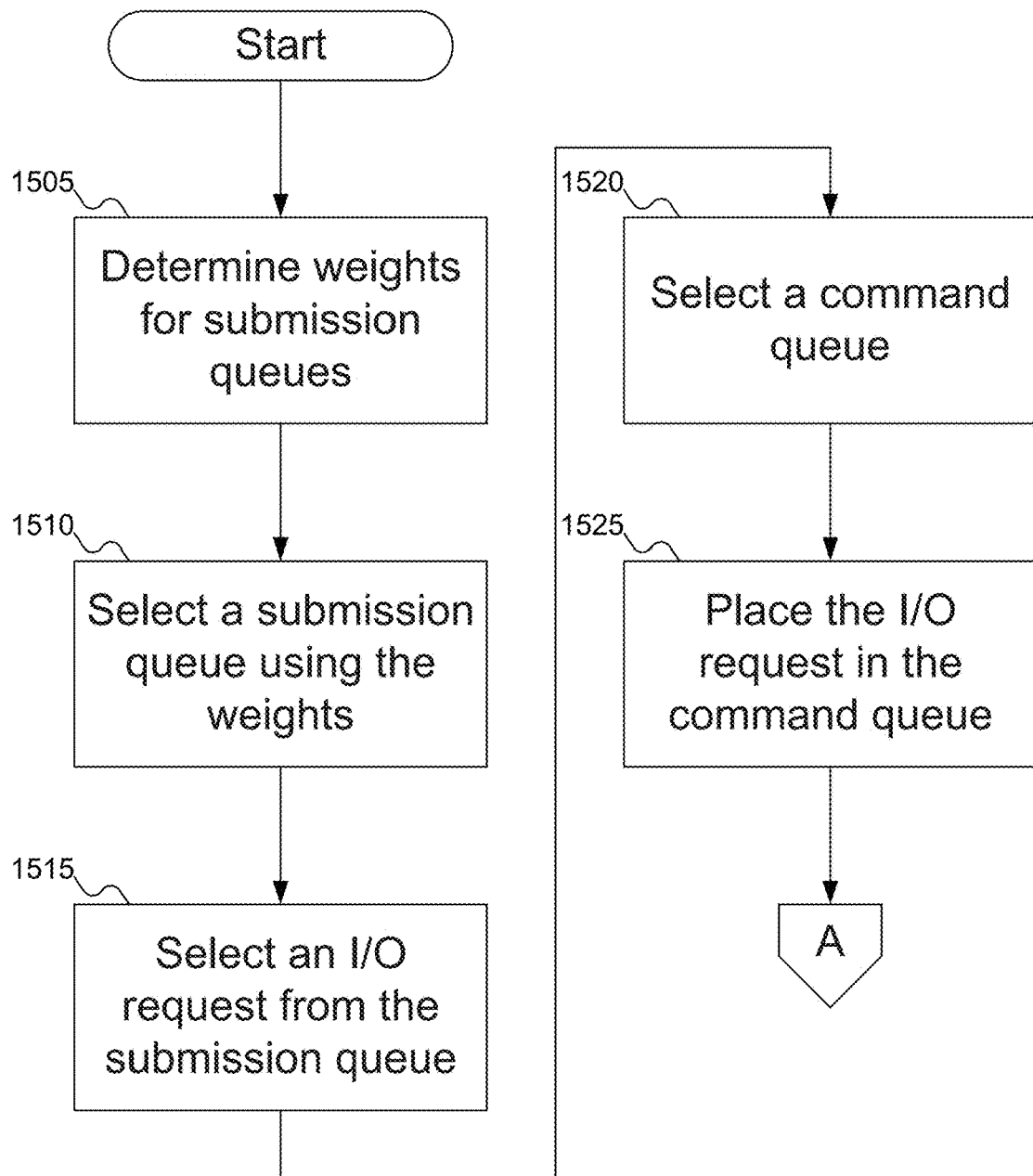
FIGS. 15A-15B show a flowchart of an example procedure for processing requests from the SQs of FIG. 3 by the host interface layer of FIG. 5.
Figure 15B:
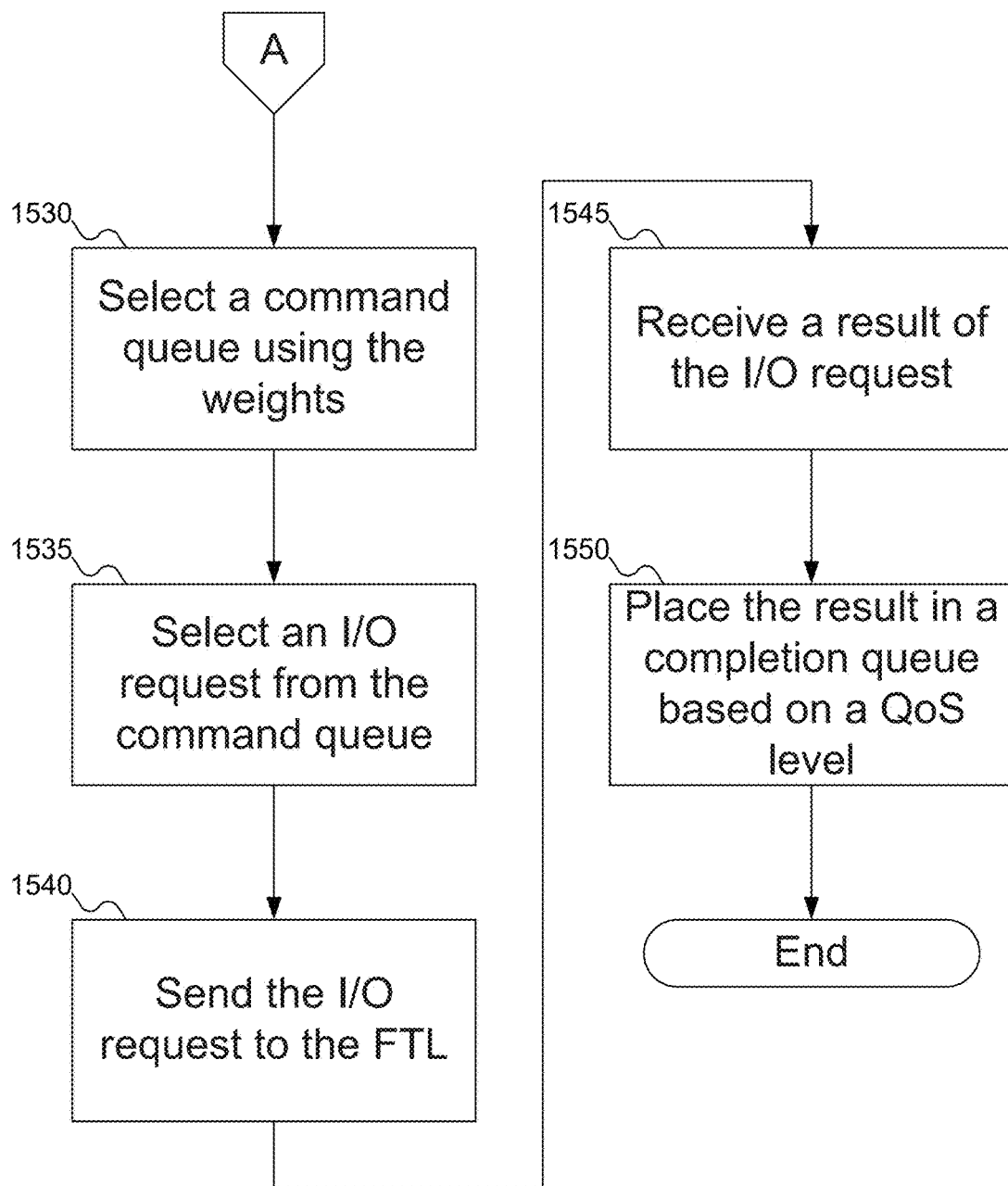

FIGS. 15A-15B show a flowchart of an example procedure for processing requests from SQs 310-1 through 310-4 of FIG. 3 by host interface layer 510 of FIG. 5. In FIG. 15A, at block 1505, arbitrator 605 of FIG. 6 may determine weights for SQs 310-1 through 310-4 of FIG. 3. As discussed above, the weights may be determined for the QoS levels, which (by virtue of associations with SQs 310-1 through 310-4 of FIG. 3) may be used for SQs 310-1 through 310-4 of FIG. 3. At block 1510, based on the weights, arbitrator 605 of FIG. 7 may select an SQ. At block 1515, command fetcher 610 of FIG. 6 may select I/O request 1305 of FIG. 13 from the selected SQ. At block 1520, command parser 615 of FIG. 6 may select command queue 625 of FIG. 6. At block 1525, command parser may place I/O request 1305 of FIG. 1 in selected command queue 625.

At block 1530 (FIG. 15B), QoS-aware scheduler 630 of FIG. 6 may select a command queue 625 of FIG. 6. At block 1535, QoS-aware scheduler 630 of FIG. 6 may select I/O request 1305 of FIG. 13 from command queue 625 of FIG. 6. At block 1540, QoS-aware scheduler 630 of FIG. 6 may send I/O request 1305 of FIG. 13 to flash translation layer 530 of FIG. 5.

At block 1545, host completion queue arbitrator 645 of FIG. 6 of FIG. 6 may receive a result of I/O request 1305 of FIG. 13 from flash translation layer 530 of FIG. 36. At block 1550, host completion queue arbitrator 645 of FIG. 6 may place the result in completion queue 315 of FIG. 3. Host completion queue arbitrator 645 of FIG. 6 may place results in completion queue 315 of FIG. 3 in the order in which results are received, or may reorder results to satisfy the QoS levels associated with the requests that generated the results. For example, if there is a result in the host completion queue associated with a high QoS level and another result in the host completion queue associated with a low QoS level, host completion queue arbitrator 645 may place the result associated with the high QoS level in completion queue 315 of FIG. 3 first, even if the result associated with the low QoS level was placed in the host completion queue first.

Figure 16:
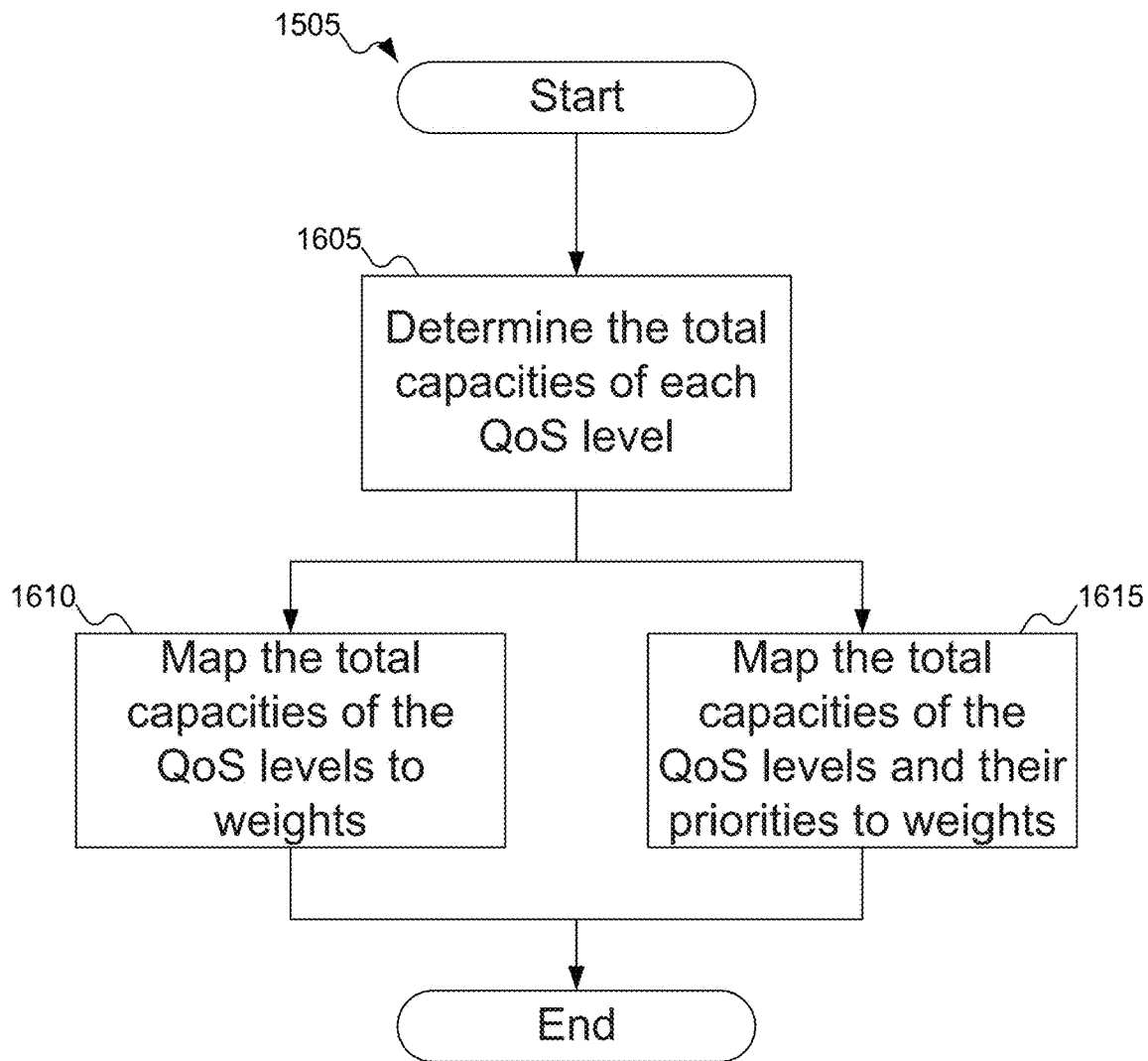
FIG. 16 shows a flowchart of an example procedure for determining weights used by the arbitrator of FIG. 6.

FIG. 16 shows a flowchart of an example procedure for determining weights used by arbitrator 605 of FIG. 6. In FIG. 16, at block 1605, arbitrator 605 of FIG. 6 may determine the total storage capacity of NSs assigned to each QoS level. As discussed above with reference to FIGS. 3 and 7A-7B, assuming that each NS associated with given NVM Set has the same storage capacity, the total storage capacity for a QoS level may be determined by multiplying the number of NSs associated with an NVM Set with the assigned storage capacity. Alternatively, the total storage capacity for a QoS level may be determined by summing the capacities of the individual NSs associated with a QoS level, or by determining a maximum capacity for all NSs at a QoS level and multiplying that maximum capacity by the number of NSs associated with that QoS level. At this point, alternatives exist. At block 1610, arbitrator 605 of FIG. 6 may map the total storage capacity of an individual QoS level to a weight using table 710 of FIG. 7A. Alternatively, at block 1610, arbitrator 605 of FIG. 6 may map the total storage capacity of an individual QoS level, combined with the QoS level, to a weight using table 740 of FIG. 7B.

Figure 17:
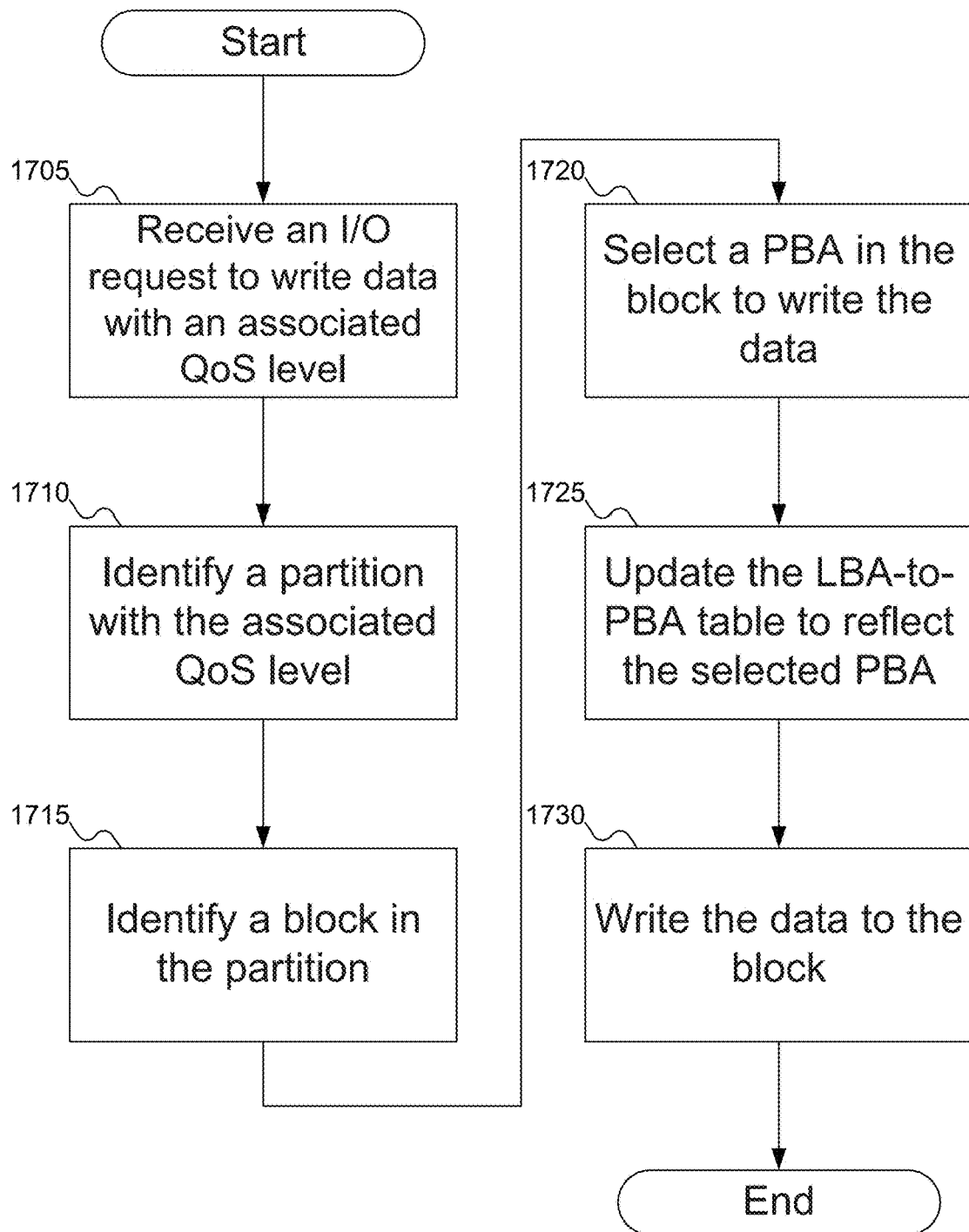
FIG. 17 shows a flowchart of an example procedure for writing data in the write request of FIG. 13 to a superblock in a partition of FIG. 9.

FIG. 17 shows a flowchart of an example procedure for writing data 1310 of FIG. 13 in write request 1305 of FIG. 13 to a superblock in partitions 905-1 through 905-3 of FIG. 9. In FIG. 17, at block 1705, QoS-aware flash translation layer 805 of FIG. 8 may receive an I/O request 1305 of FIG. 13. Based on command queue 625 through which I/O request 1305 of FIG. 13 is received, or using NS-QoS table 620 of FIG. 6, the request may be associated with a QoS level. At block 1710, QoS-aware flash translation layer 805 of FIG. 8 may select partition 905-1 with the associated QoS level. At block 1715, QoS-aware flash translation layer 805 of FIG. 8 may identify superblock 910-1 of FIG. 9 in partition 905-1 of FIG. 1, into which data 1310 of FIG. 13 may be written. At block 1720, QoS-aware flash translation layer 805 of FIG. 8 may select PBA for data 1310 of FIG. 13 within superblock 910-1 of FIG. 9. At block 1725, QoS-aware flash translation layer 805 of FIG. 8 may update LBA-to-PBA table 815 of FIG. 8 to reflect the PBA where data 1310 of FIG. 13 is stored. Finally, at block 1730, die queue manager 810-1 may use NAND interface layer 535 of FIG. 5 to write data 1310 of FIG. 13 to the PBA in superblock 910-1 of FIG. 9 in partition 905-1 of FIG. 9.

Figure 18:
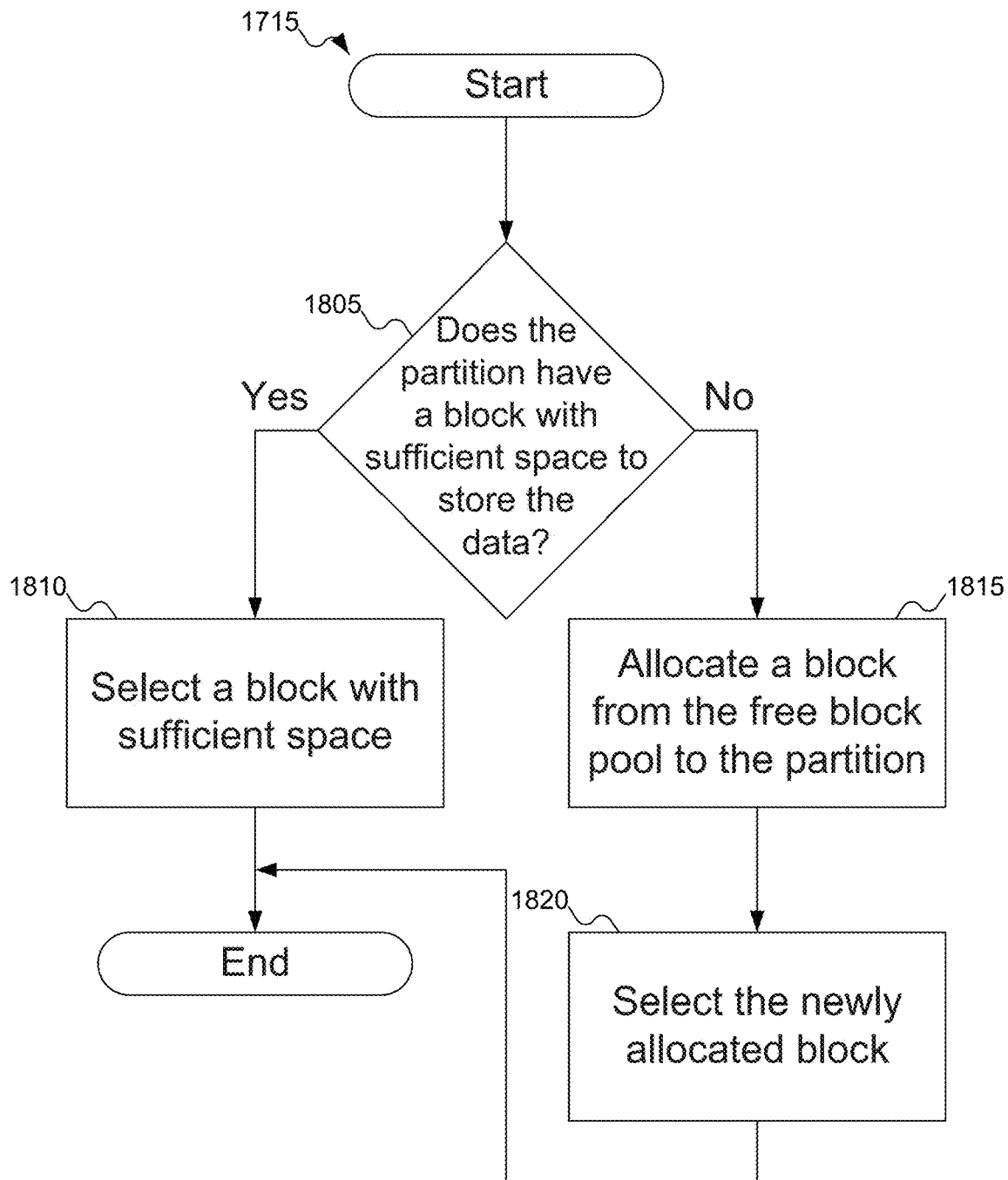
FIG. 18 shows a flowchart of an example procedure for selecting a superblock in a superblock in a partition of FIG. 9 into which the data in the write request of FIG. 13 may be written.

FIG. 18 shows a flowchart of an example procedure for selecting superblock 910-1 of FIG. 1 in partition 905-1 of FIG. 9 into which data 1310 of FIG. 13 in write request 1305 of FIG. 13 may be written. In FIG. 18, at block 1805, QoS-aware flash translation layer 805 of FIG. 8 may determine whether any superblock in partition 905-1 of FIG. 9 currently has sufficient free space to store data 1310 of FIG. 13. If there is at least one superblock 910-1 of FIG. 9 with sufficient free space to store data 1310 of FIG. 13, then at block 1810, QoS-aware flash translation layer 805 of FIG. 8 may select superblock 910-1 of FIG. 9 in partition 905-1 of FIG. 9 that has sufficient free space to store data 1310 of FIG. 13. On the other hand, if no superblock 910-1 of FIG. 9 in partition 905-1 of FIG. 9 has sufficient free space to store data 1310 of FIG. 13, then at block 1815, partition manager 820 of FIG. 1 may allocate a new superblock to partition 905-1 of FIG. 9, and at block 1820, QoS-aware flash translation layer 805 of FIG. 8 may select the newly allocated superblock in partition 905-1 of FIG. 9 to store data 1310 of FIG. 13.

While FIG. 18 focuses on writing data 1310 of FIG. 1 in response to write request 13105 of FIG. 13 issued by applications 405-1 and/or 405-2 of FIGS. 4A-4C, FIG. 18 is equally applicable for writing data based on garbage collection or wear leveling. Thus, the flowchart shown in FIG. 18 may also be used to select a superblock where data may be written as a result of garbage collection and/or wear leveling.

Figure 19:
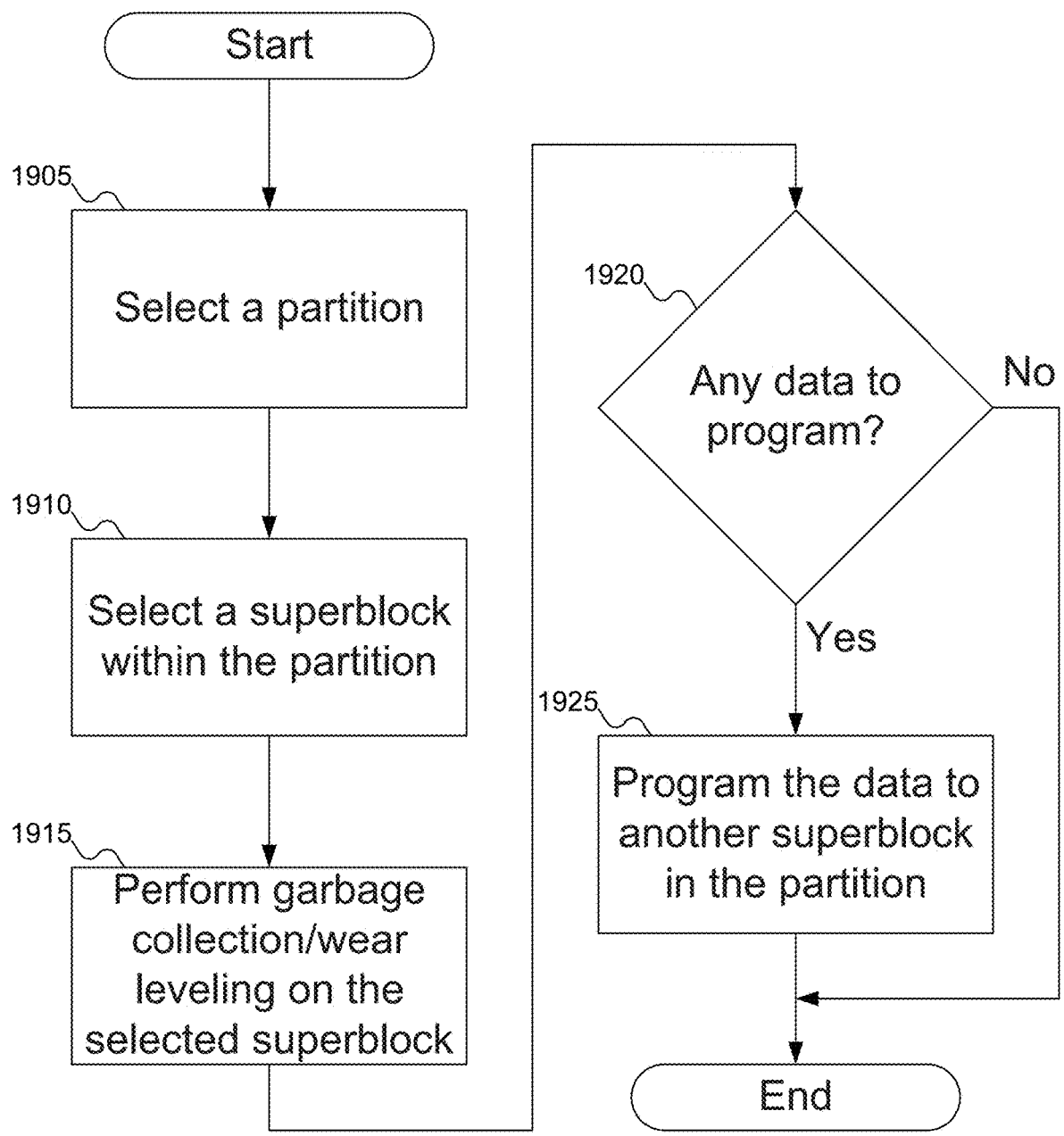
FIG. 19 shows a flowchart of an example procedure for performing garbage collection or wear leveling on a partition of FIG. 9.

FIG. 19 shows a flowchart of an example procedure for performing garbage collection or wear leveling on a partition of FIG. 9. In FIG. 19, at block 1905, a garbage collection and/or wear leveling logic may select partition 905-1 through 905-3 of FIG. 9. As described above, this garbage collection and/or wear leveling logic may be dedicated to partition 905-1 through 905-3 of FIG. 9, or this garbage collection and/or wear leveling logic may be configured to operate on any partition 905-1 through 905-3 of FIG. 9. At block 1910, the garbage collection and/or wear leveling logic may select a superblock in partition 905-1 through 905-3 of FIG. 9. At block 1915, the garbage collection and/or wear leveling logic may perform garbage collection and/or wear leveling on the selected superblock. At block 1920, the garbage collection and/or wear leveling logic may determine if there is any data to program from the selected superblock. If there is data to program from the selected superblock, then at block 1925, the garbage collection and/or wear leveling logic may program the data from the selected superblock into another superblock in the partition. This process may involve operations such as those described with reference to FIG. 18 above. Once any data that needs to be programmed from the selected superblock has been programmed, then the process is complete (although if the selected superblock now stores no valid data, then the selected superblock may be removed from the partition as described with reference to FIG. 20 below).

Figure 20:
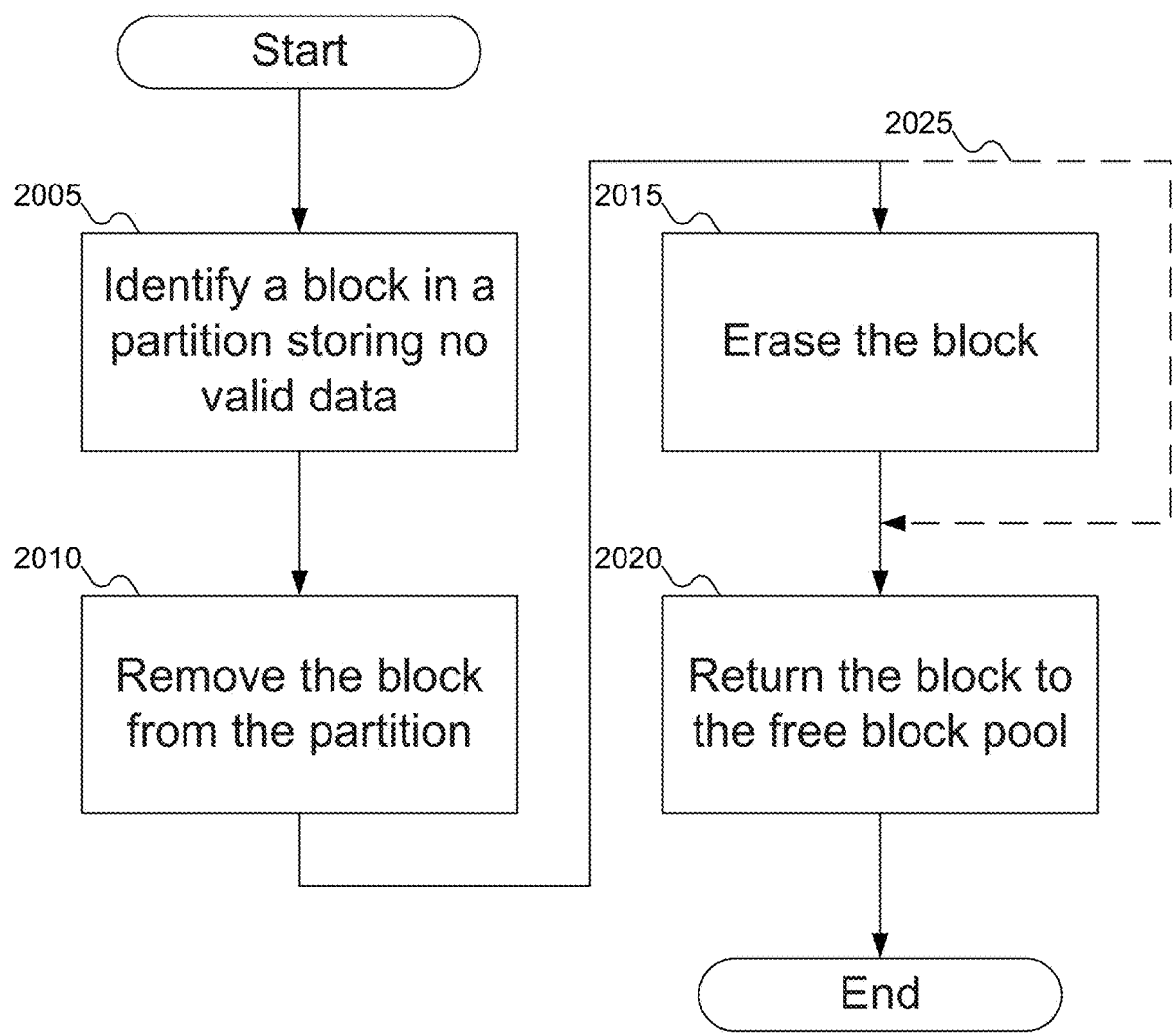
FIG. 20 shows a flowchart of an example procedure for removing a superblock from a partition of FIG. 9.

FIG. 20 shows a flowchart of an example procedure for removing a superblock from a partition of FIG. 9. In FIG. 20, at block 2005, partition manager 820 of FIG. 8 may identify superblock 910-1 of FIG. 9 in partition 905-1 of FIG. 9 that currently stores no valid data. Such a situation may arise when the data that was previously written to superblock 910-1 of FIG. 9 was invalidated by applications 405-1 and/or 405-2 of FIGS. 4A-4C, or when superblock 910-1 of FIG. 9 is selected for garbage collection, among other possibilities. Once superblock 910-1 of FIG. 9 that has no valid data has been identified, at block 2010, partition manager 820 of FIG. 8 may remove superblock 910-1 of FIG. 9 from partition 905-1 of FIG. 9. At block 2015, flash translation layer 530 of FIG. 5 may erase superblock 910-1 of FIG. 9. Finally, at block 2020, partition manager 820 of FIG. 8 may return superblock 910-1 of FIG. 9 to free block pool 1010 of FIG. 10.

As shown by dashed line 2025, block 2015 may be omitted. For example, it might happen that superblock 910-1 of FIG. 1 was allocated to partition 910-1 of FIG. 9 to store a small amount of data that was quickly invalidated (such as temporary application data). Since the majority of superblock 910-1 of FIG. 9 may be free to store other data, erasing the block at this juncture might be premature (for example, by using a write/erase cycle unnecessarily). In such situations, it might make sense to return superblock 910-1 of FIG. 9 to free block pool 1010 of FIG. 1 without erasing superblock 910-1 of FIG. 1 (the invalid data in superblock 910-1 of FIG. 9 may be ignored when superblock 910-1 of FIG. 1 is later used again to store data).

In FIGS. 14A-20, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure offer technical advantages over the prior art. First, by having QoS levels applicable in both the host and the storage device, end-to-end tenant isolation by means of QoS levels may be achieved. In addition, because the storage device also supports QoS levels, the burden on the host (in terms of attempting to ensure an SLA is satisfied) is reduced: the storage device may take some responsibility for ensuring that an SLA is satisfied. The host may set up SQs and NVM Sets that may be associated with individual QoS levels; when NSs are associated with NVM Sets, the NSs may inherit the QoS levels associated with the NVM Set, rather than having to separately establish the QoS level for the NS. Because NVM Sets may span processor cores, an application may run in any desired core and still realize the promised QoS (as opposed to having to run in a particular core to receive a particular QoS level benefit).

In the storage device, storage may be divided into partitions, each of which may be associated with a QoS level. This arrangement helps to provide tenant isolation, since a tenant that expects one QoS level may be logically isolated from a tenant that expects another QoS level. If the storage device offers some form of physical isolation (for example, multiple flash chips or disks), data may be written to specific locations that may physically isolate the tenant from tenants with other QoS levels as well.

Using dynamic weights, a WRR scheduling algorithm may be used that may recognize the priority for requests associated with different QoS levels, but may also prevent requests from waiting so long that the service promised by the QoS level might not be satisfied. The weights may be separated from the QoS level, and may be determined based on the total storage allocated to NSs at the QoS level.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosure s as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a system, comprising:
a processor;
a first submission queue (SQ) and a second SQ, the first SQ associated with a first Quality of Service (QoS) level and the second SQ associated with a second QoS level, the first QoS level different from the second QoS level; and
an application running on the processor and using a first namespace (NS),
wherein the processor is configured to receive a first Non-Volatile Memory (NVM) Set create command to establish a first NVM Set associated with the first SQ,
wherein the processor is configured to receive a second NVM Set create command to establish a second NVM Set associated with the second SQ,
wherein the processor is configured to receive a first NS create command to establish a first NS associated with the first NVM Set,
wherein the processor is configured to receive a second NS create command to establish a second NS associated with the second NVM Set, and
wherein the processor is configured to place an input/output (I/O) request sent from the application to at least one storage device in the first SQ based at least in part on the I/O request being associated with the first NS, the first NS being associated with the first NVM Set, and the first NVM Set being associated with the first SQ.

Statement 2. An embodiment of the disclosure includes the system according to statement 1, wherein the first SQ and the second SQ are owned by the processor.

Statement 3. An embodiment of the disclosure includes the system according to statement 1, wherein:
the system includes a memory; and
a first data for the first SQ and a second data for the second SQ are stored in the memory.

Statement 4. An embodiment of the disclosure includes the system according to statement 1, wherein:
the processor includes a first core and a second core;
the first core is associated with the first SQ and the second SQ; and
the second core is associated with a third SQ and a fourth SQ, the third SQ having the first QoS level and the fourth SQ having the second QoS level.

Statement 5. An embodiment of the disclosure includes the system according to statement 1, further comprising a completion queue to receive data from the at least one storage device.

Statement 6. An embodiment of the disclosure includes the system according to statement 1, wherein:
the first NVM Set is associated with a first partition of storage in the at least one storage device; and
the second NVM Set is associated with a second partition of storage in the at least one storage device.

Statement 7. An embodiment of the disclosure includes the system according to statement 6, wherein:
the at least one storage device includes a Solid State Drive (SSD);
the first partition of storage in the at least one storage device includes a first set of Not-AND (NAND) flash chips in the SSD; and
the second partition of storage in the at least one storage device includes a second set of NAND flash chips in the SSD.

Statement 8. An embodiment of the disclosure includes the system according to statement 7, wherein the first set of NAND flash chips in the SSD is physically separated from the second set of NAND flash chips in the SSD.

Statement 9. An embodiment of the disclosure includes the system according to statement 6, wherein the first partition of storage in the at least one storage device is logically separated from the second partition of storage in the at least one storage device.

Statement 10. An embodiment of the disclosure includes the system according to statement 1, wherein the at least one storage device supports the first QoS level and the second QoS level.

Statement 11. An embodiment of the disclosure includes a method, comprising:

receiving an input/output (I/O) request from an application running on a processor sent to at least one storage device;

identifying a namespace (NS) associated with the I/O request;

identifying a Non-Volatile Memory (NVM) Set based at least in part on a first association between the NS and the NVM Set, the NVM Set associated with a Quality of Service (QoS) level;

identifying a submission queue (SQ) based at least in part on a second association between the NVM Set and the SQ; and placing the I/O request in the SQ.

Statement 12. An embodiment of the disclosure includes the method according to statement 11, wherein the SQ is owned by the processor.

Statement 13. An embodiment of the disclosure includes the method according to statement 11, wherein a data for the SQ is stored in a memory.

Statement 14. An embodiment of the disclosure includes the method according to statement 11, further comprising:

receiving a response in a completion queue; and
sending the response to the application.

Statement 15. An embodiment of the disclosure includes the method according to statement 11, wherein the SQ is associated with the QoS level.

Statement 16. An embodiment of the disclosure includes the method according to statement 15, wherein the NVM Set is associated with the QoS level based at least in part on the SQ being associated with the QoS level.

Statement 17. An embodiment of the disclosure includes the method according to statement 16, wherein the NS is associated with the QoS level based at least in part on the NVM Set being associated with the QoS level.

Statement 18. An embodiment of the disclosure includes the method according to statement 11, wherein the NVM Set is associated with a first partition of storage in the at least one storage device.

Statement 19. An embodiment of the disclosure includes the method according to statement 18, wherein the storage device includes at least one Solid State Drive (SSD).

Statement 20. An embodiment of the disclosure includes the method according to statement 11, wherein receiving the I/O request from the application running on the processor includes receiving the I/O request from the application running in a first core of the processor, the processor including the first core and a second core.

Statement 21. An embodiment of the disclosure includes the method according to statement 11, further comprising:

receiving a second I/O request from the application running on the processor;

identifying a second NS associated with the second I/O request;

identifying a second NVM Set based at least in part on a third association between the second NS and the second NVM Set, the second NVM Set associated with a second QoS level;

identifying a second SQ based at least in part on a fourth association between the second NVM Set and the second SQ; and placing the second I/O request in the second SQ.

Statement 22. An embodiment of the disclosure includes the method according to statement 11, further comprising sending a command to the processor to create the SQ.

Statement 23. An embodiment of the disclosure includes the method according to statement 22, further comprising assigning the QoS level to the SQ.

Statement 24. An embodiment of the disclosure includes the method according to statement 11, further comprising sending a command to the processor to create the NVM Set.

Statement 25. An embodiment of the disclosure includes the method according to statement 24, further comprising associating the NVM Set with the SQ.

Statement 26. An embodiment of the disclosure includes the method according to statement 25, wherein the NVM Set inherits the QoS level from the SQ.

Statement 27. An embodiment of the disclosure includes the method according to statement 11, further comprising sending a command to the processor to create the NS.

Statement 28. An embodiment of the disclosure includes the method according to statement 27, further comprising associating the NS with the NVM Set.

Statement 29. An embodiment of the disclosure includes the method according to statement 28, wherein the NS inherits the QoS level from the NVM Set.

Statement 30. An embodiment of the disclosure includes an article, comprising a non-transitory storage medium, the non-transitory storage medium having stored thereon instructions that, when executed by a machine, result in:

receiving an input/output (I/O) request from an application running on a processor sent to at least one storage device;

identifying a namespace (NS) associated with the I/O request;

identifying a Non-Volatile Memory (NVM) Set based at least in part on a first association between the NS and the NVM Set, the NVM Set associated with a Quality of Service (QoS) level;

identifying a submission queue (SQ) based at least in part on a second association between the NVM Set and the SQ; and placing the I/O request in the SQ.

Statement 31. An embodiment of the disclosure includes the article according to statement 30, wherein the SQ is owned by the processor.

Statement 32. An embodiment of the disclosure includes the article according to statement 30, wherein a data for the SQ is stored in a memory.

Statement 33. An embodiment of the disclosure includes the article according to statement 30, the non-transitory storage medium having stored thereon further instructions that, when executed by the machine, result in:

receiving a response in a completion queue; and sending the response to the application.

Statement 34. An embodiment of the disclosure includes the article according to statement 30, wherein the SQ is associated with the QoS level.

Statement 35. An embodiment of the disclosure includes the article according to statement 34, wherein the NVM Set is associated with the QoS level based at least in part on the SQ being associated with the QoS level.

Statement 36. An embodiment of the disclosure includes the article according to statement 35, wherein the NS is associated with the QoS level based at least in part on the NVM Set being associated with the QoS level.

Statement 37. An embodiment of the disclosure includes the article according to statement 30, wherein the NVM Set is associated with a first partition of storage in at least one storage device.

Statement 38. An embodiment of the disclosure includes the article according to statement 37, wherein the storage device includes at least one Solid State Drive (SSD).

Statement 39. An embodiment of the disclosure includes the article according to statement 30, wherein receiving the I/O request from the application running on the processor includes receiving the I/O request from the application running in a first core of the processor, the processor including the first core and a second core.

Statement 40. An embodiment of the disclosure includes the article according to statement 30, the non-transitory storage medium having stored thereon further instructions that, when executed by the machine, result in:

receiving a second I/O request from the application running on the processor;

identifying a second NS associated with the second I/O request;

identifying a second NVM Set based at least in part on a third association between the second NS and the second NVM Set, the second NVM Set associated with a second QoS level;

identifying a second SQ based at least in part on a fourth association between the second NVM Set and the second SQ; and placing the second I/O request in the second SQ.

Statement 41. An embodiment of the disclosure includes the article according to statement 30, the non-transitory storage medium having stored thereon further instructions that, when executed by the machine, result in sending a command to the processor to create the SQ.

Statement 42. An embodiment of the disclosure includes the article according to statement 41, the non-transitory storage medium having stored thereon further instructions that, when executed by the machine, result in assigning the QoS level to the SQ.

Statement 43. An embodiment of the disclosure includes the article according to statement 30, the non-transitory storage medium having stored thereon further instructions that, when executed by the machine, result in sending a command to the processor to create the NVM Set.

Statement 44. An embodiment of the disclosure includes the article according to statement 43, the non-transitory storage medium having stored thereon further instructions that, when executed by the machine, result in associating the NVM Set with the SQ.

Statement 45. An embodiment of the disclosure includes the article according to statement 44, wherein the NVM Set inherits the QoS level from the SQ.

Statement 46. An embodiment of the disclosure includes the article according to statement 30, the non-transitory storage medium having stored thereon further instructions that, when executed by the machine, result in sending a command to the processor to create the NS.

Statement 47. An embodiment of the disclosure includes the article according to statement 46, the non-transitory storage medium having stored thereon further instructions that, when executed by the machine, result in associating the NS with the NVM Set.

Statement 48. An embodiment of the disclosure includes the article according to statement 47, wherein the NS inherits the QoS level from the NVM Set.

Statement 49. An embodiment of the disclosure includes a host interface layer in a storage device, the host interface layer including:

an arbitrator to select a first submission queue (SQ) from a set including at least the first SQ and a second SQ, the first SQ associated with a first Quality of Service (QoS) level, the second SQ associated with a second QoS level;

a command fetcher to retrieve an input/output (I/O) request from the first SQ; and a command parser to place the I/O request in a first command queue from a set including at least the first command queue and a second command queue, wherein the arbitrator is configured to select the first SQ from the set including at least the first SQ and the second SQ based at least in part on a first weight associated with the first SQ and a second weight associated with the second SQ, wherein the first weight is based at least in part on a first total storage capacity of at least one first namespace (NS) associated with the first QoS level, and wherein the second weight is based at least in part on a second total storage capacity of at least one second NS associated with the second QoS level.

Statement 50. An embodiment of the disclosure includes the host interface layer in a storage device according to statement 49, wherein the storage device includes a Solid State Drive (SSD).

Statement 51. An embodiment of the disclosure includes the host interface layer in the storage device according to statement 49, wherein:

the first command queue is associated with the first QoS level; and the second command queue is associated with the second QoS level.

Statement 52. An embodiment of the disclosure includes the host interface layer in the storage device according to statement 51, further comprising a QoS-aware scheduler to select the I/O request from the first command queue and the second command queue based on at least a weight associated with the first QoS level.

Statement 53. An embodiment of the disclosure includes the host interface layer in the storage device according to statement 52, further comprising storage for a table mapping the first QoS level to the weight.

Statement 54. An embodiment of the disclosure includes the host interface layer in the storage device according to statement 49, further comprising storage for a table mapping the first NS to the first QoS level and the second NS to the second QoS level.

Statement 55. An embodiment of the disclosure includes the host interface layer in the storage device according to statement 49, further comprising storage for a table mapping a first range of total capacities to the first weight and a second range of total capacities to the second weight.

Statement 56. An embodiment of the disclosure includes the host interface layer in the storage device according to statement 49, wherein:

the first weight is based at least in part on the first total storage capacity of the at least one first NS associated with the first QoS level and a first priority assigned by a host; and the second weight is based at least in part on the second total storage capacity of the at least one second NS associated with the second QoS level and a second priority assigned by the host.

Statement 57. An embodiment of the disclosure includes the host interface layer in the storage device according to statement 56, further comprising storage for a table mapping the first range of total capacities and the first priority to the first weight and the second range of total capacities and the second priority to the second weight.

Statement 58. An embodiment of the disclosure includes the host interface layer in the storage device according to statement 49, wherein the first weight and the second weight are adjusted dynamically.

Statement 59. An embodiment of the disclosure includes the host interface layer in the storage device according to statement 58, wherein the first weight and the second weight are computed based at least in part on the first NS being created or the first NS being deleted.

Statement 60. An embodiment of the disclosure includes the host interface layer in the storage device according to statement 49, wherein:

the first command queue includes a first read queue and a first write queue; and the second command queue includes a second read queue and a second write queue.

Statement 61. An embodiment of the disclosure includes the host interface layer in the storage device according to statement 49, further comprising a write buffer to store data to be written to the storage device.

Statement 62. An embodiment of the disclosure includes the host interface layer in the storage device according to statement 49, further comprising a completion queue arbitrator to place a response to the I/O request in a completion queue.

Statement 63. An embodiment of the disclosure includes a method, comprising:

determining a first weight for a first submission queue (SQ) based at least in part on a first total storage capacity for at least one first namespace (NS) associated with a first Quality of Service (QoS) level;

determining a second weight for a second SQ, the second SQ based at least in part on a second total storage capacity for at least one second NS associated with a second QoS level;

selecting the first SQ from the first SQ and the second SQ based at least in part on the first weight and the second weight;

selecting an input/output (I/O) request in the first SQ;

selecting a first command queue from a set including at least the first command queue and a second command queue based at least in part on the first QoS level for the I/O request; and placing the I/O request in the first command queue based at least in part on the first QoS level for the I/O request.

Statement 64. An embodiment of the disclosure includes the method according to statement 63, wherein the method is implemented in a host interface layer in a storage device.

Statement 65. An embodiment of the disclosure includes the method according to statement 64, wherein the storage device includes a Solid State Drive (SSD).

Statement 66. An embodiment of the disclosure includes the method according to statement 63, wherein:

determining the first weight includes mapping the first total storage capacity to the first weight; and determining the second weight includes mapping the second total storage capacity to the second weight.

Statement 67. An embodiment of the disclosure includes the method according to statement 66, wherein:

mapping the first total storage capacity to the first weight includes mapping the first total storage capacity and a first priority assigned to the at least one first NS by a host to the first weight; and mapping the second total storage capacity to the second weight includes mapping the second total storage capacity and a second priority assigned to the at least one second NS by the host to the second weight.

Statement 68. An embodiment of the disclosure includes the method according to statement 63, wherein selecting the first SQ based at least in part on the first weight and the second weight includes selecting the first SQ based at least in part in proportion to the first weight and the second weight.

Statement 69. An embodiment of the disclosure includes the method according to statement 63, wherein:

determining the first weight for the first SQ includes determining the first weight for the first SQ when an NS is created or deleted; and determining the second weight for the second SQ includes determining the second weight for the second SQ when the NS is created or deleted.

Statement 70. An embodiment of the disclosure includes the method according to statement 63, wherein the first command queue includes a read queue associated with the QoS level and a write queue associated with the first QoS level.

Statement 71. An embodiment of the disclosure includes the method according to statement 63, further comprising:

retrieving the I/O request from the first command queue based at least in part on a weight associated with the first QoS level; and sending the I/O request to a flash translation layer (FTL).

Statement 72. An embodiment of the disclosure includes the method according to statement 63, further comprising:

receiving a result of the I/O request; and placing the result in a completion queue.

Statement 73. An embodiment of the disclosure includes the method according to statement 72, wherein placing the result in the completion queue includes placing the result in the completion queue based at least in part on the first QoS level.

Statement 74. An embodiment of the disclosure includes an article, comprising a non-transitory storage medium, the non-transitory storage medium having stored thereon instructions that, when executed by a machine, result in:

determining a first weight for a first submission queue (SQ) based at least in part on a first total storage capacity for at least one first namespace (NS) associated with a first Quality of Service (QoS) level;

determining a second weight for a second SQ, the second SQ based at least in part on a second total storage capacity for at least one second NS associated with a second QoS level;

selecting the first SQ from the first SQ and the second SQ based at least in part on the first weight and the second weight;

selecting an input/output (I/O) request in the first SQ;

selecting a first command queue from a set including at least the first command queue and a second command queue based at least in part on the first QoS level for the I/O request; and placing the I/O request in the first command queue based at least in part on the first QoS level for the I/O request.

Statement 75. An embodiment of the disclosure includes the article according to statement 74, wherein the article is implemented in a host interface layer in a storage device.

Statement 76. An embodiment of the disclosure includes the article according to statement 75, wherein the storage device includes a Solid State Drive (SSD).

Statement 77. An embodiment of the disclosure includes the article according to statement 74, wherein:

determining the first weight includes mapping the first total storage capacity to the first weight; and determining the second weight includes mapping the second total storage capacity to the second weight.

Statement 78. An embodiment of the disclosure includes the article according to statement 77, wherein:

mapping the first total storage capacity to the first weight includes mapping the first total storage capacity and a first priority assigned to the at least one first NS by a host to the first weight; and mapping the second total storage capacity to the second weight includes mapping the second total storage capacity and a second priority assigned to the at least one second NS by the host to the second weight.

Statement 79. An embodiment of the disclosure includes the article according to statement 74, wherein selecting the first SQ based at least in part on the first weight and the second weight includes selecting the first SQ based at least in part in proportion to the first weight and the second weight.

Statement 80. An embodiment of the disclosure includes the article according to statement 74, wherein:

determining the first weight for the first SQ includes determining the first weight for the first SQ when an NS is created or deleted; and determining the second weight for the second SQ includes determining the second weight for the second SQ when the NS is created or deleted.

Statement 81. An embodiment of the disclosure includes the article according to statement 74, wherein the first command queue includes a read queue associated with the QoS level and a write queue associated with the first QoS level.

Statement 82. An embodiment of the disclosure includes the article according to statement 74, the non-transitory storage medium having stored thereon instructions that, when executed by the machine, result in:

retrieving the I/O request from the first command queue based at least in part on a weight associated with the first QoS level; and sending the I/O request to a flash translation layer (FTL).

Statement 83. An embodiment of the disclosure includes the article according to statement 74, the non-transitory storage medium having stored thereon instructions that, when executed by the machine, result in:

receiving a result of the I/O request; and placing the result in a completion queue.

Statement 84. An embodiment of the disclosure includes the article according to statement 83, wherein placing the result in the completion queue includes placing the result in the completion queue based at least in part on the first QoS level.

Statement 85. An embodiment of the disclosure includes a storage device, comprising:

a first block and a second block; and a partition manager to allocate the first block to a first partition and the second block to a second partition, wherein the first partition is configured to store a first data received from a host associated with a first Quality of Service (QoS) level and the second partition is configured to store a second data received from the host associated with a second QoS level.

Statement 86. An embodiment of the disclosure includes the storage device according to statement 85, wherein the second QoS level is different from the first QoS level.

Statement 87. An embodiment of the disclosure includes the storage device according to statement 85, further comprising a third block.

Statement 88. An embodiment of the disclosure includes the storage device according to statement 87, wherein the partition manager is configured to allocate the third block from a free block pool to a third partition, the third partition configured to store a third data received from the host associated with a third QoS level.

Statement 89. An embodiment of the disclosure includes the storage device according to statement 88, wherein the third QoS level is different from both the first QoS level and the second QoS level.

Statement 90. An embodiment of the disclosure includes the storage device according to statement 87, wherein the partition manager is configured to allocate the third block from a free block pool to the first partition.

Statement 91. An embodiment of the disclosure includes the storage device according to statement 90, wherein the partition manager is configured to allocate the third block from the free block pool to the first partition based at least in part on the first partition having insufficient space to store an additional first data received from the host.

Statement 92. An embodiment of the disclosure includes the storage device according to statement 90, wherein the partition manager is configured to allocate the third block from the free block pool to the first partition based at least in part on a garbage collection logic programming a valid data from an erase block in the first partition.

Statement 93. An embodiment of the disclosure includes the storage device according to statement 92, wherein the partition manager is configured to allocate the third block from the free block pool to the first partition based at least in part on the garbage collection logic programming the valid data from the erase block in the first partition and the first partition having insufficient space to store the valid data.

Statement 94. An embodiment of the disclosure includes the storage device according to statement 90, wherein the partition manager is configured to allocate the third block from the free block pool to the first partition based at least in part on a wear leveling logic programming a valid data from an erase block in the first partition.

Statement 95. An embodiment of the disclosure includes the storage device according to statement 94, wherein the partition manager is configured to allocate the third block from the free block pool to the first partition based at least in part on the wear leveling logic programming the valid data from the erase block in the first partition and the first partition having insufficient space to store the valid data.

Statement 96. An embodiment of the disclosure includes the storage device according to statement 87, wherein:
the first partition is configured to store the first data received from the host associated with the first QoS level and a first namespace (NS) and the second partition is configured to store the second data received from the host associated with the second QoS level and a second NS; and
the partition manager is configured to allocate the third block from the free block pool to a third partition, the third partition configured to store a third data received from the host associated with the first QoS level and a third NS.

Statement 97. An embodiment of the disclosure includes the storage device according to statement 85, wherein the partition manager is operative to return the first block to a free block pool when the first block does not store valid data associated with the first QoS level.

Statement 98. An embodiment of the disclosure includes a method, comprising:
receiving a write command to write a first data in a storage of a storage device, the first data associated with a first Quality of Service (QoS) level;
identifying a first partition in the storage of the storage device storing a second data associated with the first QoS level;
identifying a block in the first partition to store the first data; and
writing the first data to the block in the first partition,
wherein a second partition in the storage of the storage device stores a third data associated with a second QoS level.

Statement 99. An embodiment of the disclosure includes the method according to statement 98, wherein:
identifying the block in the first partition to store the first data includes:
determining that a first block in the first partition has a free space smaller than a size of the first data; and
allocating a second block from a free block pool to the first partition; and
writing the first data to the block in the first partition includes writing the first data to the second block in the first partition.

Statement 100. An embodiment of the disclosure includes the method according to statement 98, wherein receiving the write command to write the first data in the storage of the storage device includes receiving the write command from a garbage collection logic to write the first data in the storage of the storage device.

Statement 101. An embodiment of the disclosure includes the method according to statement 98, wherein receiving the write command to write the first data in the storage of the storage device includes receiving the write command from a wear leveling logic to write the first data in the storage of the storage device.

Statement 102. An embodiment of the disclosure includes the method according to statement 98, further comprising:
identifying a second block in the first partition, the second block storing no valid data;
removing the second block from the first partition; and
returning the second block to a free block pool.

Statement 103. An embodiment of the disclosure includes the method according to statement 102, further comprising erasing the second block.

Statement 104. An embodiment of the disclosure includes the method according to statement 98, wherein:
the first partition in the storage of the storage device stores the second data associated with the first QoS level and a first namespace (NS);
the second partition in the storage of the storage device stores the third data associated with the second QoS level and a second NS; and
a third partition in the storage of the storage device stores a fourth data associated with the first QoS level and a third NS.

Statement 105. An embodiment of the disclosure includes an article, comprising a non-transitory storage medium, the non-transitory storage medium having stored thereon instructions that, when executed by a machine, result in:
receiving a write command to write a first data in a storage of a storage device, the first data associated with a first Quality of Service (QoS) level;
identifying a first partition in the storage of the storage device storing a second data associated with the first QoS level;
identifying a block in the first partition to store the first data; and
writing the first data to the block in the first partition,
wherein a second partition in the storage of the storage device stores a third data associated with a second QoS level.

Statement 106. An embodiment of the disclosure includes the article according to statement 105, wherein:
identifying the block in the first partition to store the first data includes:
determining that a first block in the first partition has a free space smaller than a size of the first data; and
allocating a second block from a free block pool to the first partition; and
writing the first data to the block in the first partition includes writing the first data to the second block in the first partition.

Statement 107. An embodiment of the disclosure includes the article according to statement 105, wherein receiving the write command to write the first data in the storage of the storage device includes receiving the write command from a garbage collection logic to write the first data in the storage of the storage device.

Statement 108. An embodiment of the disclosure includes the article according to statement 105, wherein receiving the write command to write the first data in the storage of the storage device includes receiving the write command from a wear leveling logic to write the first data in the storage of the storage device.

Statement 109. An embodiment of the disclosure includes the article according to statement 105, the non-transitory storage medium having stored thereon instructions that, when executed by the machine, result in:
identifying a second block in the first partition, the second block storing no valid data;
removing the second block from the first partition; and
returning the second block to a free block pool.

Statement 110. An embodiment of the disclosure includes the article according to statement 109, the non-transitory storage medium having stored thereon instructions that, when executed by the machine, result in erasing the second block.

Statement 111. An embodiment of the disclosure includes the article according to statement 105, wherein:
the first partition in the storage of the storage device stores the second data associated with the first QoS level and a first namespace (NS);
the second partition in the storage of the storage device stores the third data associated with the second QoS level and a second NS; and
a third partition in the storage of the storage device stores a fourth data associated with the first QoS level and a third NS.

Statement 112. An embodiment of the disclosure includes a flash translation layer (FTL) core, comprising:
a Quality of Service (QoS)-aware FTL to retrieve a write command from a first command queue from a set including at least the first command queue and a second command queue, the write command including a Logical Block Address (LBA);
an LBA-to-Physical Block Address (PBA) table mapping between the LBA and a PBA; and
a die queue Manager (DQM) to communicate with at least one die in at least one flash chip.

Statement 113. An embodiment of the disclosure includes the FTL core according to statement 112, wherein the DQM includes a first die queue associated with a first QoS level and a second die queue associated with a second QoS level.

Statement 114. An embodiment of the disclosure includes the FTL core according to statement 113, wherein the DQM is configured to place the write command in the first die queue based at least in part on the PBA and the first QoS level.

Statement 115. An embodiment of the disclosure includes the FTL core according to statement 114, wherein the DQM is further configured to replace the LBA with the PBA in the write command.

Statement 116. An embodiment of the disclosure includes the FTL core according to statement 112, further comprising a completion manager to process results from the DQM.

Statement 117. An embodiment of the disclosure includes the FTL core according to statement 116, wherein the DQM includes a die completion queue to store the results.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A system, comprising:
a processor;
a first submission queue (SQ) and a second SQ, the first SQ associated with a first Quality of Service (QOS) level and the second SQ associated with a second QoS level, the first QoS level different from the second QoS level; and
an application running on the processor and using a first namespace (NS),
wherein the processor is configured to receive a first NS collection create command to establish a first NS collection associated with the first SQ,
wherein the processor is configured to receive a second NS collection create command to establish a second NS collection associated with the second SQ,
wherein the processor is configured to receive a first NS create command to establish the first NS associated with the first NS collection,
wherein the processor is configured to receive a second NS create command to establish a second NS associated with the second NS collection, and
wherein the processor is configured to place an input/output (I/O) request, sent from the application to at least one storage device, in the first SQ based at least in part on the I/O request being associated with the first NS, the first NS being associated with the first NS collection, and the first NS collection being associated with the first SQ, and
wherein the at least one storage device is configured to read requests from the first SQ and the second SQ.

2. The system according to claim 1, wherein:
the processor includes a first core and a second core;
the first core is associated with the first SQ and the second SQ;
the second core is associated with a third SQ and a fourth SQ, the third SQ having the first QoS level and the fourth SQ having the second QoS level, and
the at least one storage device is configured to read second requests from the third SQ and the fourth SQ.

3. The system according to claim 1, wherein the at least one storage device includes a Solid State Drive (SSD), including:
a first partition including a first set of Not-AND (NAND) flash chips in the SSD associated with the first NS collection; and
a second partition including a second set of NAND flash chips in the SSD associated with the second NS collection.

4. The system according to claim 3, wherein the first partition of storage in the at least one storage device is separate from the second partition of storage in the at least one storage device.

5. The system according to claim 1, wherein the at least one storage device supports the first QoS level and the second QoS level.

6. The system according to claim 1, wherein:
the first NS collection is associated with a third NS; and
the processor is further configured to place a second I/O request, sent from a second application to the at least one storage device, in the first SQ based at least in part on the second I/O request being associated with the third NS, the third NS being associated with the first NS collection, and the first NS collection being associated with the first SQ.

7. The system according to claim 1, wherein:
the processor is further configured to associate the first NS collection with a third SQ; and
the storage device is configured to read second requests from the third SQ.

8. A method, comprising:
receiving an input/output (I/O) request from an application running on a processor sent to at least one storage device;
identifying a namespace (NS) based at least in part on the I/O request;
identifying an NS collection based at least in part on the NS and a first association between the NS and the NS collection, the NS collection associated with a Quality of Service (QoS) level;
identifying a submission queue (SQ) based at least in part on the NS collection and a second association between the NS collection and the SQ; and
placing the I/O request in the SQ,
wherein the at least one storage device is configured to read the I/O request from the SQ.

9. The method according to claim 8, wherein the SQ is associated with the QoS level.

10. The method according to claim 9, wherein the NS collection is associated with the QoS level based at least in part on the SQ being associated with the QoS level.

11. The method according to claim 8, wherein:
receiving the I/O request from the application running on the processor includes receiving the I/O request from the application running in a first core of the processor, the processor including the first core and a second core; and
identifying the SQ based at least in part on the NS collection and the second association between the NS collection and the SQ includes identifying the SQ based at least in part on the first core, the NS collection, and the second association between the NS collection and the SQ.

12. The method according to claim 8, further comprising:
receiving a second I/O request from the application running on the processor;
identifying a second NS based at least in part on the second I/O request;
identifying a second NS collection based at least in part on the NS and a third association between the second NS and the second NS collection, the second NS collection associated with a second QoS level;
identifying a second SQ based at least in part on the NS collection and a fourth association between the second NS collection and the second SQ; and
placing the second I/O request in the second SQ,
wherein the at least one storage device is configured to read the second I/O request from the second SQ.

13. The method according to claim 8, further comprising sending a command to the processor by an administrator to create the SQ.

14. The method according to claim 13, further comprising assigning a QoS level to the SQ.

15. The method according to claim 8, further comprising sending a command to the processor by an administrator to create the NS collection.

16. The method according to claim 15, further comprising associating the NS collection with the SQ in a second command sent to the processor by the administrator to create the SQ.

17. The method according to claim 16, wherein the QoS level associated with the NS collection is based at least in part on a second QoS level associated with the SQ.

18. The method according to claim 8, further comprising sending a command to the processor by the application to create the NS.

19. The method according to claim 18, further comprising associating the NS with the NS collection.

20. The method according to claim 19, further comprising associating a second QoS level with the NS based at least in part on the QoS level associated with the NS collection.

21. An article, comprising a non-transitory storage medium, the non-transitory storage medium having stored thereon instructions that, when executed by a machine, result in:
receiving an input/output (I/O) request from an application running on a processor sent to at least one storage device;
identifying a namespace (NS) based at least in part on the I/O request;
identifying an NS collection based at least in part on the NS and a first association between the NS and the NS collection, the NS collection associated with a Quality of Service (QoS) level;
identifying a submission queue (SQ) based at least in part on the NS collection and a second association between the NS collection and the SQ; and
placing the I/O request in the SQ.

22. The article according to claim 21, wherein the SQ is associated with the QoS level.

* * * * *